United States Patent
Posey et al.

(10) Patent No.: US 12,473,342 B2
(45) Date of Patent: Nov. 18, 2025

(54) CHIMERIC ANTIGEN RECEPTOR T REGULATORY CELLS FOR THE TREATMENT OF ATHEROSCLEROSIS

(71) Applicant: THE TRUSTEES OF THE UNIVERSITY OF PENNSYLVANIA, Philadelphia, PA (US)

(72) Inventors: Avery D. Posey, Philadelphia, PA (US); Carl H. June, Merion Station, PA (US); Robert D. Schwab, Bryn Mawr, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1231 days.

(21) Appl. No.: 17/050,527

(22) PCT Filed: Apr. 26, 2019

(86) PCT No.: PCT/US2019/029405
§ 371 (c)(1),
(2) Date: Oct. 26, 2020

(87) PCT Pub. No.: WO2019/210207
PCT Pub. Date: Oct. 31, 2019

(65) Prior Publication Data
US 2021/0060071 A1  Mar. 4, 2021

Related U.S. Application Data

(60) Provisional application No. 62/663,776, filed on Apr. 27, 2018.

(51) Int. Cl.
| | |
|---|---|
| *C07K 14/705* | (2006.01) |
| *A61K 40/11* | (2025.01) |
| *A61K 40/22* | (2025.01) |
| *A61K 40/31* | (2025.01) |
| *A61K 40/42* | (2025.01) |
| *C07K 14/725* | (2006.01) |
| *C07K 16/18* | (2006.01) |

(52) U.S. Cl.
CPC ........ *C07K 14/70507* (2013.01); *A61K 40/11* (2025.01); *A61K 40/22* (2025.01); *A61K 40/31* (2025.01); *A61K 40/4242* (2025.01); *C07K 14/7051* (2013.01); *C07K 14/70517* (2013.01); *C07K 14/70521* (2013.01); *C07K 14/70578* (2013.01); *C07K 16/18* (2013.01); *A61K 2239/38* (2023.05); *C07K 2317/53* (2013.01); *C07K 2317/622* (2013.01); *C07K 2319/03* (2013.01)

(58) Field of Classification Search
None
See application file for complete search history.

(56) References Cited

U.S. PATENT DOCUMENTS

| | | | |
|---|---|---|---|
| 11,820,819 B2 * | 11/2023 | Ma | A61K 39/4632 |
| 2009/0208503 A1 | 8/2009 | Carlsson | |
| 2014/0234348 A1 | 8/2014 | Scholler | |
| 2016/0361360 A1 | 12/2016 | Chang | |
| 2017/0211042 A1 | 7/2017 | Riley | |
| 2018/0201901 A1 * | 7/2018 | Duchateau | A61P 35/02 |
| 2024/0101687 A1 * | 3/2024 | Ahn | A61K 47/6845 |

FOREIGN PATENT DOCUMENTS

| | | |
|---|---|---|
| CN | 107271675 | 10/2017 |
| WO | 2007025781 A2 | 3/2007 |
| WO | 2014127261 A1 | 8/2014 |
| WO | 2016090329 A2 | 6/2016 |
| WO | 2017066136 A2 | 4/2017 |
| WO | 2017143076 A1 | 8/2017 |
| WO | 2017222593 A1 | 12/2017 |
| WO | WO-2018236909 A1 * | 12/2018 |

OTHER PUBLICATIONS

NCBI Blast Search Result (NCBI Blast database search, XM_009444056.1, performed May 29, 2024) (Year: 2024).*
Hermansson et al., "Inhibition of T cell response to native low-density lipoprotein reduces atherosclerosis", J Exp Med., (20100510), vol. 207, No. 5, doi:10.1084/jem.20092243, pp. 1081-1093, XP055015851.
International Search Report and Written Opinion issued in App. No. PCT/US19/29405, dated Oct. 23, 2019, 14 pages.
Schiopu et al., "Recombinant Antibodies to an Oxidized Low-Density Lipoprotein Epitope Induce Rapid Regression of Atherosclerosis in Apobec-1-/-/Low-Density Lipoprotein Receptor-/- Mice", Journal of the American College of Cardiology, vol. 50, No. 24, 2007, 6 pages.
Tsimikas et al., "Human Oxidation-Specific Antibodies Reduce Foam Cell Formation and Atherosclerosis Progression", J Am Coll Cardiol. Oct. 11, 2011; 58(16): 1715-1727.

\* cited by examiner

*Primary Examiner* — Christopher M Babic
*Assistant Examiner* — Alyssa G Weston
(74) *Attorney, Agent, or Firm* — Saul Ewing LLP; Kathryn Doyle; Lukas Pfannenstiel

(57) ABSTRACT

The present invention includes compositions and methods for treating atherosclerosis. In certain embodiments, atherosclerosis is treated using a chimeric antigen receptor (CAR) T cell specific for modified low-density lipoprotein.

29 Claims, 16 Drawing Sheets
Specification includes a Sequence Listing.

Human macrophages with OxLDL

Human macrophages with LDL

Human macrophages with media

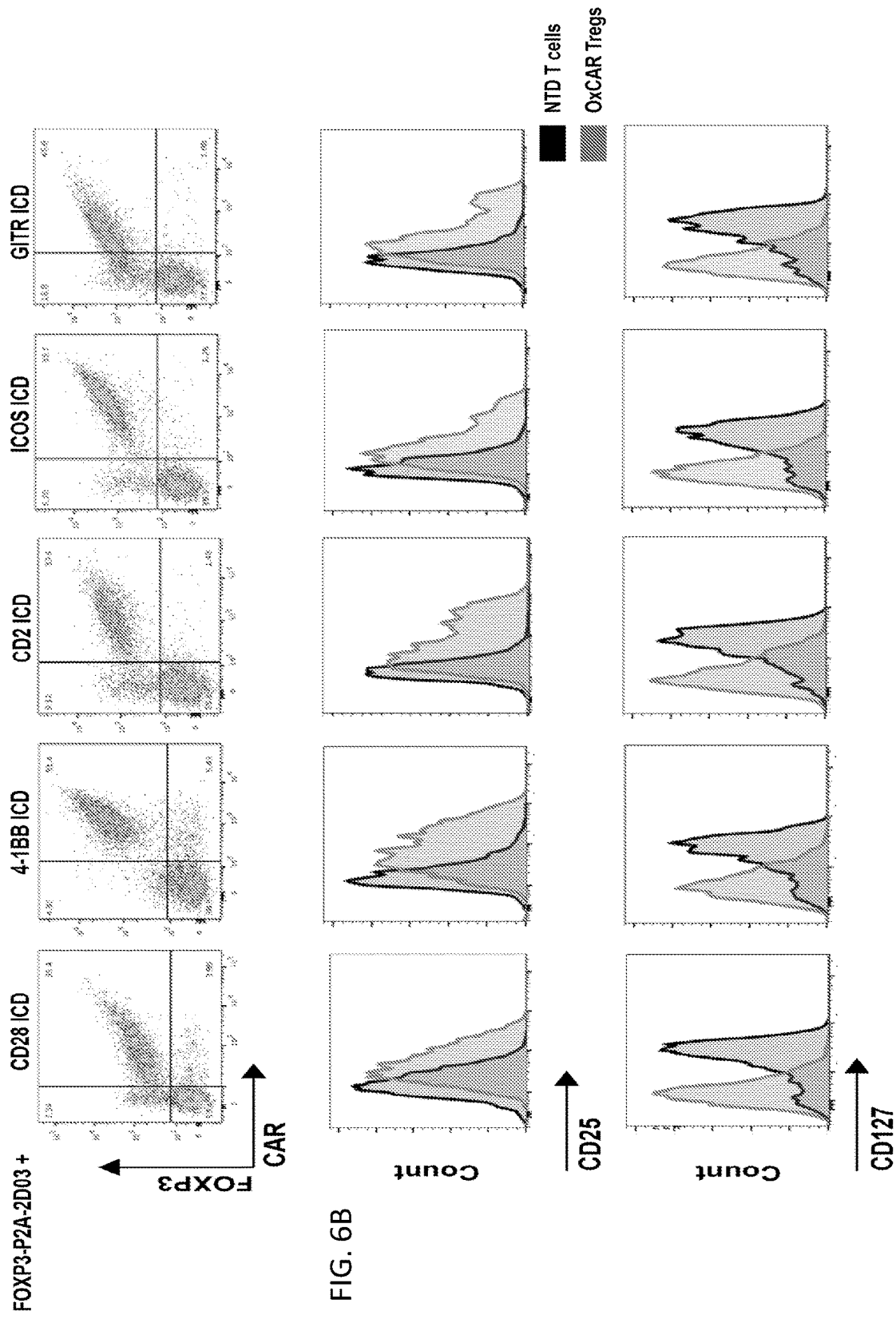

CHIMERIC ANTIGEN RECEPTOR T REGULATORY CELLS FOR THE TREATMENT OF ATHEROSCLEROSIS

CROSS-REFERENCE TO RELATED APPLICATIONS

The present application is a 35 U.S.C. § 371 national phase application from, and claims priority to, International Application No. PCT/US2019/029405 filed Apr. 26, 2019, and published under PCT Article 21(2) in English, which is entitled to priority under 35 U.S.C. § 119 (e) to U.S. Provisional Patent Application No. 62/663,776 filed Apr. 27, 2018, all of which applications are incorporated herein by reference in their entireties.

REFERENCE TO SEQUENCE LISTING

The Sequence Listing concurrently submitted herewith as an ASCII file named "046483-7203US1_SequenceListing.txt", created on Oct. 26, 2020, and having a size of 49,152 bytes is herein incorporated by reference in its entirety.

BACKGROUND OF THE INVENTION

Cardiovascular disease (CVD) is the leading cause of death in the United States, narrowly leading cancer with over 900,000 deaths in 2016. Accounting for nearly 90% of these deaths are atherosclerotic diseases, which encompasses coronary artery disease, cerebrovascular diseases, and peripheral artery disease. While the prevalence of cardiovascular disease has decreased significantly over the past 30 years due to lipid-lowering treatments and blood pressure control, there is still a need for improving the treatment and management of CVD. Currently, a patient on adequate cholesterol-lowering treatment for atherosclerotic CVD maintains a 21.7% five-year event rate for a major adverse cardiovascular event. These astounding numbers are rational for the development of bold new efficacious and therapeutic treatments for patients with atherosclerosis that go beyond lowering lipids.

Atherosclerosis is a narrowing and hardening of arteries that can eventually lead to thrombotic events causing inefficient oxygen penetration into essential tissues; the pathogenesis is depicted in FIG. 1A. This hardening, plaque formation, and eventual rupture are thought to be due to progressive endothelial dysfunction from cholesterol deposition, resulting in inflammation and immune deregulation. Oxidation of low-density lipoprotein (LDL) by reactive oxygen species or nearby enzymes in the arterial wall and subsequent accumulation of oxidized low density lipoproteins (OxLDL) by macrophages is implicated as one of the initiating factors of atherosclerosis. OxLDL is a major pro-inflammatory signal that activates the endothelium, induces cytokine and chemokine release, and recruits monocytes, macrophages, and Th1 cells. OxLDL is normally catabolized to free cholesterol and free fatty acids in the late endosomes of macrophages and then secreted; however, in atherosclerosis, high concentrations of OxLDL lead to the accumulation of intracellular cholesterol crystals and lipid droplets and transform the macrophages into foam cells. These foam cells, along with other antigen-presenting cells, recruit and activate T and B lymphocytes, which subsequently produce pro-inflammatory cytokines and atherogenic IgG immunoglobulins, respectively. Eventually the foam cells undergo apoptosis and create a necrotic core, which promotes increased inflammation, metalloproteinase release, and smooth muscle injury. In time, a fibrous cap develops on the arterial wall, leading to plaque deposition and rupture.

Standard-of-care treatment options for patients with high cardiovascular risk, such as low or high-dose statins, primarily target the circulating levels of cholesterol and not inflammation. Yet, new insights suggest much of the pathogenesis of atherosclerosis is due to the inflammatory response to OxLDL rather than native LDL. This explains why there exists a therapeutic benefit from medications that reduce inflammatory responses, such as aspirin, methotrexate, and more recently, canakunimab, an IL-1β antibody. The Canakinumab Anti-Inflammatory Thrombosis Outcomes Study (CANTOS) trial demonstrated convincing evidence that anti-inflammatory interventions in atherosclerosis can significantly reduce adverse cardiovascular events. Although this was the first clinical study that demonstrated that a purely anti-inflammatory therapy can reduce atherosclerotic risk, the higher incidence of fatal infections associated with canakunimab treatment prevented it from being a feasible treatment option at the moment.

A need exists for novel compositions and methods for treating heart disease and atherosclerosis. The present invention satisfies this need.

SUMMARY OF THE INVENTION

As described herein, the present invention relates to compositions and methods for treating heart disease and/or atherosclerosis via CAR T cells.

One aspect of the invention includes a method for treating heart disease and/or atherosclerosis in a subject in need thereof. The method comprises administering to the subject a T cell genetically modified to express a chimeric antigen receptor (CAR), wherein the CAR comprises an antigen binding domain specific for modified low-density lipoprotein (LDL), a transmembrane domain, and an intracellular domain.

Another aspect of the invention includes an isolated chimeric antigen receptor (CAR) comprising an antigen binding domain specific for modified low-density lipoprotein (LDL), a transmembrane domain, and an intracellular domain.

Yet another aspect of the invention includes an isolated nucleic acid encoding any of the chimeric antigen receptors (CARs) disclosed herein.

Still another aspect of the invention includes a vector comprising any of the isolated nucleic acids disclosed herein.

In another aspect, the invention includes a modified T cell comprising any of the isolated nucleic acids disclosed herein.

In various embodiments of the above aspects or any other aspect of the invention delineated herein, the modified LDL comprises oxidized LDL (OxLDL). In certain embodiments, the OxLDL comprises the MDA/MDA-ApoB100 epitope present on OxLDL. In certain embodiments, the modified LDL comprises modified ApoB100.

In certain embodiments, the modified LDL is selected from the group consisting of Cu-oxidized LDL, advanced glycation endproducts LDL (AGE-LDL), malondialdehyde-LDL, glycated-LDL, carbamylated LDL, desialylated LDL, apolipoprotein (a), and lipoprotein(a) (Lp-a), oxidized phosphatidylcholine containing oxidized phospholipids, 1-palmitoyl-2-(5-oxovaleroyl)-sn-glycero-3-phosphocholine (POVPC), oxidized 1-palmitoyl-2-arachidonoyl-sn-glycero- 3-phosphocholine (OxPAPC), 4-hydroxynonenal (HNE), oxidized cholesteryl ester (OxCE), and oxidized cardiolipin (OxCL).

In certain embodiments, the cell is a regulatory T (Treg) cell. In certain embodiments, the cell is a CD4+ T cell. In certain embodiments, the CD4+ T cell is converted to a regulatory T (Treg) cell. In certain embodiments, the cell is an autologous T cell.

In certain embodiments, the administering comprises adoptive cell transfer.

In certain embodiments, the antigen binding domain is selected from the group consisting of an antibody, a Fab, or an scFv. In certain embodiments, the antigen binding domain is an scFv comprising SEQ ID NO: 6.

In certain embodiments, the transmembrane domain is selected from the group consisting of CD28, CD8 alpha, ICOS, and GITR. In certain embodiments, the transmembrane domain comprises an amino acid sequence selected from the group consisting of SEQ ID NO: 10, SEQ ID NO: 11, SEQ ID NO: 13, and SEQ ID NO: 14.

In certain embodiments, the intracellular domain is at least one selected from the group consisting of CD3 zeta, CD28, 4-1BB, ICOS, GITR, and CD2. In certain embodiments, the intracellular domain comprises an amino acid sequence selected from the group consisting of SEQ ID NO: 15, SEQ ID NO: 18, SEQ ID NO: 20, SEQ ID NO: 22, and SEQ ID NO: 23. In certain embodiments, the intracellular domain further comprises an amino acid sequence selected from the group consisting of SEQ ID NO: 24, and SEQ ID NO: 26.

In certain embodiments, the CAR further comprises a hinge domain. In certain embodiments, the hinge domain comprises SEQ ID NO: 8.

In certain embodiments, the CAR comprises a 2D03 scFv, a CD8a hinge domain, a CD28 transmembrane domain, a CD28 intracellular domain, and a CD3 zeta domain. In certain embodiments, the CAR comprises the amino acid sequence of SEQ ID NO: 1.

In certain embodiments, the CAR comprises a 2D03 scFv, a CD8a hinge domain, a CD8a transmembrane domain, a 4-1BB intracellular domain, and a CD3 zeta domain. In certain embodiments, the CAR comprises the amino acid sequence of SEQ ID NO: 2.

In certain embodiments, the CAR comprises a 2D03 scFv, a CD8a hinge domain, an ICOS transmembrane domain, an ICOS intracellular domain, and a CD3 zeta domain. In certain embodiments, the CAR comprises the amino acid sequence of SEQ ID NO: 3.

In certain embodiments, the CAR comprises a 2D03 scFv, a CD8a hinge domain, a GITR transmembrane domain, a GITR intracellular domain, and a CD3 zeta domain. In certain embodiments, the CAR comprises the amino acid sequence of SEQ ID NO: 4.

In certain embodiments, the CAR comprises a 2D03 scFv, a CD8a hinge domain, a CD8a transmembrane domain, a CD2 intracellular domain, and a CD3 zeta domain. In certain embodiments, the CAR comprises the amino acid sequence of SEQ ID NO: 5.

In certain embodiments, treating heart disease and/or atherosclerosis comprises reversing the pro-inflammatory response at sites of plaque formation and/or highly modified LDL deposition.

BRIEF DESCRIPTION OF THE DRAWINGS

The following detailed description of specific embodiments of the invention will be better understood when read in conjunction with the appended drawings. For the purpose of illustrating the invention, there are shown in the drawings exemplary embodiments. It should be understood, however, that the invention is not limited to the precise arrangements and instrumentalities of the embodiments shown in the drawings.

FIG. 1A illustrates the pathogenesis of atherosclerosis. LDL deposition in the endovascular endothelium results in oxidation by reactive oxygen species (ROS). OxLDL is internalized by scavenger receptors on macrophages, which turn into foam cells. Foam cells release pro-inflammatory cytokines (TNFα and IL-1β) that increase adhesion molecule expression on the vascular endothelium and cause vascular smooth muscle cell (VSMC) proliferation. Chemokines are also released that recruit T cells and B cells. T cells become activated by foam cells or other antigen-presenting cells and then interact with B cells to produce anti-OxLDL immunoglobulins that are pro-atherogenic and increase inflammation. In time, a fibrous cap develops on the arterial wall, leading to plaque deposition and rupture. FIG. 1B illustrates that the addition of an anti-OxLDL CAR T regulatory cell therapy reduces the inflammatory response initiated by OxLDL during the pathogenesis of atherosclerosis.

FIG. 3A depicts a chimeric antigen receptor comprising an scFv, a CD8a hinge, a transmembrane domain, a 4-1BB or CD28 intracellular signaling domain, and a CD3z endodomain. FIG. 3B shows flow cytometry histogram analysis of CAR+ T cells and non-transduced (NTD) T cells stained with biotinylated Protein-L+streptavidin-PE.

FIG. 4A illustrates a FOXP3-CAR vector containing an EF1a promotor followed by the human FOXP3 gene; the CAR was inserted after a 2A peptide sequence. The entire expression cassette was translated into a FOXP3-CAR fusion protein that was cleaved at the 2A site to produce the two separate proteins FOXP3 and CAR. FIG. 4B shows results from an intracellular staining assay measuring expression of FOXP3 of CAR+ or FOXP3-CAR+ CD4 T cells. FIG. 4C shows results from an intracellular staining assay measuring percent change in IFNg of CAR+ or FOXP3-CAR+ CD4 T cells cultured with or without OKT3 coated plates for 6 hrs. OKT3 was plate at 10 µg/ml. ns=no significance. FIG. 4D shows FOXP3, CTLA-4, CD25, and CD127 staining of NTD, FOXP3-CAR+ CD4 T cells and natural T regulatory cells. FIG. 4E shows results from a proliferation assay of CFSE-labeled naive human T cells activated with anti-CD3/anti-CD28 paramagnetic beads and cultured alone or in the presence of NTD T cells, CAR+ CD4 T cells or FOXP3-CAR+ CD4 T cells at 2 to 1 naive T cell to OxCAR Treg ratio.

FIG. 5A shows results from a stimulation assay quantifying the percent of cells expressing the respective markers. $1 \times 10^5$ NTD T cells, OxCAR Teffs, or OxCAR Tregs were cultured on OKT3, MDA-ApoB100, coated plates for 24 hrs, and then stained for both cell surface and intracellular markers. FIG. 5B shows results from an indirect ELISAs quantifying IL-10, IL-2R, IL-13, and IFNg production in supernatant from the stimulation assay. Statistical significance was calculated using two-way ANOVA comparing cytokine production of OxCAR Teffs to OxCAR Tregs when exposed to MDA-ApoB100. ****=p<0.0001.

FIGS. 6A-6D illustrate the finding that the CD28 intracellular signaling domain produces the most immunosuppressive OxCAR Tregs. FIG. 6A shows representative FACS histograms confirming expression of CAR and FOXP3 with each type of ICD. FIG. 6B shows representative FACS histograms of each type of OxCAR Treg that were stained for CD25 and CD127. FIG. 6C shows each OxCAR was stimulated for 24 hrs with MDA-ApoB100, stained for CD25 and GARP; percent change in GARP and CD25 expression from unstimulated OxCAR Tregs was calculated. Supernatant was removed during the same assay and cytokines were quantified by Luminex. Statistical significance was calculated using two-way ANOVA comparing cytokine production of CD28-OxCAR Tregs to each other ICD-OxCAR Treg. ****=p<0.0001. FIG. 6D shows results from a proliferation assay of CFSE-labeled naive human T cells activated with anti-CD3/anti-CD28 paramagnetic beads and cultured alone or in the presence of each ICD OxCAR Treg at various ratios. Percent suppression of naive T cells is reported.

FIG. 7A shows representative images of Oil Red O (ORO)-stained foam cells. $2 \times 10^5$ macrophages were seeded on a 24 well plate coated with 10 µg/ml of MDA-ApoB100 and non-transduced or transduced T cells of the same normal donor. After 48 hrs, 50 µg/ml of MDA-LDL was added to the culture to induce foam cell formation. 48 hours later, the macrophages were fixed and stained with Oil Red O. FIG. 7B shows relative intensity of Oil Red O staining. Statistical significance was calculated using two-way ANOVA comparing macrophages cultured with OxCAR Tregs to all other groups. **=p<0.001.

FIG. 8A shows flux measurements of NSG mice injected with $1 \times 10^7$ CBG-GFP+ CD4 T cells, CBG-GFP+ OxCAR Teffs, or CBG-GFP+ OxCAR Tregs. FIG. 8B shows percent changes in weight of the NSG mice over the course of the experiment.

FIG. 9A shows representative flow plots of FOXP3 and CAR expression of transduced murine T cells. FIG. 9B shows murine OxCAR Tregs were $CD25^{hi}$ and $CD127^{low}$. FIG. 9C shows proliferation CFSE-labeled muOxCAR Teffs in response to MDA-ApoB100 stimulation. FIG. 9D shows results from CFSE-labeled muOxCAR Teffs stimulated MDA-ApoB100 and co-cultured with decreasing amounts of muOxCAR Tregs.

DETAILED DESCRIPTION

Definitions

Figure 1A:
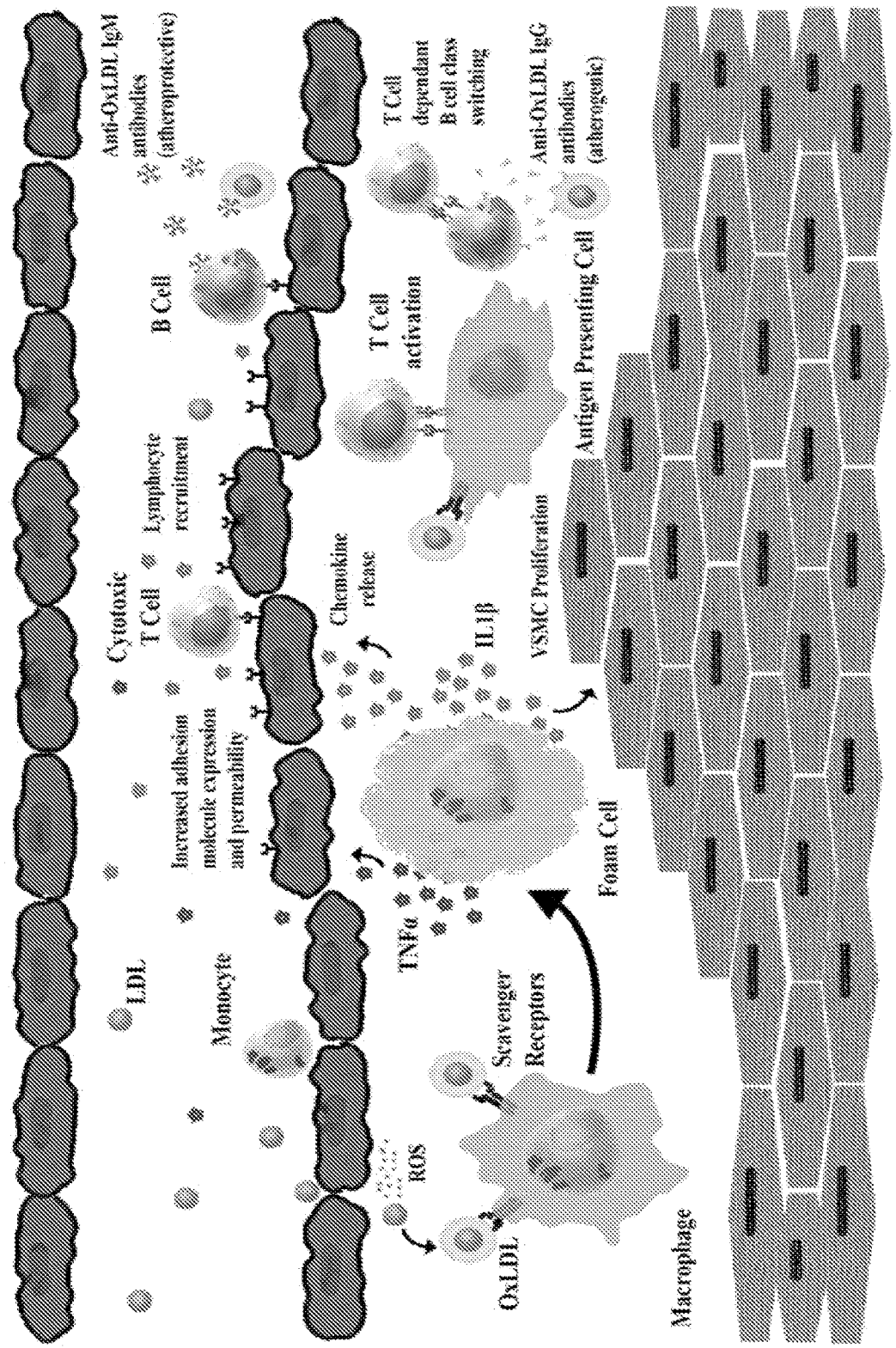
FIGS. 1A-1B is a schematic representation of the pathogenesis of atherosclerosis and depicts the therapeutic intervention of anti-modified LDL CAR-T regulatory cells.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Activation," as used herein, refers to the state of a T cell that has been sufficiently stimulated to induce detectable cellular proliferation. Activation can also be associated with induced cytokine production, and detectable effector functions. The term "activated T cells" refers to, among other things, T cells that are undergoing cell division.

The term "antibody," as used herein, refers to an immunoglobulin molecule which specifically binds with an antigen. Antibodies can be intact immunoglobulins derived from natural sources or from recombinant sources and can be immunoreactive portions of intact immunoglobulins. Antibodies are typically tetramers of immunoglobulin molecules. The antibodies in the present invention may exist in a variety of forms including, for example, polyclonal antibodies, monoclonal antibodies, Fv, Fab and F(ab)$_2$, as well as single chain antibodies (scFv) and humanized antibodies (Harlow et al., 1999, In: Using Antibodies: A Laboratory Manual, Cold Spring Harbor Laboratory Press, NY; Harlow et al., 1989, In: Antibodies: A Laboratory Manual, Cold Spring Harbor, NY; Houston et al., 1988, Proc. Natl. Acad. Sci. USA 85:5879-5883; Bird et al., 1988, Science 242:423-426).

The term "antibody fragment" refers to a portion of an intact antibody and refers to the antigenic determining variable regions of an intact antibody. Examples of antibody fragments include, but are not limited to, Fab, Fab', F(ab')2, and Fv fragments, linear antibodies, scFv antibodies, and multispecific antibodies formed from antibody fragments.

An "antibody heavy chain," as used herein, refers to the larger of the two types of polypeptide chains present in all antibody molecules in their naturally occurring conformations.

An "antibody light chain," as used herein, refers to the smaller of the two types of polypeptide chains present in all antibody molecules in their naturally occurring conformations. Kappa and lambda light chains refer to the two major antibody light chain isotypes.

By the term "synthetic antibody" as used herein, is meant an antibody which is generated using recombinant DNA technology, such as, for example, an antibody expressed by a bacteriophage as described herein. The term should also be construed to mean an antibody which has been generated by the synthesis of a DNA molecule encoding the antibody and which DNA molecule expresses an antibody protein, or an amino acid sequence specifying the antibody, wherein the DNA or amino acid sequence has been obtained using synthetic DNA or amino acid sequence technology which is available and well known in the art.

The term "antigen" or "Ag" as used herein is defined as a molecule that provokes an immune response. This immune response may involve either antibody production, or the activation of specific immunologically-competent cells, or both. The skilled artisan will understand that any macromolecule, including virtually all proteins or peptides, can serve as an antigen. Furthermore, antigens can be derived from recombinant or genomic DNA. A skilled artisan will understand that any DNA, which comprises a nucleotide sequences or a partial nucleotide sequence encoding a protein that elicits an immune response therefore encodes an "antigen" as that term is used herein. Furthermore, one skilled in the art will understand that an antigen need not be encoded solely by a full length nucleotide sequence of a gene. It is readily apparent that the present invention includes, but is not limited to, the use of partial nucleotide sequences of more than one gene and that these nucleotide sequences are arranged in various combinations to elicit the desired immune response. Moreover, a skilled artisan will understand that an antigen need not be encoded by a "gene" at all. It is readily apparent that an antigen can be generated synthesized or can be derived from a biological sample. Such a biological sample can include, but is not limited to a tissue sample, a tumor sample, a cell or a biological fluid.

As used herein, the term "autologous" is meant to refer to any material derived from the same individual to which it is later to be re-introduced into the individual.

"Allogeneic" refers to any material derived from a different animal of the same species.

"Xenogeneic" refers to any material derived from an animal of a different species.

The term "chimeric antigen receptor" or "CAR," as used herein, refers to an artificial T cell receptor that is engineered to be expressed on an immune effector cell and specifically bind an antigen. CARs may be used as a therapy with adoptive cell transfer. T cells are removed from a patient and modified so that they express the receptors specific to a particular form of antigen. In some embodiments, the CARs has specificity to a selected target, for example a B cell surface receptor. CARs may also comprise an intracellular activation domain, a transmembrane domain and an extracellular domain comprising a tumor associated antigen binding region. In some aspects, CARs comprise an extracellular domain comprising an anti-B cell binding domain fused to CD3-zeta transmembrane and intracellular domain.

The term "cleavage" refers to the breakage of covalent bonds, such as in the backbone of a nucleic acid molecule or the hydrolysis of peptide bonds. Cleavage can be initiated by a variety of methods, including, but not limited to, enzymatic or chemical hydrolysis of a phosphodiester bond. Both single-stranded cleavage and double-stranded cleavage are possible. Double-stranded cleavage can occur as a result of two distinct single-stranded cleavage events. DNA cleavage can result in the production of either blunt ends or staggered ends. In certain embodiments, fusion polypeptides may be used for targeting cleaved double-stranded DNA.

As used herein, the term "conservative sequence modifications" is intended to refer to amino acid modifications that do not significantly affect or alter the binding characteristics of the antibody containing the amino acid sequence. Such conservative modifications include amino acid substitutions, additions and deletions. Modifications can be introduced into an antibody of the invention by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within the CDR regions of an antibody can be replaced with other amino acid residues from the same side chain family and the altered antibody can be tested for the ability to bind antigens using the functional assays described herein.

"Co-stimulatory ligand," as the term is used herein, includes a molecule on an antigen presenting cell (e.g., an aAPC, dendritic cell, B cell, and the like) that specifically binds a cognate co-stimulatory molecule on a T cell, thereby providing a signal which, in addition to the primary signal provided by, for instance, binding of a TCR/CD3 complex with an MHC molecule loaded with peptide, mediates a T cell response, including, but not limited to, proliferation, activation, differentiation, and the like. A co-stimulatory ligand can include, but is not limited to, CD7, B7-1 (CD80), B7-2 (CD86), PD-L1, PD-L2, 4-1BBL, OX40L, inducible costimulatory ligand (ICOS-L), intercellular adhesion molecule (ICAM), CD30L, CD40, CD70, CD83, HLA-G, MICA, MICB, HVEM, lymphotoxin beta receptor, 3/TR6, ILT3, ILT4, HVEM, an agonist or antibody that binds Toll ligand receptor and a ligand that specifically binds with B7-H3. A co-stimulatory ligand also encompasses, inter alia, an antibody that specifically binds with a co-stimulatory molecule present on a T cell, such as, but not limited to, CD27, CD28, 4-1BB, OX40, CD30, CD40, PD-1, ICOS, lymphocyte function-associated antigen-1 (LFA-1), CD2, CD7, LIGHT, NKG2C, B7-H3, and a ligand that specifically binds with CD83.

A "co-stimulatory molecule" refers to the cognate binding partner on a T cell that specifically binds with a co-stimulatory ligand, thereby mediating a co-stimulatory response by the T cell, such as, but not limited to, proliferation. Co-stimulatory molecules include, but are not limited to an WIC class I molecule, BTLA and a Toll ligand receptor.

A "co-stimulatory signal", as used herein, refers to a signal, which in combination with a primary signal, such as TCR/CD3 ligation, leads to T cell proliferation and/or upregulation or downregulation of key molecules.

A "disease" is a state of health of an animal wherein the animal cannot maintain homeostasis, and wherein if the disease is not ameliorated then the animal's health continues to deteriorate. In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

The term "downregulation" as used herein refers to the decrease or elimination of gene expression of one or more genes.

"Effective amount" or "therapeutically effective amount" are used interchangeably herein, and refer to an amount of a compound, formulation, material, or composition, as described herein effective to achieve a particular biological result or provides a therapeutic or prophylactic benefit. Such results may include, but are not limited to, anti-tumor activity as determined by any means suitable in the art.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

As used herein "endogenous" refers to any material from or produced inside an organism, cell, tissue or system.

As used herein, the term "exogenous" refers to any material introduced from or produced outside an organism, cell, tissue or system.

The term "expand" as used herein refers to increasing in number, as in an increase in the number of T cells. In one embodiment, the T cells that are expanded ex vivo increase in number relative to the number originally present in the culture. In another embodiment, the T cells that are expanded ex vivo increase in number relative to other cell types in the culture. The term "ex vivo," as used herein, refers to cells that have been removed from a living organism, (e.g., a human) and propagated outside the organism (e.g., in a culture dish, test tube, or bioreactor).

The term "expression" as used herein is defined as the transcription and/or translation of a particular nucleotide sequence driven by its promoter.

"Expression vector" refers to a vector comprising a recombinant polynucleotide comprising expression control sequences operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., Sendai viruses, lentiviruses, retroviruses, adenoviruses, and adeno-associated viruses) that incorporate the recombinant polynucleotide.

"Homologous" as used herein, refers to the subunit sequence identity between two polymeric molecules, e.g., between two nucleic acid molecules, such as, two DNA molecules or two RNA molecules, or between two polypeptide molecules. When a subunit position in both of the two molecules is occupied by the same monomeric subunit; e.g., if a position in each of two DNA molecules is occupied by adenine, then they are homologous at that position. The homology between two sequences is a direct function of the number of matching or homologous positions; e.g., if half (e.g., five positions in a polymer ten subunits in length) of the positions in two sequences are homologous, the two sequences are 50% homologous; if 90% of the positions (e.g., 9 of 10), are matched or homologous, the two sequences are 90% homologous.

"Humanized" forms of non-human (e.g., murine) antibodies are chimeric immunoglobulins, immunoglobulin chains or fragments thereof (such as Fv, Fab, Fab', F(ab')2 or other antigen-binding subsequences of antibodies) which contain minimal sequence derived from non-human immunoglobulin. For the most part, humanized antibodies are human immunoglobulins (recipient antibody) in which residues from a complementary-determining region (CDR) of the recipient are replaced by residues from a CDR of a non-human species (donor antibody) such as mouse, rat or rabbit having the desired specificity, affinity, and capacity. In some instances, Fv framework region (FR) residues of the human immunoglobulin are replaced by corresponding non-human residues. Furthermore, humanized antibodies can comprise residues which are found neither in the recipient antibody nor in the imported CDR or framework sequences. These modifications are made to further refine and optimize antibody performance. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin sequence. The humanized antibody optimally also will comprise at least a portion of an immunoglobulin constant region (Fc), typically that of a human immunoglobulin. For further details, see Jones et al., Nature, 321: 522-525, 1986; Reichmann et al., Nature, 332: 323-329, 1988; Presta, Curr. Op. Struct. Biol., 2: 593-596, 1992.

"Fully human" refers to an immunoglobulin, such as an antibody, where the whole molecule is of human origin or consists of an amino acid sequence identical to a human form of the antibody.

"Identity" as used herein refers to the subunit sequence identity between two polymeric molecules particularly between two amino acid molecules, such as, between two polypeptide molecules. When two amino acid sequences have the same residues at the same positions; e.g., if a position in each of two polypeptide molecules is occupied by an Arginine, then they are identical at that position. The identity or extent to which two amino acid sequences have the same residues at the same positions in an alignment is often expressed as a percentage. The identity between two amino acid sequences is a direct function of the number of matching or identical positions; e.g., if half (e.g., five positions in a polymer ten amino acids in length) of the positions in two sequences are identical, the two sequences are 50% identical; if 90% of the positions (e.g., 9 of 10), are matched or identical, the two amino acids sequences are 90% identical.

The term "immunoglobulin" or "Ig," as used herein is defined as a class of proteins, which function as antibodies. Antibodies expressed by B cells are sometimes referred to as the BCR (B cell receptor) or antigen receptor. The five members included in this class of proteins are IgA, IgG, IgM, IgD, and IgE. IgA is the primary antibody that is present in body secretions, such as saliva, tears, breast milk, gastrointestinal secretions and mucus secretions of the respiratory and genitourinary tracts. IgG is the most common circulating antibody. IgM is the main immunoglobulin produced in the primary immune response in most subjects. It is the most efficient immunoglobulin in agglutination, complement fixation, and other antibody responses, and is important in defense against bacteria and viruses. IgD is the immunoglobulin that has no known antibody function, but may serve as an antigen receptor. IgE is the immunoglobulin that mediates immediate hypersensitivity by causing release of mediators from mast cells and basophils upon exposure to allergen.

The term "immune response" as used herein is defined as a cellular response to an antigen that occurs when lymphocytes identify antigenic molecules as foreign and induce the formation of antibodies and/or activate lymphocytes to remove the antigen.

When "an immunologically effective amount," "an autoimmune disease-inhibiting effective amount," or "therapeutic amount" is indicated, the precise amount of the compositions of the present invention to be administered can be determined by a physician or researcher with consideration of individual differences in age, weight, tumor size, extent of infection or metastasis, and condition of the patient (subject).

As used herein, an "instructional material" includes a publication, a recording, a diagram, or any other medium of expression which can be used to communicate the usefulness of the compositions and methods of the invention. The instructional material of the kit of the invention may, for example, be affixed to a container which contains the nucleic acid, peptide, and/or composition of the invention or be shipped together with a container which contains the nucleic acid, peptide, and/or composition. Alternatively, the instructional material may be shipped separately from the container with the intention that the instructional material and the compound be used cooperatively by the recipient.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

The term "knockdown" as used herein refers to a decrease in gene expression of one or more genes.

The term "knockout" as used herein refers to the ablation of gene expression of one or more genes.

A "lentivirus" as used herein refers to a genus of the Retroviridae family. Lentiviruses are unique among the retroviruses in being able to infect non-dividing cells; they can deliver a significant amount of genetic information into the DNA of the host cell, so they are one of the most efficient methods of a gene delivery vector. HIV, SIV, and FIV are all examples of lentiviruses. Vectors derived from lentiviruses offer the means to achieve significant levels of gene transfer in vivo.

The term "limited toxicity" as used herein, refers to the peptides, polynucleotides, cells and/or antibodies of the invention manifesting a lack of substantially negative biological effects, anti-tumor effects, or substantially negative physiological symptoms toward a healthy cell, non-tumor cell, non-diseased cell, non-target cell or population of such cells either in vitro or in vivo.

By the term "modified" as used herein, is meant a changed state or structure of a molecule or cell of the invention. Molecules may be modified in many ways, including chemically, structurally, and functionally. Cells may be modified through the introduction of nucleic acids.

By the term "modulating," as used herein, is meant mediating a detectable increase or decrease in the level of a response in a subject compared with the level of a response in the subject in the absence of a treatment or compound, and/or compared with the level of a response in an otherwise identical but untreated subject. The term encompasses perturbing and/or affecting a native signal or response thereby mediating a beneficial therapeutic response in a subject, preferably, a human.

In the context of the present invention, the following abbreviations for the commonly occurring nucleic acid bases are used. "A" refers to adenosine, "C" refers to cytosine, "G" refers to guanosine, "T" refers to thymidine, and "U" refers to uridine.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein coding regions, in the same reading frame.

The term "overexpressed" tumor antigen or "overexpression" of a tumor antigen is intended to indicate an abnormal level of expression of a tumor antigen in a cell from a disease area like a solid tumor within a specific tissue or organ of the patient relative to the level of expression in a normal cell from that tissue or organ. Patients having solid tumors or a hematological malignancy characterized by overexpression of the tumor antigen can be determined by standard assays known in the art.

"Parenteral" administration of an immunogenic composition includes, e.g., subcutaneous (s.c.), intravenous (i.v.), intramuscular (i.m.), or intrasternal injection, or infusion techniques.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning technology and PCR™, and the like, and by synthetic means.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

By the term "specifically binds," as used herein with respect to an antibody, is meant an antibody which recognizes a specific antigen, but does not substantially recognize or bind other molecules in a sample. For example, an antibody that specifically binds to an antigen from one species may also bind to that antigen from one or more species. But, such cross-species reactivity does not itself alter the classification of an antibody as specific. In another example, an antibody that specifically binds to an antigen may also bind to different allelic forms of the antigen. However, such cross reactivity does not itself alter the classification of an antibody as specific. In some instances, the terms "specific binding" or "specifically binding," can be used in reference to the interaction of an antibody, a protein, or a peptide with a second chemical species, to mean that the interaction is dependent upon the presence of a particular structure (e.g., an antigenic determinant or epitope) on the chemical species; for example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody.

By the term "stimulation," is meant a primary response induced by binding of a stimulatory molecule (e.g., a TCR/CD3 complex) with its cognate ligand thereby mediating a signal transduction event, such as, but not limited to, signal transduction via the TCR/CD3 complex. Stimulation can mediate altered expression of certain molecules, such as downregulation of TGF-beta, and/or reorganization of cytoskeletal structures, and the like.

A "stimulatory molecule," as the term is used herein, means a molecule on a T cell that specifically binds with a cognate stimulatory ligand present on an antigen presenting cell.

A "stimulatory ligand," as used herein, means a ligand that when present on an antigen presenting cell (e.g., an aAPC, a dendritic cell, a B-cell, and the like) can specifically bind with a cognate binding partner (referred to herein as a "stimulatory molecule") on a T cell, thereby mediating a primary response by the T cell, including, but not limited to, activation, initiation of an immune response, proliferation, and the like. Stimulatory ligands are well-known in the art and encompass, inter alia, an MHC Class I molecule loaded with a peptide, an anti-CD3 antibody, a superagonist anti-CD28 antibody, and a superagonist anti-CD2 antibody.

The term "subject" is intended to include living organisms in which an immune response can be elicited (e.g., mammals). A "subject" or "patient," as used therein, may be a human or non-human mammal. Non-human mammals include, for example, livestock and pets, such as ovine, bovine, porcine, canine, feline and murine mammals. Preferably, the subject is human.

As used herein, a "substantially purified" cell is a cell that is essentially free of other cell types. A substantially purified cell also refers to a cell which has been separated from other cell types with which it is normally associated in its naturally occurring state. In some instances, a population of substantially purified cells refers to a homogenous population of cells. In other instances, this term refers simply to cell that have been separated from the cells with which they are naturally associated in their natural state. In some embodiments, the cells are cultured in vitro. In other embodiments, the cells are not cultured in vitro.

A "target site" or "target sequence" refers to a genomic nucleic acid sequence that defines a portion of a nucleic acid to which a binding molecule may specifically bind under conditions sufficient for binding to occur.

As used herein, the term "T cell receptor" or "TCR" refers to a complex of membrane proteins that participate in the activation of T cells in response to the presentation of antigen. The TCR is responsible for recognizing antigens bound to major histocompatibility complex molecules. TCR is composed of a heterodimer of an alpha (α) and beta (β) chain, although in some cells the TCR consists of gamma and delta (γ/δ) chains. TCRs may exist in alpha/beta and gamma/delta forms, which are structurally similar but have distinct anatomical locations and functions. Each chain is composed of two extracellular domains, a variable and constant domain. In some embodiments, the TCR may be modified on any cell composing a TCR, including, for example, a helper T cell, a cytotoxic T cell, a memory T cell, regulatory T cell, natural killer T cell, and gamma delta T cell.

The term "therapeutic" as used herein means a treatment and/or prophylaxis. A therapeutic effect is obtained by suppression, remission, or eradication of a disease state.

The term "transfected" or "transformed" or "transduced" as used herein refers to a process by which exogenous nucleic acid is transferred or introduced into the host cell. A "transfected" or "transformed" or "transduced" cell is one which has been transfected, transformed or transduced with exogenous nucleic acid. The cell includes the primary subject cell and its progeny.

To "treat" a disease as the term is used herein, means to reduce the frequency or severity of at least one sign or symptom of a disease or disorder experienced by a subject.

The phrase "under transcriptional control" or "operatively linked" as used herein means that the promoter is in the correct location and orientation in relation to a polynucleotide to control the initiation of transcription by RNA polymerase and expression of the polynucleotide.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. Examples of viral vectors include, but are not limited to, Sendai viral vectors, adenoviral vectors, adeno-associated virus vectors, retroviral vectors, lentiviral vectors, and the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention provides compositions and methods useful for treating heart disease and/or atherosclerosis. In certain embodiments, the invention includes a T cell engineered to express a chimeric antigen receptor (CAR)

specific for molecules associated with atherosclerotic diseases, including but not limited to, modified forms of low-density lipoprotein.

Aside from the recent CANTOS trial, several important findings shape the outlook on atherosclerosis as an inflammatory disease of the arterial wall and provide a rationale for the development of a novel cellular anti-inflammatory therapy. First, there is clear evidence that cytotoxic T cells play a significant role in the pathogenesis of atherosclerosis. Functional analysis of T cells from atherosclerotic lesions from human autopsies demonstrated a high density of CD4 Type 1 T helper cells (Th1), which produce significant quantities of interferon-gamma (IFNg). Similarly, human and mouse CD4 T cells are induced to proliferate and secrete type 1 cytokines whined presented with OxLDL peptides by antigen-presenting cells ex vivo and in vivo. Second, targeted blockade of OxLDL in hypercholesterolemic mice either through routine antibody infusion or constitutive hepatocyte-specific antibody secretion significantly reduced atherosclerotic lesion size and plaque inflammation. Third, there is emerging evidence that T regulatory cells (Tregs) play may play key atheroprotective role. Tregs are decreased in the peripheral blood of patients with atherosclerosis, possibly due to Treg plasticity and dysfunctional immunosuppression, suggesting that maintenance of local tolerance is important for disease prevention. Not surprisingly, Tregs have been shown to inhibit foam cell formation in vitro; additionally, in animal models, adoptive transfer of Tregs significantly increases IL-10 production while reducing both lesion size and IFNg production. Taken together, these data support the hypothesis that an OxLDL-targeted Treg adoptive cell therapy could provide therapeutic efficacy in the treatment of atherosclerosis through reductions in lesion size and plaque inflammation, along with a local decrease in Th1 responses.

Figure 1B:
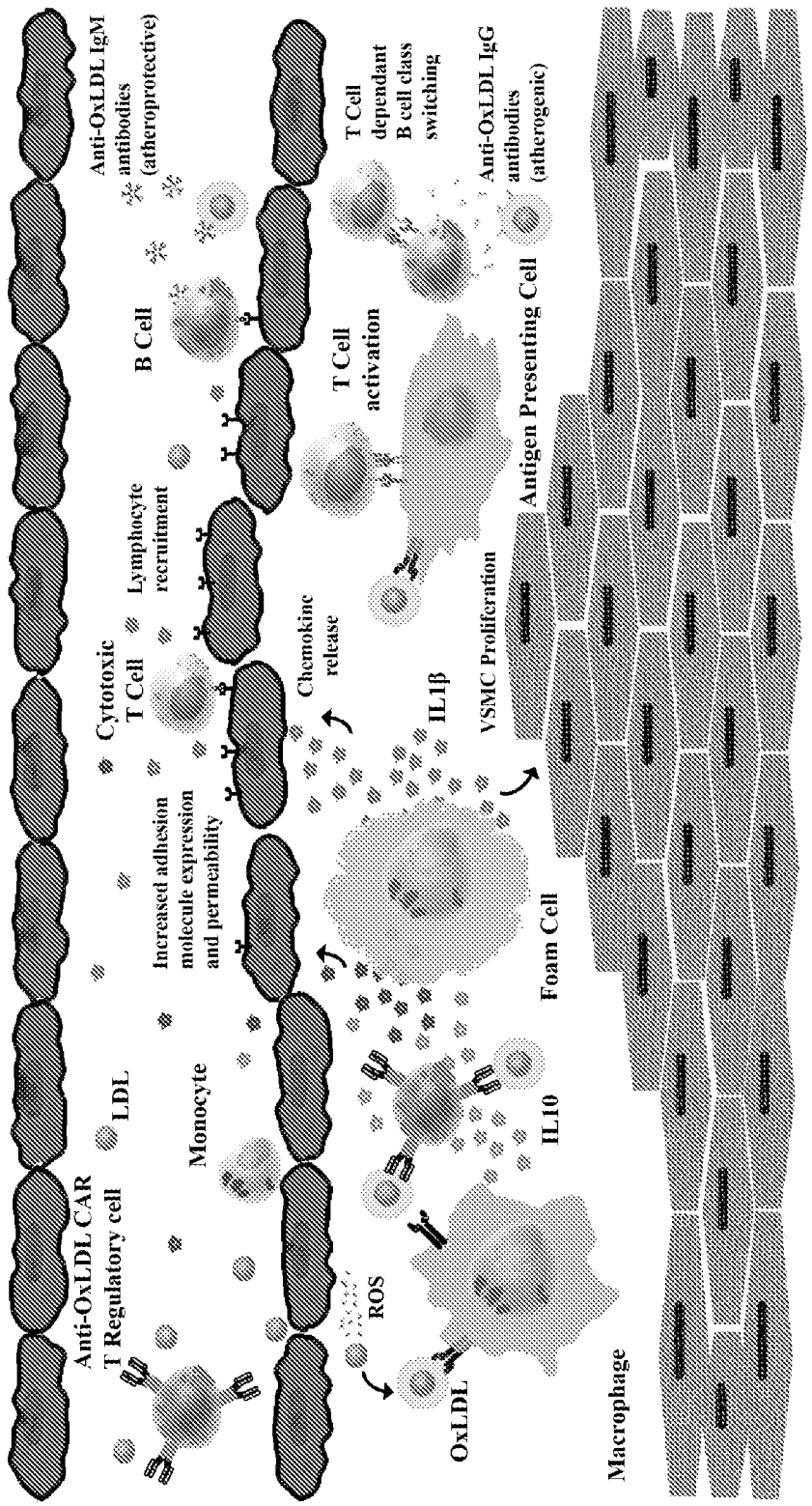

Herein, the redirection ability of CARs was combined with the anti-atherosclerotic benefits of Treg cells as an efficacious means to block the development of atherosclerosis. The application of CAR Treg cell therapies for inflammatory diseases, such as autoimmune colitis and multiple sclerosis, has previously been effective in murine models. A similar approach was developed herein for the immune dysregulation of atherosclerosis by designing a CAR targeting OxLDL. The CAR is specifically directed against the MDA-ApoB100 epitope, which is commonly found in human atherosclerotic plaques. FIG. 1B depicts the potential therapeutic mechanism of this therapy. Anti-OxLDL CAR Treg cells (OxCAR Tregs) were developed by transducing CD4 T cells with a bicistronic lentiviral vector that constitutively co-expresses FOXP3 and the anti-OxLDL CAR. The OxCAR Tregs were evaluated in vitro for specificity and suppressive capacity and in vivo for toxicity. These initial studies demonstrated the feasibility of developing OxLDL directed CAR Treg cells that can reduce the inflammation-associated with OxLDL, providing a new therapeutic option for atherosclerosis.

Therapeutic Targets

Various types of lipoproteins have been associated with increased risk of atherosclerotic disease. In one embodiment, the present invention describes a CAR specific to OxLDL/MDA-LDL (oxidized low-density lipoprotein/malondialdehyde low-density lipoprotein). Other embodiments of this technology include CARs specific for other lipoproteins and modified lipoproteins. These include, but are not limited to, Cu-oxidized LDL, advanced glycation endproducts (AGE-LDL), malondialdehyde-LDL, glycated-LDL, carbamylated LDL, desialylated LDL, apolipoprotein (a), and lipoprotein(a) (also called Lp-a). Another embodiment of this technology is targeting cells/markers specifically associated with or within atherosclerotic lesions, such as CD36, SR-A1 or LOX-1 on macrophage "foam cells", or CD47 on endothelial cells.

Oxidation Specific Epitopes

Epitopes present on modified lipoproteins can be targeted with the technology described herein. In one embodiment, the invention describes a CAR specific for the MDA/MDA-ApoB100 epitope present on OxLDL and MDA-LDL. Other embodiments of this technology include CARs specific to other epitopes present on modified forms of low density lipoprotein. This includes but is not limited to oxidized phosphatidylcholine containing oxidized phospholipids, such as 1-palmitoyl-2-(5-oxovaleroyl)-sn-glycero-3-phosphocholine (POVPC) or oxidized 1-palmitoyl-2-arachidonoyl-sn-glycero-3-phosphocholine (OxPAPC), 4-hydroxynonenal (HNE), oxidized cholesteryl ester (OxCE), and oxidized cardiolipin (OxCL).

Chimeric Antigen Receptor (CAR)

Certain aspects of the invention provide a CAR specific for modified low-density lipoprotein (LDL). The CAR of the invention comprises the following components: An antigen binding domain, a transmembrane domain, and an intracellular domain.

a) Antigen Binding Domain

In one embodiment, the CAR of the invention comprises an antigen binding domain that binds to a modified low-density lipoprotein (LDL). In one embodiment, the CAR of the invention comprises an antigen binding domain that binds to oxidized low-density lipoprotein (OxLDL). In one embodiment, the CAR of the invention comprises an antigen binding domain that binds to oxidized low-density lipoprotein/malondialdehyde low-density lipoprotein (OxLDL/MDA-LDL). In one embodiment, the CAR of the invention comprises an antigen binding domain that binds to the MDA/MDA-ApoB100 epitope present on OxLDL.

In certain embodiments, the antigen binding domain binds a modified LDL selected from the group consisting of modified ApoB100, Cu-oxidized LDL, advanced glycation endproducts LDL (AGE-LDL), malondiadehyde-LDL, glycated-LDL, carbamylated LDL, desialylated LDL, apolipoprotein (a), and lipoprotein(a) (also known as Lp-a), oxidized phosphatidylcholine containing oxidized phospholipids, 1-palmitoyl-2-(5-oxovaleroyl)-sn-glycero-3-phosphocholine (POVPC), oxidized 1-palmitoyl-2-arachidonoyl-sn-glycero-3-phosphocholine (OxPAPC), 4-hydroxynonenal (HNE), oxidized cholesteryl ester (OxCE), and oxidized cardiolipin (OxCL).

In another embodiment, the antigen binding domain of the invention comprises an antibody or fragment thereof, that binds to modified LDL. The antigen binding domain can be an scFv antibody that binds to modified LDL. The choice of antigen binding domain depends upon the type and number of antigens that are present on the surface of the low-density lipoprotein. For example, the antigen binding domain may be chosen to recognize a target lipid protein or cell surface marker associated with a particular disease state, e.g. atherosclerosis. Therefore another embodiment can be an scFv against vascular smooth muscle markers including SM22a, fibronectin, and collagen, which can reduce atherosclerotic related diseases such as thoracic/abdominal aortic aneurysms which are associated with transmural vascular inflammation.

The antigen binding domain can include any domain that binds to the antigen and may include, but is not limited to, a monoclonal antibody, a polyclonal antibody, a synthetic antibody, a human antibody, a humanized antibody, a non-human antibody, an scFv, and any fragment thereof. Thus, in one embodiment, the antigen binding domain portion comprises a mammalian antibody or a fragment thereof. In another embodiment, the antigen binding domain of the CAR is selected from the group consisting of an anti-modified LDL antibody or a fragment thereof.

In some instances, the antigen binding domain may be derived from the same species in which the CAR will ultimately be used. For example, for use in humans, the antigen binding domain of the CAR may comprise a human antibody as described elsewhere herein, or a fragment thereof.

The antigen binding domain may be operably linked to another domain of the CAR, such as the transmembrane domain or the intracellular domain, both described elsewhere herein, for expression in the cell. In one embodiment, a nucleic acid encoding the antigen binding domain is operably linked to a nucleic acid encoding a transmembrane domain and a nucleic acid encoding an intracellular domain.

The antigen binding domains described herein can be combined with any of the transmembrane domains described herein, any of the intracellular domains or cytoplasmic domains described herein, or any of the other domains described herein that may be included in the CAR.

In one embodiment of the invention, the antigen binding domain comprises SEQ ID NO: 6.

b) Transmembrane Domain

With respect to the transmembrane domain, the CAR is designed to comprise a transmembrane domain that connects the antigen binding domain of the CAR to the intracellular domain. In one embodiment, the transmembrane domain is naturally associated with one or more of the domains in the CAR. In some instances, the transmembrane domain can be selected or modified by amino acid substitution to avoid binding of such domains to the transmembrane domains of the same or different surface membrane proteins to minimize interactions with other members of the receptor complex.

The transmembrane domain may be derived either from a natural or from a synthetic source. Where the source is natural, the domain may be derived from any membrane-bound or transmembrane protein. Transmembrane regions of particular use in this invention may be derived from (i.e. comprise at least the transmembrane region(s) of) the alpha, beta or zeta chain of the T-cell receptor, CD28, CD8 alpha, ICOS, GITR, CD3 epsilon, CD45, CD4, CD5, CD8, CD9, CD16, CD22, CD33, CD37, CD64, CD80, CD86, CD134, CD137, CD154, Toll-like receptor 1 (TLR1), TLR2, TLR3, TLR4, TLR5, TLR6, TLR7, TLR8, and TLR9.

In one embodiment, the transmembrane domain may be synthetic, in which case it will comprise predominantly hydrophobic residues such as leucine and valine. Preferably a triplet of phenylalanine, tryptophan and valine will be found at each end of a synthetic transmembrane domain.

In one embodiment, the transmembrane domain comprises a CD8 alpha transmembrane domain. In another embodiment, the transmembrane domain comprises a CD28 domain. In yet another embodiment, the transmembrane domain comprises an ICOS domain. In still another embodiment, the transmembrane domain comprises a GITR domain. In one embodiment, the transmembrane domain comprises an amino acid sequence selected from the group consisting of SEQ ID NO: 10, SEQ ID NO: 11, SEQ ID NO: 13, and SEQ ID NO: 14.

The transmembrane domains described herein can be combined with any of the antigen binding domains described herein, any of the intracellular domains or cytoplasmic domains described herein, or any of the other domains described herein that may be included in the CAR.

The CAR of the invention may optionally include a hinge region. A variety of hinges can be employed, including but not limited to the Ig (immunoglobulin) hinge, and the CD8 alpha hinge. The transmembrane domain may be combined with any hinge domain and/or may comprise one or more transmembrane domains described herein.

Between the antigen binding domain and the transmembrane domain of the CAR, or between the intracellular domain and the transmembrane domain of the CAR, there may be incorporated a spacer domain. As used herein, the term "spacer domain" generally means any oligo- or polypeptide that functions to link the transmembrane domain to, either the extracellular domain or, the cytoplasmic domain in the polypeptide chain. A spacer domain may comprise up to 300 amino acids. In certain embodiments, the spacer domain comprises 2 to 25 amino acids. In certain embodiments, the spacer domain comprises 25 to 100 amino acids. In one embodiments, the spacer domain comprises 2 the amino acid sequence GS.

c) Intracellular Domain

The intracellular domain of the CAR is responsible for activation of the cell in which the CAR is expressed. Examples of an intracellular domain for use in the invention include, but are not limited to, the cytoplasmic portion of a surface receptor, co-stimulatory molecule, and any molecule that acts in concert to initiate signal transduction in the T cell, as well as any derivative or variant of these elements and any synthetic sequence that has the same functional capability.

The intracellular domain of the chimeric membrane protein is responsible for activation of at least one of the effector functions of the T cell. While usually the entire intracellular domain can be employed, in many cases it is not necessary to use the entire chain. To the extent that a truncated portion of the intracellular domain is used, such truncated portion may be used in place of the intact chain as long as it transduces the effector function signal. The intracellular domain includes any truncated portion of the intracellular domain sufficient to transduce the effector function signal.

In one embodiment, the intracellular domain of the CAR includes any portion of one or more co-stimulatory molecules, such as at least one signaling domain from CD8, CD27, CD28, ICOS, 4-IBB, GITR, CD2, PD-1, any derivative or variant thereof, any synthetic sequence thereof that has the same functional capability, and any combination thereof.

Other examples of the intracellular domain include a fragment or domain from one or more molecules or receptors including, but not limited to, TCR, CD3 gamma, CD3 delta, CD3 epsilon, CD86, common FcR gamma, FcR beta (Fc Epsilon Rib), CD79a, CD79b, Fcgamma RIIa, DAP10, DAP 12, T cell receptor (TCR), CD8, CD27, CD28, 4-1BB (CD137), OX9, OX40, CD30, CD40, PD-1, ICOS, a KIR family protein, lymphocyte function-associated antigen-1 (LFA-1), CD2, CD7, LIGHT, NKG2C, B7-H3, a ligand that specifically binds with CD83, CDS, ICAM-1, GITR, BAFFR, HVEM (LIGHTR), SLAMF7, NKp80 (KLRF1), CD127, CD 160, CD19, CD4, CD8alpha, CD8beta, IL2R beta, IL2R gamma, IL7R alpha, ITGA4, VLA1, CD49a, ITGA4, IA4, CD49D, ITGA6, VLA-6, CD49f, ITGAD, CD1 Id, ITGAE, CD 103, ITGAL, CD 11 a, LFA-1, ITGAM, CD lib, ITGAX, CD 11c, ITGB1, CD29, ITGB2, CD 18, LFA-1, ITGB7, TNFR2, TRANCE/RANKL, DNAM1 (CD226), SLAMF4 (CD244, 2B4), CD84, CD 96 (Tactile), CEACAM1, CRT AM, Ly9 (CD229), CD160

(BY55), PSGL1, CD100 (SEMA4D), CD69, SLAMF6 (NTB-A, Ly108), SLAM (SLAMF1, CD150, IPO-3), BLAME (SLAMF8), SELPLG (CD 162), LTBR, LAT, GADS, SLP-76, PAG/Cbp, NKp44, NKp30, NKp46, NKG2D, Toll-like receptor 1 (TLR1), TLR2, TLR3, TLR4, TLR5, TLR6, TLR7, TLR8, TLR9, other co-stimulatory molecules described herein, any derivative, variant, or fragment thereof, any synthetic sequence of a co-stimulatory molecule that has the same functional capability, and any combination thereof.

In one embodiment, the intracellular domain is a CD28 domain. In one embodiment, the intracellular domain is a 4-1BB domain. In one embodiment, the intracellular domain is an ICOS domain. In one embodiment, the intracellular domain is a GITR domain. In one embodiment, the intracellular domain is a CD2 domain. In one embodiment, the intracellular domain comprises an amino acid sequence selected from the group consisting of SEQ ID NO: 15, SEQ ID NO: 18, SEQ ID NO: 20, SEQ ID NO: 22, SEQ ID NO: 23.

The intracellular domains described herein can be combined with any of the antigen binding domains described herein, any of the transmembrane domains described herein, or any of the other domains described herein that may be included in the CAR.

The intracellular domain may also comprise a CD3 zeta domain. In one embodiment, the CD3 zeta domain comprises SEQ ID NO: 24. In one embodiment, the CD3 zeta domain comprises SEQ ID NO: 26. In certain embodiments, the intracellular domain comprises a 4-1BB domain and a CD3 zeta domain. In certain embodiments, the intracellular domain comprises a CD28 domain and a CD3 zeta domain. In certain embodiments, the intracellular domain comprises an ICOS domain and a CD3 zeta domain. In certain embodiments, the intracellular domain comprises a GITR domain and a CD3 zeta domain. In certain embodiments, the intracellular domain comprises a CD2 domain and a CD3 zeta domain.

d) Modified LDL CARs

In one embodiment, the CAR comprises an antigen binding domain that binds OxLDL, a CD8a hinge domain, a CD28 transmembrane domain, a CD28 intracellular domain, and a CD3 zeta domain. In one embodiment, the CAR comprises an antigen binding domain that binds OxLDL, a CD8a hinge domain, a CD8a transmembrane domain, a 4-1BB intracellular domain, and a CD3 zeta domain. In one embodiment, the CAR comprises an antigen binding domain that binds OxLDL, a CD8a hinge domain, an ICOS transmembrane domain, an ICOS intracellular domain, and a CD3 zeta domain. In one embodiment, the CAR comprises an antigen binding domain that binds OxLDL, a CD8a hinge domain, a GITR transmembrane domain, a GITR intracellular domain, and a CD3 zeta domain. In one embodiment, the CAR comprises an antigen binding domain that binds OxLDL, a CD8a hinge domain, a CD8a transmembrane domain, a CD2 intracellular domain, and a CD3 zeta domain. In one embodiment, the CAR comprises the amino acid sequence of SEQ ID NO: 1. In one embodiment, the CAR comprises the amino acid sequence of SEQ ID NO: 2. In one embodiment, the CAR comprises the amino acid sequence of SEQ ID NO: 3. In one embodiment, the CAR comprises the amino acid sequence of SEQ ID NO: 4. In one embodiment, the CAR comprises the amino acid sequence of SEQ ID NO: 5.

Tolerable variations of the CAR sequences will be known to those of skill in the art. For example, in some embodiments the CAR comprises an amino acid sequence that has at least 60%, at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% sequence identity to any of the amino acid sequences set forth in SEQ ID NOs: 1-5.

The invention also includes isolated nucleic acids encoding any of the CARs as well as genetically modified T cells comprising nucleic acids encoding any of the CARs.

In various embodiments, the following sequences can be used to construct the CARs of the present invention:

```
2D03-28z CAR (SEQ ID NO: 1):
MALPVTALLLPLALLLHAARPGSQSVLTQPPSASGTPGQRVTISCSGSNT

NIGKNYVSWYQQLPGTAPKLLIYANSNRPSGVPDRFSGSKSGTSASLAIS

GLRSEDEADYYCASWDASLNGWVFGGGTKLTVLGGGSGGGGSGGGGSEV

QLLESGGGLVQPGGSLRLSCAASGFTFSNAWMSWVRQAPGKGLEWVSSIS

VGGHRTYYADSVKGRSTISRDNSKNTLYLQMNSLRAEDTAVYYCARIRVG

PSGGAFDYWGQGTLVTVSSSGTTTPAPRPPTPAPTIASQPLSLRPEACRP

AAGGAVHTRGLDFACDFWVLVVVGGVLACYSLLVTVAFIIFWVRSKRSRL

LHSDYMNMTPRRPGPTRKHYQPYAPPRDFAAYRSRVKFSRSADAPAYKQG

QNQLYNELNLGRREEYDVLDKRRGRDPEMGGKPRRKNPQEGLYNELQKDK

MAEAYSEIGMKGERRRGKGHDGLYQGLSTATKDTYDALHMQALPPR

2D03-BBz CAR (SEQ ID NO: 2):
MALPVTALLLPLALLLHAARPGSQSVLTQPPSASGTPGQRVTISCSGSNT

NIGKNYVSWYQQLPGTAPKLLIYANSNRPSGVPDRFSGSKSGTSASLAIS

GLRSEDEADYYCASWDASLNGWVFGGGTKLTVLGGGSGGGGSGGGGSEV

QLLESGGGLVQPGGSLRLSCAASGFTFSNAWMSWVRQAPGKGLEWVSSIS

VGGHRTYYADSVKGRSTISRDNSKNTLYLQMNSLRAEDTAVYYCARIRVG

PSGGAFDYWGQGTLVTVSSSGTTTPAPRPPTPAPTIASQPLSLRPEACRP

AAGGAVHTRGLDFACDIYIWAPLAGTCGVLLLSLVITLYCKRGRKKLLYI

FKQPFMRPVQTTQEEDGCSCRFPEEEEGGCELRVKFSRSADAPAYKQGQN

QLYNELNLGRREEYDVLDKRRGRDPEMGGKPRRKNPQEGLYNELQKDKMA

EAYSEIGMKGERRRGKGHDGLYQGLSTATKDTYDALHMQALPPR

2D03-ICOSz CAR (SEQ ID NO: 3):
MALPVTALLLPLALLLHAARPGSQSVLTQPPSASGTPGQRVTISCSGSNT

NIGKNYVSWYQQLPGTAPKLLIYANSNRPSGVPDRFSGSKSGTSASLAIS

GLRSEDEADYYCASWDASLNGWVFGGGTKLTVLGGGSGGGGSGGGGSEV

QLLESGGGLVQPGGSLRLSCAASGFTFSNAWMSWVRQAPGKGLEWVSSIS

VGGHRTYYADSVKGRSTISRDNSKNTLYLQMNSLRAEDTAVYYCARIRVG

PSGGAFDYWGQGTLVTVSSSGTTTPAPRPPTPAPTIASQPLSLRPEACRP

AAGGAVHTRGLDFACDFEFWLPIGCAAFVVVCILGCILICWLTKKKYSSS

VHDPNGEYMFMRAVNTAKKSRLTDVTLTSRVKFSRSADAPAYKQGQNQLY

NELNLGRREEYDVLDKRRGRDPEMGGKPRRKNPQEGLYNELQKDKMAEAY

SEIGMKGERRRGKGHDGLYQGLSTATKDTYDALHMQALPPR
```

2D03-GITRz CAR (SEQ ID NO: 4):
MALPVTALLLPLALLLHAARPGSQSVLTQPPSASGTPGQRVTISCSGSNT

NIGKNYVSWYQQLPGTAPKLLIYANSNRPSGVPDRFSGSKSGTSASLAIS

GLRSEDEADYYCASWDASLNGWVFGGGTKLTVLGGGGSGGGGSGGGGSEV

QLLESGGGLVQPGGSLRLSCAASGFTFSNAWMSWVRQAPGKGLEWVSSIS

VGGHRTYYADSVKGRSTISRDNSKNTLYLQMNSLRAEDTAVYYCARIRVG

PSGGAFDYWGQGTLVTVSSSGTTTPAPRPPTPAPTIASQPLSLRPEACRP

AAGGAVHTRGLDFACDILGWLTVVLLAVAACVLLLTSAQLGLHIWQLRSQ

CMWPRETQLLLEVPPSTEDARSCQFPEEERGERSAEEKGRLGDLWVLRVK

FSRSADAPAYKQGQNQLYNELNLGRREEYDVLDKRRGRDPEMGGKPRRKN

PQEGLYNELQKDKMAEAYSEIGMKGERRRGKGHDGLYQGLSTATKDTYDA

LHMQALPPR

2D03-CD2z CAR (SEQ ID NO: 5):
MALPVTALLLPLALLLHAARPGSQSVLTQPPSASGTPGQRVTISCSGSNT

NIGKNYVSWYQQLPGTAPKLLIYANSNRPSGVPDRFSGSKSGTSASLAIS

GLRSEDEADYYCASWDASLNGWVFGGGTKLTVLGGGGSGGGGSGGGGSEV

QLLESGGGLVQPGGSLRLSCAASGFTFSNAWMSWVRQAPGKGLEWVSSIS

VGGHRTYYADSVKGRSTISRDNSKNTLYLQMNSLRAEDTAVYYCARIRVG

PSGGAFDYWGQGTLVTVSSSGTTTPAPRPPTPAPTIASQPLSLRPEACRP

AAGGAVHTRGLDFACDIYIWAPLAGTCGVLLLSLVITLYCTKRKKQRSRR

NDEELETRAHRVATEERGRKPHQIPASTPQNPATSQEIPPPPPGHRSQAP

SHRPPPPGHRVQHQPQKRPPAPSGTQVHQQKGPPLPRPRVQPKPPHGAAE

NSLSPSSNRVKFSRSADAPAYKQGQNQLYNELNLGRREEYDVLDKRRGRD

PEMGGKPRRKNPQEGLYNELQKDKMAEAYSEIGMKGERRRGKGHDGLYQG

LSTATKDTYDALHMQALPPR

2D03 scFv (SEQ ID NO: 6):
QSVLTQPPSASGTPGQRVTISCSGSNTNIGKNYVSWYQQLPGTAPKLLIY

ANSNRPSGVPDRFSGSKSGTSASLAISGLRSEDEADYYCASWDASLNGWV

FGGGTKLTVLGGGGSGGGGSGGGGSEVQLLESGGGLVQPGGSLRLSCAAS

GFTFSNAWMSWVRQAPGKGLEWVSSISVGGHRTYYADSVKGRSTISRDNS

KNTLYLQMNSLRAEDTAVYYCARIRVGPSGGAFDYWGQGTLVTVSS

CD8a Leader (SEQ ID NO: 7):
MALPVTALLLPLALLLHAARP

CD8a Leader (SEQ ID NO: 33):
ATGGCCTTACCAGTGACCGCCTTGCTCCTGCCGCTGGCCTTGCTGCTCCA

CGCCGCCAGGCCG

CD8 alpha hinge (SEQ ID NO: 8):
TTTPAPRPPTPAPTIASQPLSLRPEACRPAAGGAVHTRGLDFACD

CD8 alpha hinge (SEQ ID NO: 9):
ACCACGACGCCAGCGCCGCGACCACCAACACCGGCGCCCACCATCGCGTC

GCAGCCCCTGTCCCTGCGCCCAGAGGCGTGCCGGCCAGCGGCGGGGGGCG

CAGTGCACACGAGGGGGCTGGACTTCGCCTGTGAT

CD28 transmembrane domain: (SEQ ID NO: 10):
FWVLVVVGGVLACYSLLVTVAFII

CD28 transmembrane domain: (SEQ ID NO: 34):
TTTTGGGTGCTGGTGGTGGTTGGTGGAGTCCTGGCTTGCTATAGCTTGCT

AGTAACAGTGGCCTTTATTATT

CD8a transmembrane domain (SEQ ID NO: 11):
IYIWAPLAGTCGVLLLSLVITLYC

CD8 transmembrane domain (SEQ ID NO: 12):
ATCTACATCTGGGCGCCCTTGGCCGGGACTTGTGGGGTCCTTCTCCTGTC

ACTGGTTATCACCCTTTACTGC

ICOS transmembrane domain (SEQ ID NO: 13):
FWLPIGCAAFVVVCILGCILICWL

ICOS transmembrane domain (SEQ ID NO: 35):
TTCTGGTTACCCATAGGATGTGCAGCCTTTGTTGTAGTCTGCATTTTGGG

ATGCATACTTATTTGTTGGCTT

GITR transmembrane domain (SEQ ID NO: 14):
LGWLTVVLLAVAACVLLLTSAQLGL

GITR transmembrane domain (SEQ ID NO: 36):
CTGGGCTGGCTGACCGTGGTGCTGCTGGCTGTGGCTGCTTGTGTGCTGCT

GCTGACAAGCGCTCAGCTGGGCCTG

CD28 intracellular domain (SEQ ID NO: 15):
FWVRSKRSRLLHSDYMNMTPRRPGPTRKHYQPYAPPRDFAAYRS CD28 intracellular domain (SEQ ID NO: 17):
TTCTGGGTGAGGAGTAAGAGGAGCAGGCTCCTGCACAGTGACTACATGAA

CATGACTCCCCGCCGCCCCGGGCCCACCCGCAAGCATTACCAGCCCTATG

CCCCACCACGCGACTTCGCAGCCTATCGCTCC 4-1BB intracellular domain (SEQ ID NO: 18):
KRGRKKLLYIFKQPFMRPVQTTQEEDGCSCRFPEEEEGGCEL 4-1BB intracellular domain (SEQ ID NO: 19):
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAACTG

ICOS intracellular domain (SEQ ID NO: 20):
TKKKYSSSVHDPNGEYMFMRAVNTAKKSRLTDVTL

ICOS intracellular domain (SEQ ID NO: 21):
ACAAAAAAGAAGTATTCATCCAGTGTGCACGACCCTAACGGTGAATACAT

GTTCATGAGAGCAGTGAACACAGCCAAAAAATCCAGACTCACAGATGTGA

CCCTA

GITR intracellular domain (SEQ ID NO: 22):
HIWQLRSQCMWPRETQLLLEVPPSTEDARSCQFPEEERGERSAEEKGRLG

DLWVL

GITR intracellular domain (SEQ ID NO: 37):
CACATCTGGCAGCTGAGAAGCCAGTGCATGTGGCCCAGAGAGACACAGCT

GCTGCTGGAAGTGCCCCCCAGCACCGAGGATGCCAGAAGCTGCCAGTTCC

CCGAGGAAGAGAGAGGCGAGAGATCCGCCGAGGAAAAGGGCAGACTGGGC

GACCTGTGGGTGCTG

CD2 intracellular domain (SEQ ID NO: 23):
TKRKKQRSRRNDEELETRAHRVATEERGRKPHQIPASTPQNPATSQUPPP

PPGHRSQAPSHRPPPPGHRVQHQPQKRPPAPSGTQVHQQKGPPLPRPRVQ

PKPPHGAAENSLSPSSN

CD2 intracellular domain (SEQ ID NO: 38):
ACCAAAAGGAAAAAACAGAGGAGTCGGAGAAATGATGAGGAGCTGGAGAC
AAGAGCCCACAGAGTAGCTACTGAAGAAAGGGGCCGGAAGCCCCACCAAA
TTCCAGCTTCAACCCCTCAGAATCCAGCAACTTCCCAACATCCTCCTCCA
CCACCTGGTCATCGTTCCCAGGCACCTAGTCATCGTCCCCCGCCTCCTGG
ACACCGTGTTCAGCACCAGCCTCAGAAGAGGCCTCCTGCTCCGTCGGGCA
CACAAGTTCACCAGCAGAAAGGCCCGCCCCTCCCCAGACCTCGAGTTCAG
CCAAAACCTCCCCATGGGGCAGCAGAAAACTCATTGTCCCCTTCCTCTAA
T CD3 zeta domain (SEQ ID NO: 24):
RVKFSRSADAPAYKQGQNQLYNELNLGRREEYDVLDKRRGRDPEMGGKPR
RKNPQEGLYNELQKDKMAEAYSEIGMKGERRRGKGHDGLYQGLSTATKDT
YDALHMQALPPR CD3 zeta domain (SEQ ID NO: 25):
AGAGTGAAGTTCAGCAGGAGCGCAGACGCCCCCGCGTACAAGCAGGGCCA
GAACCAGCTCTATAACGAGCTCAATCTAGGACGAAGAGAGGAGTACGATG
TTTTGGACAAGAGACGTGGCCGGGACCCTGAGATGGGGGGAAAGCCGAGA
AGGAAGAACCCTCAGGAAGGCCTGTACAATGAACTGCAGAAAGATAAGAT
GGCGGAGGCCTACAGTGAGATTGGGATGAAAGGCGAGCGCCGGAGGGGCA
AGGGGCACGATGGCCTTTACCAGGGTCTCAGTACAGCCACCAAGGACACC
TACGACGCCCTTCACATGCAGGCCCTGCCCCCTCGC CD3 zeta domain (NCBI Reference
Sequence NM_000734.3) (SEQ ID NO: 26)
RVKFSRSADAPAYQQGQNQLYNELNLGRREEYDVLDKRRGRDPEMGGKPR
RKNPQEGLYNELQKDKMAEAYSEIGMKGERRRGKGHDGLYQGLSTATKDT
YDALHMQALPPR CD3 zeta domain (NCBI Reference
Sequence NM_000734.3) (SEQ ID NO: 27)
AGAGTGAAGTTCAGCAGGAGCGCAGACGCCCCCGCGTACCAGCAGGGCCA
GAACCAGCTCTATAACGAGCTCAATCTAGGACGAAGAGAGGAGTACGATG
TTTTGGACAAGAGACGTGGCCGGGACCCTGAGATGGGGGGAAAGCCGAGA
AGGAAGAACCCTCAGGAAGGCCTGTACAATGAACTGCAGAAAGATAAGAT
GGCGGAGGCCTACAGTGAGATTGGGATGAAAGGCGAGCGCCGGAGGGGCA
AGGGGCACGATGGCCTTTACCAGGGTCTCAGTACAGCCACCAAGGACACC
TACGACGCCCTTCACATGCAGGCCCTGCCCCCTCGC FOXP3 (SEQ ID NO: 28):
MPNPRPGKPSAPSLALGPSPGASPSWRAAPKASDLLGARGPGGTFQGRDL
RGGAHASSSSLNPMPPSQLQLPTLPLVMVAPSGARLGPLPHLQALLQDRP
HFMHQLSTVDAHARTPVLQVHPLESPAMISLTPPTTATGVFSLKARPGLP
PGINVASLEWVSREPALLCTFPNPSAPRKDSTLSAVPQSSYPLLANGVCK
WPGCEKVFEEPEDFLKHCQADHLLDEKGRAQCLLQREMVQSLEQQLVLEK
EKLSAMQAHLAGKMALTKASSVASSDKGSCCIVAAGSQGPVVPAWSGPRE
APDSLFAVRRHLWGSHGNSTFPEFLHNMDYFKFHNMRPPFTYATLIRWAI
LEAPEKQRTLNEIYHWFTRMFAFFRNHPATWKNAIRHNLSLHKCFVRVES
EKGAVWTVDELEFRKKRSQRPSRCSNPTPGP FOXP3 (SEQ ID NO: 39):
ATGCCCAACCCCAGGCCTGGCAAGCCCTCGGCCCCTTCCTTGGCCCTTGG
CCCATCCCCAGGAGCCTCGCCCAGCTGGAGGGCTGCACCCAAAGCCTCAG
ACCTGCTGGGGGCCCGGGGCCCAGGGGGAACCTTCCAGGGCCGAGATCTT
CGAGGCGGGGCCCATGCCTCCTCTTCTTCCTTGAACCCCATGCCACCATC
GCAGCTGCAGCTGCCCACACTGCCCCTAGTCATGGTGGCACCCTCCGGGG
CACGGCTGGGCCCCTTGCCCCACTTACAGGCACTCCTCCAGGACAGGCCA
CATTTCATGCACCAGCTCTCAACGGTGGATGCCCACGCCCGGACCCCTGT
GCTGCAGGTGCACCCCCTGGAGAGCCCAGCCATGATCAGCCTCACACCAC
CCACCACCGCCACTGGGGTCTTCTCCCTCAAGGCCCGGCCTGGCCTCCCA
CCTGGGATCAACGTGGCCAGCCTGGAATGGGTGTCCAGGGAGCCGGCACT
GCTCTGCACCTTCCCAAATCCCAGTGCACCCAGGAAGGACAGCACCCTTT
CGGCTGTGCCCCAGAGCTCCTACCCACTGCTGGCAAATGGTGTCTGCAAG
TGGCCCGGATGTGAGAAGGTCTTCGAAGAGCCAGAGGACTTCCTCAAGCA
CTGCCAGGCGGACCATCTTCTGGATGAGAAGGGCAGGGCACAATGTCTCC
TCCAGAGAGAGATGGTACAGTCTCTGGAGCAGCAGCTGGTGCTGGAGAAG
GAGAAGCTGAGTGCCATGCAGGCCCACCTGGCTGGGAAAATGGCACTGAC
CAAGGCTTCATCTGTGGCATCATCCGACAAGGGCTCCTGCTGCATCGTAG
CTGCTGGCAGCCAAGGCCCTGTCGTCCCAGCCTGGTCTGGCCCCCGGGAG
GCCCCTGACAGCCTGTTTGCTGTgCGGAGGCACCTGTGGGGTAGCCATGG
AAACAGCACATTCCCAGAGTTCCTCCACAACATGGACTACTTCAAGTTCC
ACAACATGCGACCCCCTTTCACCTACGCCACGCTCATCCGCTGGGCCATC
CTGGAGGCTCCAGAGAAGCAGCGGACACTCAATGAGATCTACCACTGGTT
CACACGCATGTTTGCCTTCTTCAGAAACCATCCTGCCACCTGGAAGAACG
CCATCCGCCACAACCTGAGTCTGCACAAGTGCTTTGTGCGGGTGGAGAGC
GAGAAGGGGGCTGTGTGGACCGTGGATGAGCTGGAGTTCCGCAAGAAACG
GAGCCAGAGGCCCAGCAGGTGTTCCAACCCTACACCTGGCCCC

P2A (SEQ ID NO: 29):
GSGATNFSLLKQAGDVEENPGP

P2A (SEQ ID NO: 40):
GGAAGCGGAGCTACTAACTTCAGCCTGCTGAAGCAGGCTGGAGACGTGGA
GGAGAACCCTGGACCT

IL10 (SEQ ID NO: 30):
MHSSALLCCLVLLTGVRASPGQGTQSENSCTHFPGNLPNMLRDLRDAFSR
VKTFFQMKDQLDNLLLKESLLEDFKGYLGCQALSEMIQFYLEEVMPQAEN
QDPDIKAHVNSLGENLKTLRLRLRRCHRFLPCENKSKAVEQVKNAFNKLQ
EKGIYKAMSEFDIFINYIEAYMTMKIRN

IL10 (SEQ ID NO: 16):
ATGCACAGCTCAGCACTGCTCTGTTGCCTGGTCCTCCTGACTGGGGTGAG
GGCCAGCCCAGGCCAGGGCACCCAGTCTGAGAACAGCTGCACCCACTTCC
CAGGCAACCTGCCTAACATGCTTCGAGATCTCCGAGATGCCTTCAGCAGA
GTGAAGACTTTCTTTCAAATGAAGGATCAGCTGGACAACTTGTTGTTAAA
GGAGTCCTTGCTGGAGGACTTTAAGGGTTACCTGGGTTGCCAAGCCTTGT

-continued

CTGAGATGATCCAGTTTTACCTGGAGGAGGTGATGCCCCAAGCTGAGAAC

CAAGACCCAGACATCAAGGCGCATGTGAACTCCCTGGGGGAGAACCTGAA

GACCCTCAGGCTGAGGCTACGGCGCTGTCATCGATTTCTTCCCTGTGAAA

ACAAGAGCAAGGCCGTGGAGCAGGTGAAGAATGCCTTTAATAAGCTCCAA

GAGAAAGGCATCTACAAAGCCATGAGTGAGTTTGACATCTTCATCAACTA

CATAGAAGCCTACATGACAATGAAGATACGAAAC

T2A (SEQ ID NO: 31):
GSGEGRGSLLTCGDVEENPGP

T2A (SEQ ID NO: 32):
GGAAGCGGAGAGGGCAGAGGAAGTCTGCTAACATGCGGTGACGTCGAGGA

GAATCCTGGACCT

Methods of Treatment

As demonstrated herein, anti-modified LDL (OxLDL) CAR T regulatory cells reverse the pro-inflammatory response at sites of plaque formation and high modified LDL deposition. The technology developed in this work is useful for therapeutic treatments for atherosclerosis. For example, in certain embodiments, patients with a significant risk factor for cardiovascular disease from atherosclerosis (prior MI/stroke/family history) are subjected to leukapheresis, and Treg cells isolated (or induced), and then transduced with lentivirus to express anti-modified LDL CAR. These cells are returned to the patient and reverse and or prevent atherosclerosis and/or heart disease. Although other novel immunotherapies are currently being considered, as demonstrated by the current trial using anti-OxLDL IgM antibodies for metabolic lipid diseases (NCT02707211), there are many limits to antibody therapy since it requires continual infusions and increased risk for allergic reactions. On the other hand, CAR T regulatory cell treatment could be a one-time infusion with lifelong benefits through the development of modified LDL-specific memory Treg cells. The product manufacturing for CAR T regulatory cells is virtually identical to the manufacturing procedure for CAR T cytotoxic cells. As cardiovascular disease is the leading cause of death worldwide and in the United States, the patient population that this treatment could help is immense. This treatment could be provided as a prophylactic or as a treatment of extreme cases of atherosclerosis.

The utilization of anti-inflammatory CAR Treg cells to reduce atherosclerotic plaques is a novel innovation and is the first instance of cellular immunotherapy development for cardiovascular disease. Most therapies for atherosclerosis target fat deposition or general inflammation; this therapy is the first active immune-mediated treatment for atherosclerosis and is a major step towards shifting treatment focus to inflammatory pathways.

In one aspect, the invention includes a method for treating heart disease and/or atherosclerosis in a subject in need thereof. The method comprises administering to the subject a T cell genetically modified to express a chimeric antigen receptor (CAR). The CAR comprises an antigen binding domain specific for modified low-density lipoprotein (OxLDL), a transmembrane domain, and an intracellular domain.

The methods of the invention should be construed to treat any type of heart disease, or atherosclerosis, or Atherosclerotic Cardiovascular Disease (ASCVD) known to one of ordinary skill in the art.

In certain embodiments of the invention, the cell is a regulatory T (Treg) cell. The Treg can be obtained by any means known to one of ordinary skill in the art. For example, naturally occurring Tregs (e.g. $CD4^+$ $CD25^+$ T cells) can be isolated from a subject. Additionally, a non-Treg T cell can be induced into Treg cell, e.g. display a Treg phenotype. For example, a $CD4^+$ T cell can be converted into a Treg cell. One non-limiting method of inducing a Treg phenotype is by stimulating the T cell in the presence of TGF-β and IL-10. Another method is using an integrated inducible element, in which Treg inducing elements, such as FOXP3 or IL10 are expressed upon T cell binding to antigen/and or expression with a small molecule. For example, the SynNotch system allows for an "on-off" switch based on antigen binding. The invention should be construed to include any type of Treg cell including but not limited to induced Tregs (iTregs) and peripheral Tregs (pTregs). Methods for inducing Tregs and expanding Tregs can be found in WO2009155477 and WO2011126806, contents of which are incorporated in their entireties herein. In certain embodiments of the invention, the cell is an autologous T cell. In certain embodiments, administering comprises adoptive cell transfer.

In certain embodiments, the methods of the invention serve to reverse the pro-inflammatory response at sites of plaque formation and/or high modified LDL deposition.

The compositions and methods described herein can be used in combination with other treatments, including but not limited to therapeutic anti-inflammatory antibodies, lipid-lowering antibodies, anti-inflammatory cytokines, inducible systems for secretion of antibodies and/or cytokines, and systems for inducible expression of cell surface receptors or reducing enzymes, such as catalase, to return modified LDL to its native state in the plaque milieu, and combinations thereof.

Introduction of Nucleic Acids

Methods of introducing nucleic acids into a cell include physical, biological and chemical methods. Physical methods for introducing a polynucleotide, such as RNA, into a host cell include calcium phosphate precipitation, lipofection, particle bombardment, microinjection, electroporation, and the like. RNA can be introduced into target cells using commercially available methods which include electroporation (Amaxa Nucleofector-II (Amaxa Biosystems, Cologne, Germany)), (ECM 830 (BTX) (Harvard Instruments, Boston, Mass.) or the Gene Pulser II (BioRad, Denver, Colo.), Multiporator (Eppendort, Hamburg Germany). RNA can also be introduced into cells using cationic liposome mediated transfection using lipofection, using polymer encapsulation, using peptide mediated transfection, or using biolistic particle delivery systems such as "gene guns" (see, for example, Nishikawa, et al. Hum Gene Ther., 12(8):861-70 (2001).

Biological methods for introducing a polynucleotide of interest into a host cell include the use of DNA and RNA vectors. Viral vectors, and especially retroviral vectors, have become the most widely used method for inserting genes into mammalian, e.g., human cells. Other viral vectors can be derived from lentivirus, poxviruses, herpes simplex virus I, adenoviruses and adeno-associated viruses, and the like. See, for example, U.S. Pat. Nos. 5,350,674 and 5,585,362.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

Lipids suitable for use can be obtained from commercial sources. For example, dimyristyl phosphatidylcholine ("DMPC") can be obtained from Sigma, St. Louis, MO; dicetyl phosphate ("DCP") can be obtained from K & K Laboratories (Plainview, NY); cholesterol ("Choi") can be obtained from Calbiochem-Behring; dimyristyl phosphatidylglycerol ("DMPG") and other lipids may be obtained from Avanti Polar Lipids, Inc. (Birmingham, AL). Stock solutions of lipids in chloroform or chloroform/methanol can be stored at about −20° C. Chloroform is used as the only solvent since it is more readily evaporated than methanol. "Liposome" is a generic term encompassing a variety of single and multilamellar lipid vehicles formed by the generation of enclosed lipid bilayers or aggregates. Liposomes can be characterized as having vesicular structures with a phospholipid bilayer membrane and an inner aqueous medium. Multilamellar liposomes have multiple lipid layers separated by aqueous medium. They form spontaneously when phospholipids are suspended in an excess of aqueous solution. The lipid components undergo self-rearrangement before the formation of closed structures and entrap water and dissolved solutes between the lipid bilayers (Ghosh et al., 1991 Glycobiology 5: 505-10). However, compositions that have different structures in solution than the normal vesicular structure are also encompassed. For example, the lipids may assume a micellar structure or merely exist as nonuniform aggregates of lipid molecules. Also contemplated are lipofectamine-nucleic acid complexes.

Regardless of the method used to introduce exogenous nucleic acids into a host cell or otherwise expose a cell to the inhibitor of the present invention, in order to confirm the presence of the nucleic acids in the host cell, a variety of assays may be performed. Such assays include, for example, "molecular biological" assays well known to those of skill in the art, such as Southern and Northern blotting, RT-PCR and PCR; "biochemical" assays, such as detecting the presence or absence of a particular peptide, e.g., by immunological means (ELISAs and Western blots) or by assays described herein to identify agents falling within the scope of the invention.

Moreover, the nucleic acids may be introduced by any means, such as transducing the expanded T cells, transfecting the expanded T cells, and electroporating the expanded T cells. One nucleic acid may be introduced by one method and another nucleic acid may be introduced into the T cell by a different method.

RNA

In one embodiment, the nucleic acids introduced into the T cell are RNA. In another embodiment, the RNA is mRNA that comprises in vitro transcribed RNA or synthetic RNA. The RNA is produced by in vitro transcription using a polymerase chain reaction (PCR)-generated template. DNA of interest from any source can be directly converted by PCR into a template for in vitro mRNA synthesis using appropriate primers and RNA polymerase. The source of the DNA can be, for example, genomic DNA, plasmid DNA, phage DNA, cDNA, synthetic DNA sequence or any other appropriate source of DNA. The desired template for in vitro transcription is a chimeric membrane protein. By way of example, the template encodes an antibody, a fragment of an antibody or a portion of an antibody. By way of another example, the template comprises an extracellular domain comprising a single chain variable domain of an antibody, such as anti-CD3, and an intracellular domain of a co-stimulatory molecule. In one embodiment, the template for the RNA chimeric membrane protein encodes a chimeric membrane protein comprising an extracellular domain comprising an antigen binding domain derived from an antibody to a co-stimulatory molecule, and an intracellular domain derived from a portion of an intracellular domain of CD28 and 4-1BB.

PCR can be used to generate a template for in vitro transcription of mRNA which is then introduced into cells. Methods for performing PCR are well known in the art. Primers for use in PCR are designed to have regions that are substantially complementary to regions of the DNA to be used as a template for the PCR. "Substantially complementary", as used herein, refers to sequences of nucleotides where a majority or all of the bases in the primer sequence are complementary, or one or more bases are non-complementary, or mismatched. Substantially complementary sequences are able to anneal or hybridize with the intended DNA target under annealing conditions used for PCR. The primers can be designed to be substantially complementary to any portion of the DNA template. For example, the primers can be designed to amplify the portion of a gene that is normally transcribed in cells (the open reading frame), including 5' and 3' UTRs. The primers can also be designed to amplify a portion of a gene that encodes a particular domain of interest. In one embodiment, the primers are designed to amplify the coding region of a human cDNA, including all or portions of the 5' and 3' UTRs. Primers useful for PCR are generated by synthetic methods that are well known in the art. "Forward primers" are primers that contain a region of nucleotides that are substantially complementary to nucleotides on the DNA template that are upstream of the DNA sequence that is to be amplified. "Upstream" is used herein to refer to a location 5, to the DNA sequence to be amplified relative to the coding strand. "Reverse primers" are primers that contain a region of nucleotides that are substantially complementary to a double-stranded DNA template that are downstream of the DNA sequence that is to be amplified. "Downstream" is used herein to refer to a location 3' to the DNA sequence to be amplified relative to the coding strand.

Chemical structures that have the ability to promote stability and/or translation efficiency of the RNA may also be used. The RNA preferably has 5' and 3' UTRs. In one embodiment, the 5' UTR is between zero and 3000 nucleotides in length. The length of 5' and 3' UTR sequences to be added to the coding region can be altered by different methods, including, but not limited to, designing primers for PCR that anneal to different regions of the UTRs. Using this approach, one of ordinary skill in the art can modify the 5' and 3' UTR lengths required to achieve optimal translation efficiency following transfection of the transcribed RNA.

The 5' and 3' UTRs can be the naturally occurring, endogenous 5' and 3' UTRs for the gene of interest. Alternatively, UTR sequences that are not endogenous to the gene of interest can be added by incorporating the UTR sequences into the forward and reverse primers or by any other modifications of the template. The use of UTR sequences that are not endogenous to the gene of interest can be useful for modifying the stability and/or translation efficiency of the RNA. For example, it is known that AU-rich elements in 3' UTR sequences can decrease the stability of mRNA. Therefore, 3' UTRs can be selected or designed to increase the stability of the transcribed RNA based on properties of UTRs that are well known in the art.

In one embodiment, the 5' UTR can contain the Kozak sequence of the endogenous gene. Alternatively, when a 5' UTR that is not endogenous to the gene of interest is being added by PCR as described above, a consensus Kozak sequence can be redesigned by adding the 5' UTR sequence.

Kozak sequences can increase the efficiency of translation of some RNA transcripts, but does not appear to be required for all RNAs to enable efficient translation. The requirement for Kozak sequences for many mRNAs is known in the art. In other embodiments the 5' UTR can be derived from an RNA virus whose RNA genome is stable in cells. In other embodiments various nucleotide analogues can be used in the 3' or 5' UTR to impede exonuclease degradation of the mRNA.

To enable synthesis of RNA from a DNA template without the need for gene cloning, a promoter of transcription should be attached to the DNA template upstream of the sequence to be transcribed. When a sequence that functions as a promoter for an RNA polymerase is added to the 5' end of the forward primer, the RNA polymerase promoter becomes incorporated into the PCR product upstream of the open reading frame that is to be transcribed. In one embodiment, the promoter is a T7 polymerase promoter, as described elsewhere herein. Other useful promoters include, but are not limited to, T3 and SP6 RNA polymerase promoters. Consensus nucleotide sequences for T7, T3 and SP6 promoters are known in the art.

In one embodiment, the mRNA has both a cap on the 5' end and a 3' poly(A) tail which determine ribosome binding, initiation of translation and stability mRNA in the cell. On a circular DNA template, for instance, plasmid DNA, RNA polymerase produces a long concatameric product which is not suitable for expression in eukaryotic cells. The transcription of plasmid DNA linearized at the end of the 3' UTR results in normal sized mRNA which is not effective in eukaryotic transfection even if it is polyadenylated after transcription.

On a linear DNA template, phage T7 RNA polymerase can extend the 3' end of the transcript beyond the last base of the template (Schenborn and Mierendorf, Nuc Acids Res., 13:6223-36 (1985); Nacheva and Berzal-Herranz, Eur. J. Biochem., 270:1485-65 (2003).

The conventional method of integration of polyA/T stretches into a DNA template is molecular cloning. However polyA/T sequence integrated into plasmid DNA can cause plasmid instability, which is why plasmid DNA templates obtained from bacterial cells are often highly contaminated with deletions and other aberrations. This makes cloning procedures not only laborious and time consuming but often not reliable. That is why a method which allows construction of DNA templates with polyA/T 3' stretch without cloning highly desirable.

The polyA/T segment of the transcriptional DNA template can be produced during PCR by using a reverse primer containing a polyT tail, such as 100 T tail (size can be 50-5000 T), or after PCR by any other method, including, but not limited to, DNA ligation or in vitro recombination. Poly(A) tails also provide stability to RNAs and reduce their degradation. Generally, the length of a poly(A) tail positively correlates with the stability of the transcribed RNA. In one embodiment, the poly(A) tail is between 100 and 5000 adenosines.

Poly(A) tails of RNAs can be further extended following in vitro transcription with the use of a poly(A) polymerase, such as E. coli polyA polymerase (E-PAP). In one embodiment, increasing the length of a poly(A) tail from 100 nucleotides to between 300 and 400 nucleotides results in about a two-fold increase in the translation efficiency of the RNA. Additionally, the attachment of different chemical groups to the 3' end can increase mRNA stability. Such attachment can contain modified/artificial nucleotides, aptamers and other compounds. For example, ATP analogs can be incorporated into the poly(A) tail using poly(A) polymerase. ATP analogs can further increase the stability of the RNA.

5' caps also provide stability to RNA molecules. In a preferred embodiment, RNAs produced by the methods disclosed herein include a 5' cap. The 5' cap is provided using techniques known in the art and described herein (Cougot, et al., Trends in Biochem. Sci., 29:436-444 (2001); Stepinski, et al., RNA, 7:1468-95 (2001); Elango, et al., Biochim. Biophys. Res. Commun., 330:958-966 (2005)).

The RNAs produced by the methods disclosed herein can also contain an internal ribosome entry site (IRES) sequence. The IRES sequence may be any viral, chromosomal or artificially designed sequence which initiates cap-independent ribosome binding to mRNA and facilitates the initiation of translation. Any solutes suitable for cell electroporation, which can contain factors facilitating cellular permeability and viability such as sugars, peptides, lipids, proteins, antioxidants, and surfactants can be included.

In some embodiments, the RNA is electroporated into the cells, such as in vitro transcribed RNA.

The disclosed methods can be applied to the modulation of T cell activity in basic research and therapy, in the fields of heart disease, atherosclerosis, stem cells, acute and chronic infections, including the assessment of the ability of the genetically modified T cell to target modified LDL, or a modified LDL-producing or -engulfing cell, such as macrophage "foam" cells.

The methods also provide the ability to control the level of expression over a wide range by changing, for example, the promoter or the amount of input RNA, making it possible to individually regulate the expression level. Furthermore, the PCR-based technique of mRNA production greatly facilitates the design of the mRNAs with different structures and combination of their domains.

One advantage of RNA transfection methods of the invention is that RNA transfection is essentially transient and a vector-free. A RNA transgene can be delivered to a lymphocyte and expressed therein following a brief in vitro cell activation, as a minimal expressing cassette without the need for any additional viral sequences. Under these conditions, integration of the transgene into the host cell genome is unlikely. Cloning of cells is not necessary because of the efficiency of transfection of the RNA and its ability to uniformly modify the entire lymphocyte population.

Genetic modification of T cells with in vitro-transcribed RNA (IVT-RNA) makes use of two different strategies both of which have been successively tested in various animal models. Cells are transfected with in vitro-transcribed RNA by means of lipofection or electroporation. It is desirable to stabilize IVT-RNA using various modifications in order to achieve prolonged expression of transferred IVT-RNA.

Some IVT vectors are known in the literature which are utilized in a standardized manner as template for in vitro transcription and which have been genetically modified in such a way that stabilized RNA transcripts are produced. Currently protocols used in the art are based on a plasmid vector with the following structure: a 5' RNA polymerase promoter enabling RNA transcription, followed by a gene of interest which is flanked either 3' and/or 5' by untranslated regions (UTR), and a 3' polyadenyl cassette containing 50-70 A nucleotides. Prior to in vitro transcription, the circular plasmid is linearized downstream of the polyadenyl cassette by type II restriction enzymes (recognition sequence corresponds to cleavage site). The polyadenyl cassette thus corresponds to the later poly(A) sequence in the transcript. As a result of this procedure, some nucleotides remain as part of the enzyme cleavage site after linearization and extend or mask the poly(A) sequence at the 3' end. It is not clear, whether this nonphysiological overhang affects the amount of protein produced intracellularly from such a construct.

RNA has several advantages over more traditional plasmid or viral approaches. Gene expression from an RNA source does not require transcription and the protein product is produced rapidly after the transfection. Further, since the RNA has to only gain access to the cytoplasm, rather than the nucleus, and therefore typical transfection methods result in an extremely high rate of transfection. In addition, plasmid based approaches require that the promoter driving the expression of the gene of interest be active in the cells under study.

In another aspect, the RNA construct is delivered into the cells by electroporation. See, e.g., the formulations and methodology of electroporation of nucleic acid constructs into mammalian cells as taught in US 2004/0014645, US 2005/0052630A1, US 2005/0070841A1, US 2004/0059285A1, US 2004/0092907A1. The various parameters including electric field strength required for electroporation of any known cell type are generally known in the relevant research literature as well as numerous patents and applications in the field. See e.g., U.S. Pat. Nos. 6,678,556, 7,171, 264, and 7,173,116. Apparatus for therapeutic application of electroporation are available commercially, e.g., the MedPulser™ DNA Electroporation Therapy System (Inovio/Genetronics, San Diego, Calif.), and are described in patents such as U.S. Pat. Nos. 6,567,694; 6,516,223, 5,993, 434, 6,181,964, 6,241,701, and 6,233,482; electroporation may also be used for transfection of cells in vitro as described e.g. in US20070128708A1. Electroporation may also be utilized to deliver nucleic acids into cells in vitro. Accordingly, electroporation-mediated administration into cells of nucleic acids including expression constructs utilizing any of the many available devices and electroporation systems known to those of skill in the art presents an exciting new means for delivering an RNA of interest to a target cell.

Sources of T Cells

Prior to expansion, a source of T cells is obtained from a subject. Non-limiting examples of subjects include humans, dogs, cats, mice, rats, and transgenic species thereof. Preferably, the subject is a human. T cells can be obtained from a number of sources, including peripheral blood mononuclear cells, bone marrow, lymph node tissue, spleen tissue, umbilical cord, and tumors. In certain embodiments, any number of T cell lines available in the art, may be used. In certain embodiments, T cells can be obtained from a unit of blood collected from a subject using any number of techniques known to the skilled artisan, such as Ficoll separation. In one embodiment, cells from the circulating blood of an individual are obtained by apheresis or leukapheresis. The apheresis product typically contains lymphocytes, including T cells, monocytes, granulocytes, B cells, other nucleated white blood cells, red blood cells, and platelets. The cells collected by apheresis may be washed to remove the plasma fraction and to place the cells in an appropriate buffer or media, such as phosphate buffered saline (PBS) or wash solution lacks calcium and may lack magnesium or may lack many if not all divalent cations, for subsequent processing steps. After washing, the cells may be resuspended in a variety of biocompatible buffers, such as, for example, Ca-free, Mg-free PBS. Alternatively, the undesirable components of the apheresis sample may be removed and the cells directly resuspended in culture media.

In another embodiment, T cells are isolated from peripheral blood by lysing the red blood cells and depleting the monocytes, for example, by centrifugation through a PERCOLL™ gradient. Alternatively, T cells can be isolated from umbilical cord. In any event, a specific subpopulation of T cells can be further isolated by positive or negative selection techniques.

The cord blood mononuclear cells so isolated can be depleted of cells expressing certain antigens, including, but not limited to, CD34, CD8, CD14, CD19 and CD56. Depletion of these cells can be accomplished using an isolated antibody, a biological sample comprising an antibody, such as ascites, an antibody bound to a physical support, and a cell bound antibody.

Enrichment of a T cell population by negative selection can be accomplished using a combination of antibodies directed to surface markers unique to the negatively selected cells. A preferred method is cell sorting and/or selection via negative magnetic immunoadherence or flow cytometry that uses a cocktail of monoclonal antibodies directed to cell surface markers present on the cells negatively selected. For example, to enrich for CD4+ cells by negative selection, a monoclonal antibody cocktail typically includes antibodies to CD14, CD20, CD11b, CD16, HLA-DR, and CD8.

For isolation of a desired population of cells by positive or negative selection, the concentration of cells and surface (e.g., particles such as beads) can be varied. In certain embodiments, it may be desirable to significantly decrease the volume in which beads and cells are mixed together (i.e., increase the concentration of cells), to ensure maximum contact of cells and beads. For example, in one embodiment, a concentration of 2 billion cells/ml is used. In one embodiment, a concentration of 1 billion cells/ml is used. In a further embodiment, greater than 100 million cells/ml is used. In a further embodiment, a concentration of cells of 10, 15, 20, 25, 30, 35, 40, 45, or 50 million cells/ml is used. In yet another embodiment, a concentration of cells from 75, 80, 85, 90, 95, or 100 million cells/ml is used. In further embodiments, concentrations of 125 or 150 million cells/ml can be used. Using high concentrations can result in increased cell yield, cell activation, and cell expansion.

T cells can also be frozen after the washing step, which does not require the monocyte-removal step. While not wishing to be bound by theory, the freeze and subsequent thaw step provides a more uniform product by removing granulocytes and to some extent monocytes in the cell population. After the washing step that removes plasma and platelets, the cells may be suspended in a freezing solution. While many freezing solutions and parameters are known in the art and will be useful in this context, in a non-limiting example, one method involves using PBS containing 20% DMSO and 8% human serum albumin, or other suitable cell freezing media. The cells are then frozen to −80° C. at a rate of 1° per minute and stored in the vapor phase of a liquid nitrogen storage tank. Other methods of controlled freezing may be used as well as uncontrolled freezing immediately at −20° C. or in liquid nitrogen.

In one embodiment, the population of T cells is comprised within cells such as peripheral blood mononuclear cells, cord blood cells, a purified population of T cells, and a T cell line. In another embodiment, peripheral blood mononuclear cells comprise the population of T cells. In yet another embodiment, purified T cells comprise the population of T cells.

Expansion of T Cells

In certain embodiments, the T cells disclosed herein can be multiplied by about 10 fold, 20 fold, 30 fold, 40 fold, 50 fold, 60 fold, 70 fold, 80 fold, 90 fold, 100 fold, 200 fold, 300 fold, 400 fold, 500 fold, 600 fold, 700 fold, 800 fold, 900 fold, 1000 fold, 2000 fold, 3000 fold, 4000 fold, 5000 fold, 6000 fold, 7000 fold, 8000 fold, 9000 fold, 10,000 fold, 100,000 fold, 1,000,000 fold, 10,000,000 fold, or greater, and any and all whole or partial integers therebetween. In one embodiment, the T cells expand in the range of about 20 fold to about 50 fold.

Following culturing, the T cells can be incubated in cell medium in a culture apparatus for a period of time or until the cells reach confluency or high cell density for optimal passage before passing the cells to another culture apparatus. The culturing apparatus can be of any culture apparatus commonly used for culturing cells in vitro. Preferably, the level of confluence is 70% or greater before passing the cells to another culture apparatus. More preferably, the level of confluence is 90% or greater. A period of time can be any time suitable for the culture of cells in vitro. The T cell medium may be replaced during the culture of the T cells at any time. Preferably, the T cell medium is replaced about every 2 to 3 days. The T cells are then harvested from the culture apparatus whereupon the T cells can be used immediately or cryopreserved to be stored for use at a later time. In one embodiment, the invention includes cryopreserving the expanded T cells. The cryopreserved T cells are thawed prior to introducing nucleic acids into the T cell.

In another embodiment, the method comprises isolating T cells and expanding the T cells. In another embodiment, the invention further comprises cryopreserving the T cells prior to expansion. In yet another embodiment, the cryopreserved T cells are thawed for electroporation with the RNA encoding the chimeric membrane protein.

Another procedure for ex vivo expansion cells is described in U.S. Pat. No. 5,199,942 (incorporated herein by reference). Expansion, such as described in U.S. Pat. No. 5,199,942 can be an alternative or in addition to other methods of expansion described herein. Briefly, ex vivo culture and expansion of T cells comprises the addition to the cellular growth factors, such as those described in U.S. Pat. No. 5,199,942, or other factors, such as flt3-L, IL-1, IL-3 and c-kit ligand. In one embodiment, expanding the T cells comprises culturing the T cells with a factor selected from the group consisting of flt3-L, IL-1, IL-3 and c-kit ligand.

The culturing step as described herein (contact with agents as described herein or after electroporation) can be very short, for example less than 24 hours such as 1, 2, 3, 4, 5, 6, 7, 8, 9, 10, 11, 12, 13, 14, 15, 16, 17, 18, 19, 20, 21, 22, or 23 hours. The culturing step as described further herein (contact with agents as described herein) can be longer, for example 1, 2, 3, 4, 5, 6, 7, 8, 9, 10, 11, 12, 13, 14, or more days.

Various terms are used to describe cells in culture. Cell culture refers generally to cells taken from a living organism and grown under controlled condition. A primary cell culture is a culture of cells, tissues or organs taken directly from an organism and before the first subculture. Cells are expanded in culture when they are placed in a growth medium under conditions that facilitate cell growth and/or division, resulting in a larger population of the cells. When cells are expanded in culture, the rate of cell proliferation is typically measured by the amount of time required for the cells to double in number, otherwise known as the doubling time.

Each round of subculturing is referred to as a passage. When cells are subcultured, they are referred to as having been passaged. A specific population of cells, or a cell line, is sometimes referred to or characterized by the number of times it has been passaged. For example, a cultured cell population that has been passaged ten times may be referred to as a P10 culture. The primary culture, i.e., the first culture following the isolation of cells from tissue, is designated P0. Following the first subculture, the cells are described as a secondary culture (P1 or passage 1). After the second subculture, the cells become a tertiary culture (P2 or passage 2), and so on. It will be understood by those of skill in the art that there may be many population doublings during the period of passaging; therefore the number of population doublings of a culture is greater than the passage number. The expansion of cells (i.e., the number of population doublings) during the period between passaging depends on many factors, including but is not limited to the seeding density, substrate, medium, and time between passaging.

In one embodiment, the cells may be cultured for several hours (about 3 hours) to about 14 days or any hourly integer value in between. Conditions appropriate for T cell culture include an appropriate media (e.g., Minimal Essential Media or RPMI Media 1640 or, X-vivo 15, (Lonza)) that may contain factors necessary for proliferation and viability, including serum (e.g., fetal bovine or human serum), interleukin-2 (IL-2), insulin, IFN-gamma, IL-4, IL-7, GM-CSF, IL-10, IL-12, IL-15, TGF-beta, and TNF-$\alpha$. or any other additives for the growth of cells known to the skilled artisan. Other additives for the growth of cells include, but are not limited to, surfactant, plasmanate, and reducing agents such as N-acetyl-cysteine and 2-mercaptoethanol. Media can include RPMI 1640, AIM-V, DMEM, MEM, $\alpha$-MEM, F-12, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion of T cells. Antibiotics, e.g., penicillin and streptomycin, are included only in experimental cultures, not in cultures of cells that are to be infused into a subject. The target cells are maintained under conditions necessary to support growth, for example, an appropriate temperature (e.g., 37° C.) and atmosphere (e.g., air plus 5% $CO_2$).

The medium used to culture the T cells may include an agent that can co-stimulate the T cells. For example, an agent that can stimulate CD3 is an antibody to CD3, and an agent that can stimulate CD28 is an antibody to CD28. This is because, as demonstrated by the data disclosed herein, a cell isolated by the methods disclosed herein can be expanded approximately 10 fold, 20 fold, 30 fold, 40 fold, 50 fold, 60 fold, 70 fold, 80 fold, 90 fold, 100 fold, 200 fold, 300 fold, 400 fold, 500 fold, 600 fold, 700 fold, 800 fold, 900 fold, 1000 fold, 2000 fold, 3000 fold, 4000 fold, 5000 fold, 6000 fold, 7000 fold, 8000 fold, 9000 fold, 10,000 fold, 100,000 fold, 1,000,000 fold, 10,000,000 fold, or greater. In one embodiment, the T cells expand in the range of about 20 fold to about 50 fold, or more by culturing the electroporated population.

In one embodiment, the method of expanding the T cells can further comprise isolating the expanded T cells for further applications. In another embodiment, the method of expanding can further comprise a subsequent electroporation of the expanded T cells followed by culturing. The subsequent electroporation may include introducing a nucleic acid encoding an agent, such as a transducing the expanded T cells, transfecting the expanded T cells, or electroporating the expanded T cells with a nucleic acid, into the expanded population of T cells, wherein the agent further stimulates the T cell. The agent may stimulate the T cells, such as by stimulating further expansion, effector function, or another T cell function.

Pharmaceutical Compositions

Pharmaceutical compositions of the present invention may comprise the modified T cell as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present invention are preferably formulated for intravenous administration.

Pharmaceutical compositions of the present invention may be administered in a manner appropriate to the disease to be treated (or prevented). The quantity and frequency of administration will be determined by such factors as the condition of the patient, and the type and severity of the patient's disease, although appropriate dosages may be determined by clinical trials.

The cells of the invention to be administered may be autologous, allogeneic or xenogeneic with respect to the subject undergoing therapy.

Cells of the invention can be administered in dosages and routes and at times to be determined in appropriate preclinical and clinical experimentation and trials. Cell compositions may be administered multiple times at dosages within these ranges. Administration of the cells of the invention may be combined with other methods useful to treat the desired disease or condition as determined by those of skill in the art.

It can generally be stated that a pharmaceutical composition comprising the modified T cells described herein may be administered at a dosage of $10^4$ to $10^9$ cells/kg body weight, in some instances $10^5$ to $10^6$ cells/kg body weight, including all integer values within those ranges. T cell compositions may also be administered multiple times at these dosages. The cells can be administered by using infusion techniques that are commonly known in immunotherapy (see, e.g., Rosenberg et al., New Eng. J. of Med. 319:1676, 1988). The optimal dosage and treatment regime for a particular patient can readily be determined by one skilled in the art of medicine by monitoring the patient for signs of disease and adjusting the treatment accordingly.

The administration of the modified T cells of the invention may be carried out in any convenient manner known to those of skill in the art. The cells of the present invention may be administered to a subject by aerosol inhalation, injection, ingestion, transfusion, implantation or transplantation. The compositions described herein may be administered to a patient transarterially, subcutaneously, intradermally, intratumorally, intranodally, intramedullary, intramuscularly, by intravenous (i.v.) injection, or intraperitoneally. In other instances, the cells of the invention are injected directly into a site of inflammation in the subject, a local disease site in the subject, a lymph node, an organ, a tumor, and the like.

It should be understood that the method and compositions that would be useful in the present invention are not limited to the particular formulations set forth in the examples. The following examples are put forth so as to provide those of ordinary skill in the art with a complete disclosure and description of how to make and use the cells, expansion and culture methods, and therapeutic methods of the invention, and are not intended to limit the scope of what the inventors regard as their invention.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition (Sambrook, 2012); "Oligonucleotide Synthesis" (Gait, 1984); "Culture of Animal Cells" (Freshney, 2010); "Methods in Enzymology" "Handbook of Experimental Immunology" (Weir, 1997); "Gene Transfer Vectors for Mammalian Cells" (Miller and Calos, 1987); "Short Protocols in Molecular Biology" (Ausubel, 2002); "Polymerase Chain Reaction: Principles, Applications and Troubleshooting", (Babar, 2011); "Current Protocols in Immunology" (Coligan, 2002). These techniques are applicable to the production of the polynucleotides and polypeptides of the invention, and, as such, may be considered in making and practicing the invention. Particularly useful techniques for particular embodiments will be discussed in the sections that follow.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

The materials and methods employed in these experiments are now described.

The modified LDL-specific scFv was generated from the 2D03 antibody, disclosed in PCT/EP2006/008594. The DNA sequence of the variable heavy and variable light domains of the 2D03 antibody, linked by the DNA sequence of a 3x-GGGGS flexible linker was synthesized and subcloned into lentiviral vectors containing CAR components, including CD8a leader sequence, CD8a hinge sequence, various transmembrane domains, various costimulatory domains, and CD3zeta.

Vector design: The cDNA sequence of the variable light and heavy chains (scFv) of the IK17/IEI-E3/2D03 mAb were separated by a 3xGGGGS linker and custom synthesized by GeneArt (Life Technologies). The scFv was cloned into a CAR-encoding lentivirus backbone, containing the CD8a leader sequence, a portion of the CD8a extracellular domain and transmembrane domain, and 4-1BB (or CD28) and CD3Z endodomains. The human FOXP3 gene was inserted into the construct and separated from the CAR gene by a P2A peptide. The final FOXP3-P2A-2D03-CD28-CD3z construct was inserted into the pTRPE vector: a custom synthesized third generation lentiviral production vector using the EF1a promoter based on the similar pELNS vector previously described.[67] The murine FOXP3 gene replaced the human FOXP3 gene for retroviral production. The entire construct was inserted into the MSGV vector.

Human T cell transduction and expansion: Lentiviral supernatant was generated from 293T cells transfected with, pTRPE-IK17-CD28-CD3z, pTRPE-IEI-E3-CD28-CD3z, pTRPE-2D03-CD28-CD3z, pTRPE-FOXP3-P2A-1E3-CD28-CD3z (non-specific CAR Tregs), pTRPE-FOXP3-P2A-2D03-CD28-CD3z, or pTRPE-CBG-T2A-GFP plasmids, along with gag/pol, env, and VSVg, as previously described. Viral supernatants were collected and concentrated at 24 and 48 hrs. Normal donor CD4 T cells were positively selected from leukapheresis products using anti-CD4 (Miltenyi), activated in vitro with anti-CD3/CD28 magnetic beads (Life Technologies), and expanded in RPMI-1640 supplemented with 10% fetal calf serum (FCS), HEPES, penicillin and streptomycin (R10) and 200 IU/mL IL-2 for 10-17 days. T cells were transduced with lentiviral supernatant 16 hours after bead activation.

Macrophage expansion: Normal donor monocytes were negatively selected from leukapheresis products using RosetteSep kit (STEMCELL Technologies). Monocytes were differentiated to M0 with 10 ng/ml M-CSF for 1 week and then frozen or used in subsequent experiments.

Jurkat stimulation assay: NFAT-GFP reporter Jurkat cells were transduced with lentivirus encoding 2D03-CD28z and IEI-E3-CD28z CARs. Transduced Jurkat cells were normalized for CAR expression and then incubated for 24 hrs alone or with PMA/Ionomycin, ApoB100 (Academy Bio-Medical Co.), MDA-ApoB100 (Academy Bio-Medical Co.), LDL (Academy Bio-Medical Co.), or MDA-LDL (Academy Bio-Medical Co.) Flow cytometry was then performed on Jurkat cells to evaluate for GFP expression.

Stimulation assays: Non-transduced or transduced human T cells were incubated for 24 hours alone or on plates coated with OKT3 (anti-CD3), ApoB100, MDA-ApoB100, LDL, or MDA-LDL. Supernatant was removed to analyze for cytokine secretion. Cells were stained for surface and intracellular markers.

Flow cytometry: Anti-human or anti-murine antibodies were purchased from BioLegend, eBioscience, or Becton Dickinson. For cell surface staining, cells were washed with phosphate-buffered saline (PBS) containing 2% FCS and stained on ice. For intracellular staining, cells were washed, stained for viability, cell surface stained, fixed, permeabilized, and intracellularly stained for CTLA-4, Helios and FOXP3. In all analyses, singlets were gated using FSC-H versus F SC-A and SSC-H versus SSC-A, followed by gating based on forward versus side scatter characteristics. Surface expression of 2D03-CAR was detected by staining with a biotin-conjugated goat anti-mouse F(ab)2 antibody (Jackson ImmunoResearch) and PE-conjugated streptavidin. Flow cytometry was performed on a 4-laser LSRII or LSRFortessa (Becton Dickinson).

Cytokine secretion: Supernatants were analyzed for IFNg and IL-10 using the Human IFNg DuoSet ELISA (R&D Systems). Human and mouse luminex assay was performed by manufacturer's instructions (Invitrogen and Millipore, respectively).

Immunosuppression/Proliferation assays: For in vitro suppression assays $1\times10^5$ human/mouse OxCAR Teffs cells were stained with CFSE and co-cultured with (human or mouse) non-transduced T cells or different ratios of human or mouse OxCAR Tregs on MDA-ApoB100 coated 96-well plates. After 5 days, the samples were analyzed by flow cytometry, analyzing CFSE$^+$ dilutions.

Foam cell formation and co-culture: M0 macrophages were seeded at $2\times10^5$ cells in 24 well plates. After 24 hours, $2\times10^5$ stimulated or non-stimulated transduced T cells are added to each well. Twenty-four hours after stimulation, 30 ug/ml of MDA-LDL was added to each well for 48 hours of incubation to allow foam cell formation. T cells were aspirated and macrophages are washed in PBS, fixed, and stained with Oil Red O, and imaged. Images were quantified with ImageJ. For phenotype analysis, M0 macrophages were seeded at $5\times10^4$ cells in 96 well plates. $1\times10^5$ of non-transduced T cells or transduced T cells were added to each well along with 10 ug/ml of MDA-LDL. After 48 hrs, T cells were aspirated and macrophages were stained for CD206 and CD163.

NSG mouse study: Fifteen mice from Jackson lab were treated with $1\times10^6$ human CBG-T2A-GFP$^+$ T cells, CBG-T2A-GFP+ OxCAR Teffs or CBG-T2A-GFP+ OxCAR Tregs. Ten minutes prior to imaging, mice were injected with 3 mg luciferase in 100 ul. Flux data was quantified using Living Image 4.5.

Mouse T cell transduction and expansion: Retroviral supernatant was generated from 293T cells transfected with MSGV-muFOXP3-P2A-2D03-CD28-CD3z, MSGV-2D03-CD28-CD3z, MSGV-muFOXP3-P2A-1E3-CD28-CD3z, MSGV-CBG-T2A-GFP plasmids, plus gag/pol and collected at 48 and 72 hrs. Retroviral supernatant was concentrated on rectronectin-coated plates for 1 hour prior to spinfection of mouse CD4 T cells. Mouse CD4 T cells were isolated from bulk splenocytes by the EasySep Mouse CD4 T cell Isolation Kit (STEMCELL Technologies), activated with murine anti-CD3/CD28 beads (Thermo Fischer Scientific), and cultured with RPMI-1640 supplemented with 10% fetal calf serum (FCS), Sodium Pyruvate, b-Mercaptoethanol, penicillin and streptomycin (R10), and 200 IU/mL IL-2 for 5 days. T cells were transduced with retroviral supernatant 16 hours after bead stimulation.

Ldlr$^{-/-}$ syngeneic model: 20 8-week-old male Ldlr$^{-/-}$ mice were obtained from Jackson Laboratories. All mice were maintained on a high fat western diet (Fisher Scientific) for 12 weeks. At week 5 and each subsequent week for 5 weeks, mice were weighted and treated with $2\times10^6$ non-transduced or transduced murine T cells via tail vein injection. There were 5 mice each treatment group, except for the OxCAR Teffs which had 4 mice (one mice died prior to first T cell treatment). Two weeks after the final treatment (week 12) blood and serum were collected for peripheral immunophenotyping and luminex assay followed by euthanization using 100% $CO_2$. The mice were then perfused with PBS and the heart and thoracic/abdominal aortas were removed.

En face staining: Thoracic and abdominal aortas were dissected and fixed in 4% paraformaldehyde. Aortas were then opened, flattened and pinned and subsequently washed 3 times with PBS, once with 70% EtOH and stained for 10 min with Sudan IV. Stained aortas were subsequently washed once with 70% EtOH and imaged. Images were quantified in ImageJ.

Aortic root histopathology and immunofluorescence: Mouse hearts were fixed and dehydrated, embedded in paraffin and serially section. H&E staining was performed on paraffin-embedded tissues. Aortic root cross-sectional lesion areas were quantified using 3 representative cross-sections taken between the first appearance of the first leaflet of the aortic valve and the last leaflet. Mean lesion size at each 100 μm section in each animal was determined by computer-assisted morphometry (Image-Pro Plus 6.3, Media Cybernetics). Immunofluorescence studies were performed on the same cross section used for lesion analysis with an anti-GFP-AF488 antibody (Abcam).

The results of the experiments are now described.

Example 1

Incubation of Macrophages with OxLDL Induces Foam Cell Formation

Figure 2C:
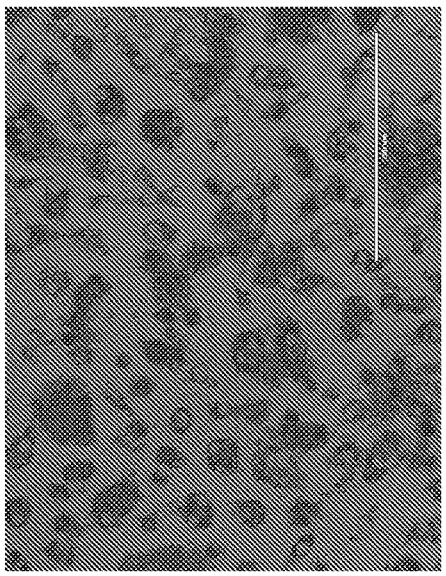
FIGS. 2A-2C illustrates results from human macrophages plated and incubated in R10 media alone (FIG. 2A), with 10 mg/ml Dil-LDL (FIG. 2B) or with 10 mg/ml Dil-OxLDL (FIG. 2C) for 24 hours and then imaged with phase contrast microscopy. This demonstrates the unregulated uptake of modified LDL in macrophages that results in foam cell formation and plaque development.
Figure 2B:
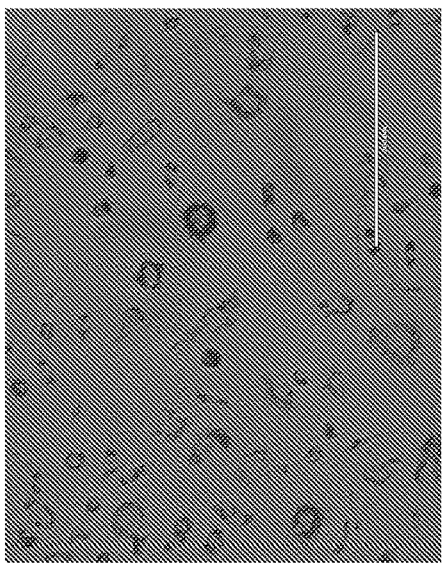
Figure 2A:
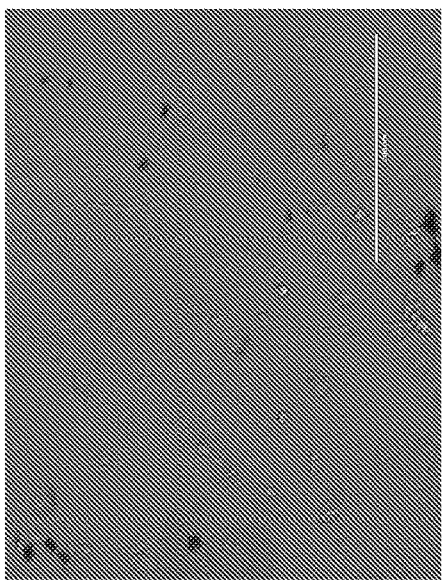

Human macrophages were plated and incubated in R10 media alone (FIG. 2A), with 10 mg/ml DiI-LDL (FIG. 2B)

or with 10 mg/ml Dil-OxLDL (FIG. 2C) for 24 hours and then imaged with phase contrast microscopy. Dil-LDL refers to low density lipoprotein, labeled with 1,1'-dioctadecyl-3, 3,3',3'-tetramethyl-indocarbocyanine perchlorate (a fluorescent molecule). This allows for visualization of LDL and can be purchased commercially. Dil-OxLDL refers to oxidized LDL labeled with 1,1'-dioctadecyl-3,3,3',3'-tetramethyl-indocarbocyanine perchlorate (a fluorescent molecule). This allows for visualization of OxLDL and can be purchased commercially. These results demonstrated the unregulated uptake of modified LDL in macrophages that resulted in foam cell formation and plaque development.

Example 2

Design and Construction of Anti-OxLDL CARs

Figure 3A:
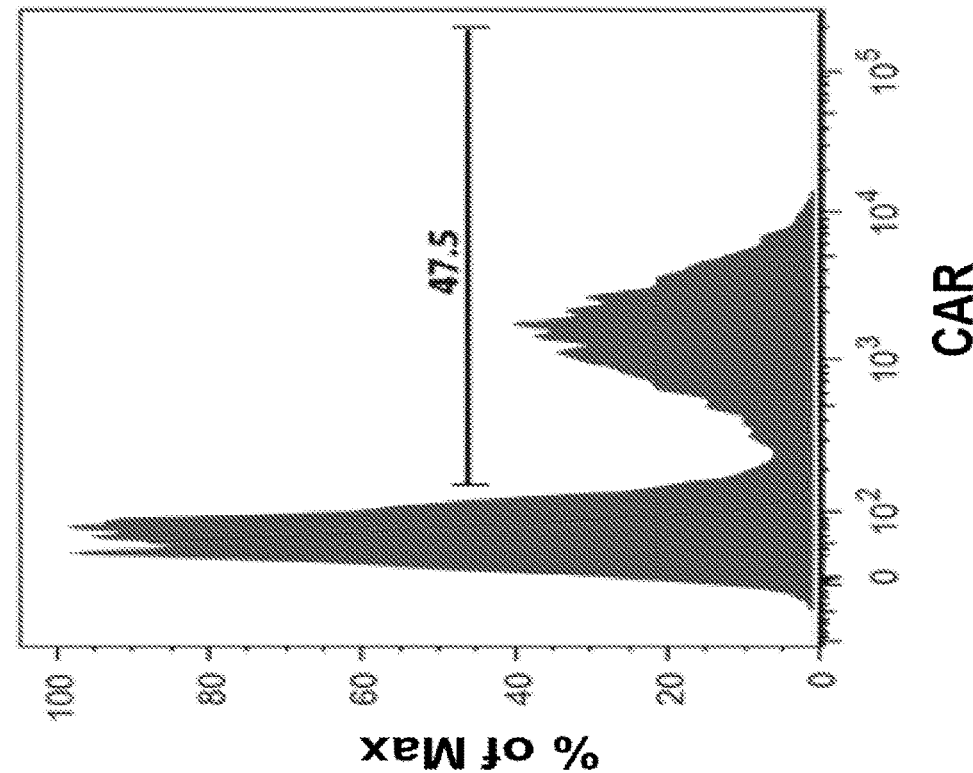
FIGS. 3A-3B illustrate the structure and cell surface expression of anti-OxLDL CARs.
Figure 3B:
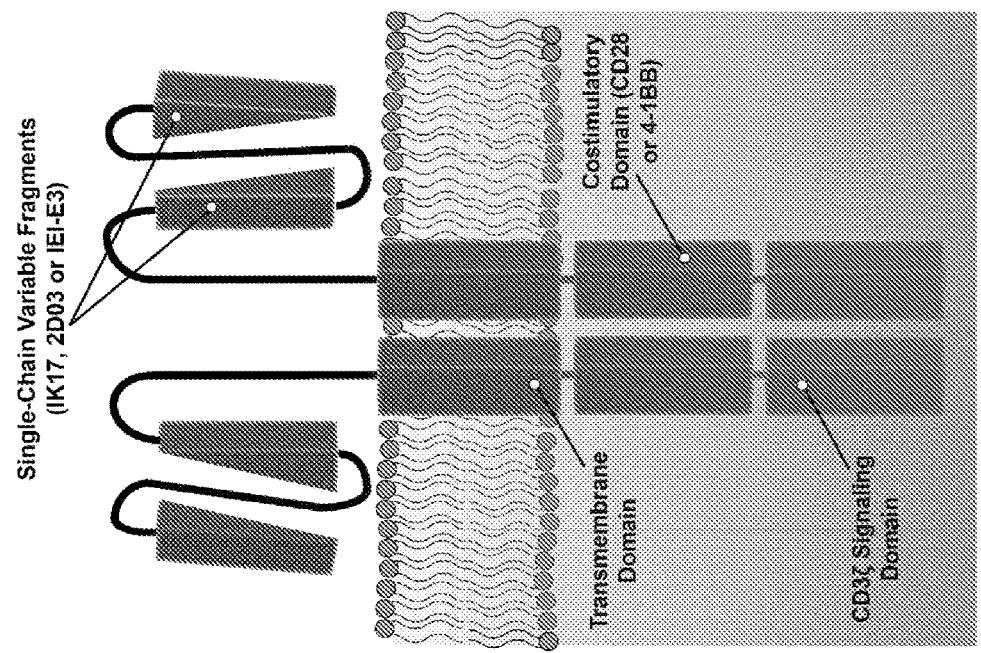

Three CARs were developed from previously identified OxLDL antibodies, IK17, 2D03 and IEI-E3 (Tsimikas, S. et al. (2011) *J. Am. Coll. Cardiol.* 58, 1715-27; Schiopu, A. et al. (2007) *J. Am. Coll. Cardiol.* 50, 2313-2318). After identifying variable heavy and variable light chains of the IK17, 2D03 and IEI-E3 mAbs, single chain variable fragments (scFvs) were generated by linking the domains with a 3X(GGGGS) spacer and then incorporated into a CAR backbone containing a CD8a hinge and transmembrane domain, a 4-1BB or CD28 intracellular signaling domain (ICD) and a CD3Z activation domain (FIG. 3A). During preliminary experiments, normal human donor T cells were stimulated with anti-CD3 and anti-CD28 mAb-coated magnetic beads and transduced with a lentiviral vector encoding the CAR. All CARs were expressed constitutively using an EF1a promoter, and, in a typical experiment, 40-60% of T cells expressed the CAR (FIG. 3B).

Example 3

Anti-MDA-ApoB100 CARs Exhibit Antigen Dependent Activation

An alternative to targeting oxidized phospholipids on OxLDL is targeting oxidized modified proteins, specifically oxidized ApoB100. The 2D03 and IEI-E3 CARs were generated from scFvs that recognize malondialdehyde (MDA)-modified ApoB100, an epitope present on OxLDL in vivo. To efficiently assess which CAR would produce the most robust response to MDA-LDL, NFAT-GFP reporter Jurkat cells were transduced with lentiviral constructs encoding the 2D03 or IEI-E3 CARs. The transduced Jurkat cells were stimulated with MDA-ApoB100, MDA-LDL, native ApoB100, and native LDL. Both CARs reacted to MDA-ApoB100; however, the 2D03-28z CAR produced a more robust response to MDA-LDL. Thus, the 2D03 CAR was chosen as the lead candidate molecule for future studies and referred to as OxCAR.

In order to evaluate specificity of the OxCAR on T cells, non-transduced (NTD) and OxCAR T cells were incubated on plates coated with OKT3 (an anti-CD3 mAb), native LDL, native ApoB100, MDA-LDTea1sL, or MDA-ApoB100 for 24 hours, and then culture supernatants were assessed for IFNg. The OxCAR T cells secreted similar quantities of IFNg in response to the MDA-LDL, MDA-ApoB100, and OKT3, but not native LDL or native ApoB100. The production of IFNg by cytotoxic T cells demonstrated the capability of the lipoprotein to successfully stimulate CAR T cells. The lack of OxCAR T cell stimulation by native LDL also demonstrated the conservation of specificity of the OxCAR for oxidation specific epitopes when expressed by primary human T cells.

Example 4

Figure 4A:
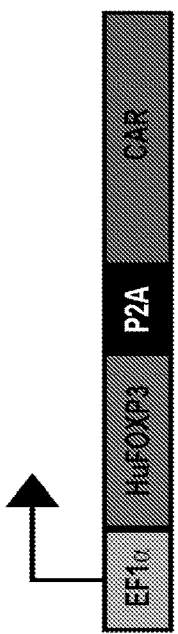
FIGS. 4A-4E illustrate T regulatory induction, phenotype and behavior.
Figure 4C:
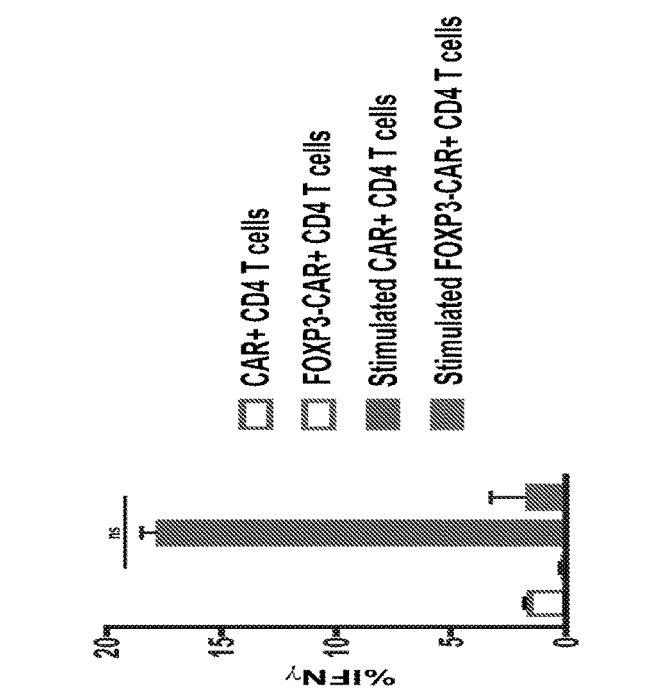
Figure 4B:
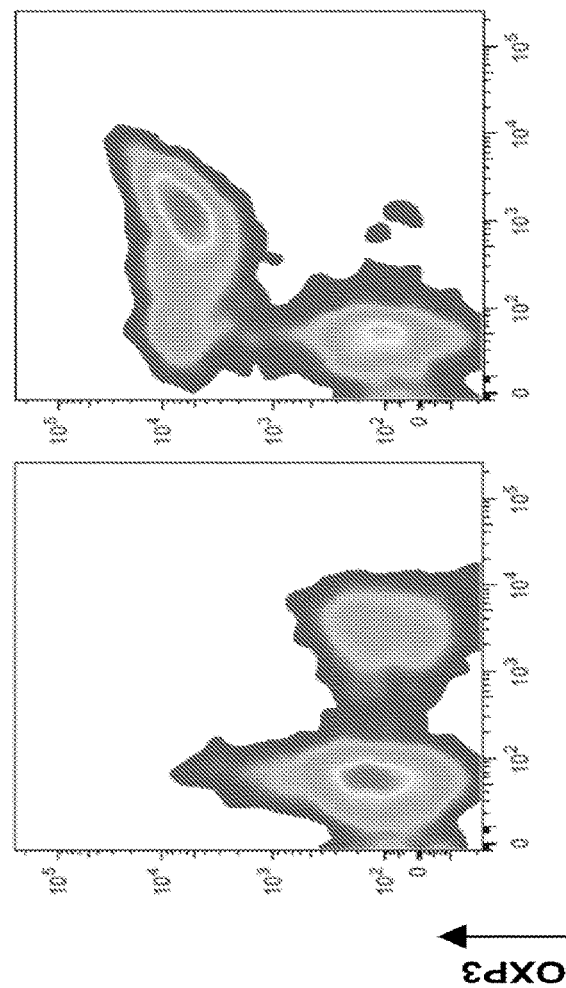
Figure 4D:
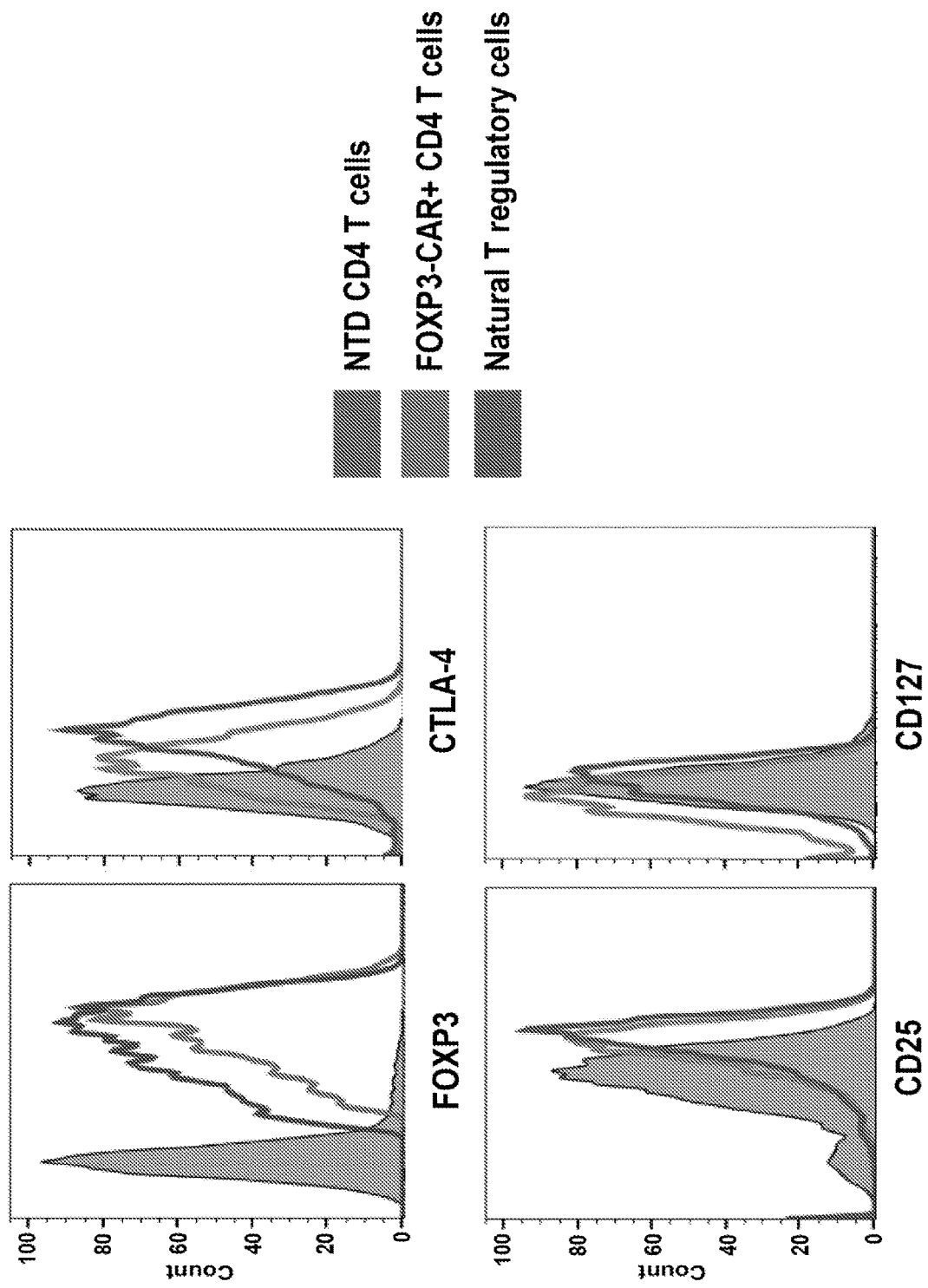
Figure 4E:
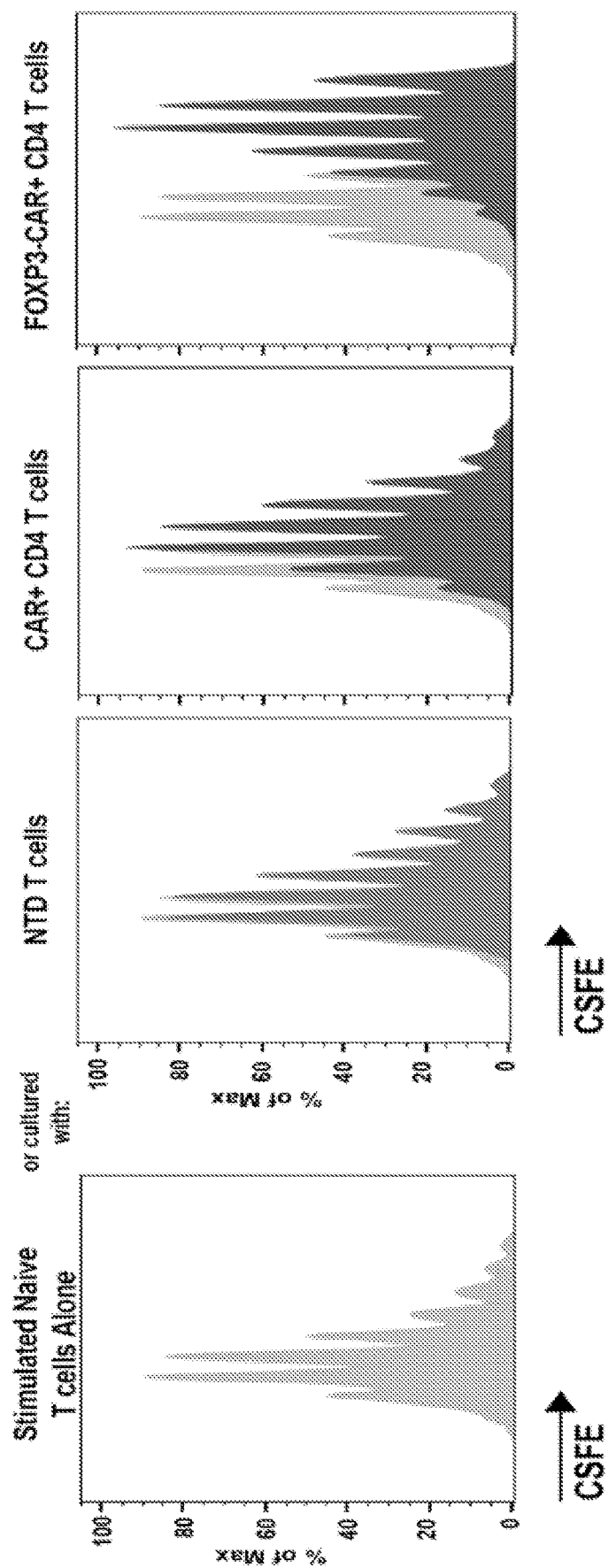

Constitutive FOXP3 Expression in CD4 T Cells Induces T Regulatory Phenotype and Function In order to develop T regulatory cells (Tregs), naive human CD4 T cells were transduced with a bicistronic CAR vector that co-expresses FOXP3 (FIG. 4A). This method has been previously shown to develop sustainable and stable Tregs. After expansion of the activated T cells, T cells transduced with the CAR lentivirus and FOXP3-CAR lentivirus were evaluated for FOXP3 expression. FOXP3 expression was significantly higher in the T cells transduced with the FOXP3-CAR vector, compared to cells transduced with only the CAR vector, confirming the integrity of the bicistronic vector (FIG. 4B). Common Treg surface markers, such as CD127, CD25 and CTLA-4, were assessed by staining the FOXP3-CAR+ CD4 T cells and compared to natural Treg cells. FOXP3-CAR+ CD4 T cells were phenotypically $CD25^{hi}$ and $CD127^{low}$, and exhibited similar levels of CTLA-4 when compared to natural Tregs (FIG. 4C). Upon stimulation of CAR+ CD4 T cells and FOXP3-CAR+ CD4 T cells with OKT3, FOXP3-CAR+ T cells did not produce a significant increase in IFNg production (FIG. 4D), demonstrating the suppressive effect of FOXP3 expression on inflammatory cytokine production. In order to demonstrate the immunosuppressive capacity of the FOXP3-CAR$^+$ CD4 T cells on other cells, transduced T cells were co-cultured with naive T cells in the presence of anti-CD3/anti-CD28 beads, and proliferation of the latter was measured with CFSE (FIG. 4E). While NTD and CAR+ CD4 T cells had minimal effects on the proliferation of naive T cells, the FOXP3-CAR$^+$ CD4 T cells significantly reduced the proliferation of naive T cells, demonstrating the gained suppressive function through TCR stimulation. Taken together, ectopic expression of FOXP3 in CD4 T cells induces a Treg phenotype and function.

Example 5

Figure 5A:
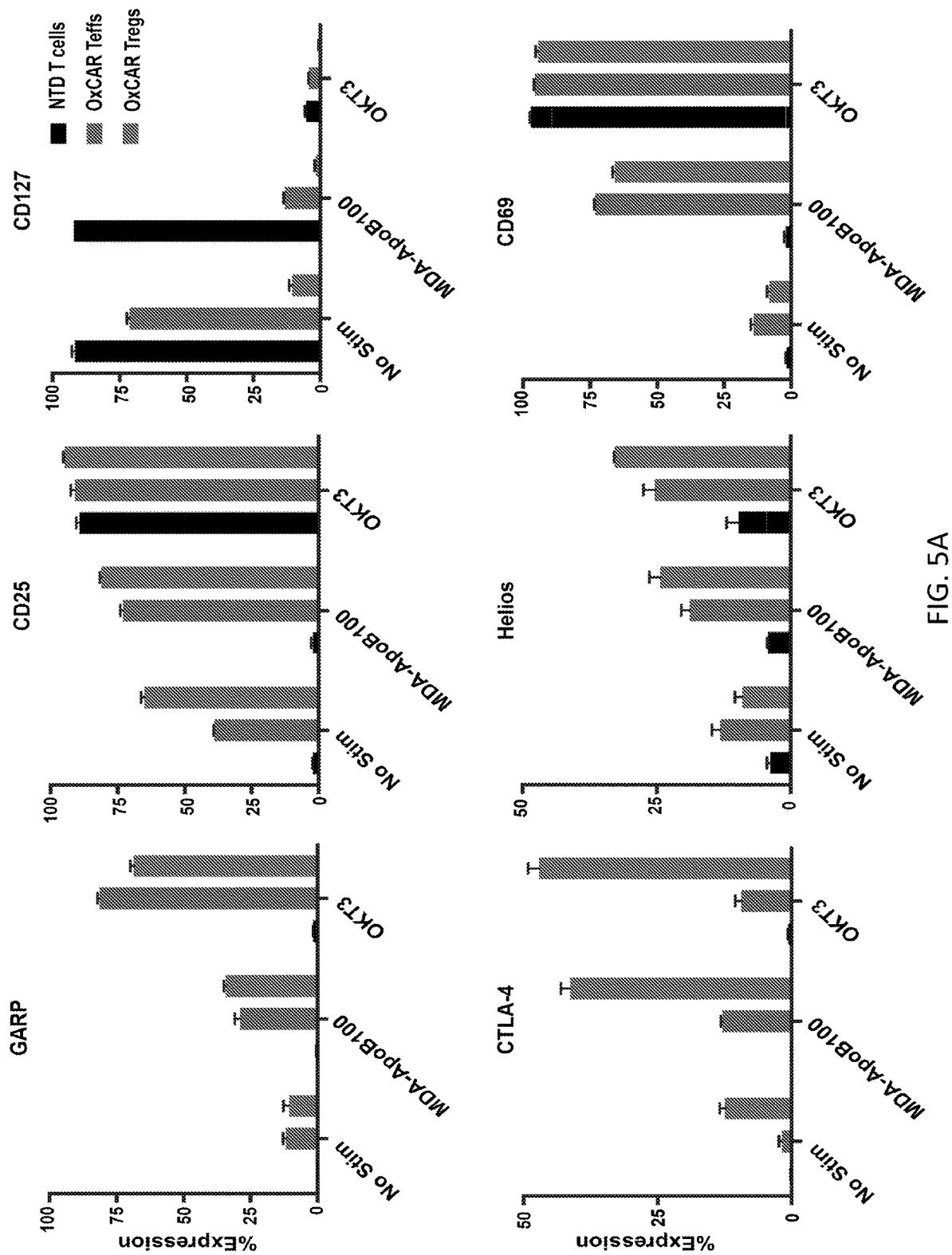
FIGS. 5A-5B illustrate OxCAR Tregs maintain regulatory phenotype upon stimulation and produce type 2 cytokines.
Figure 5B:
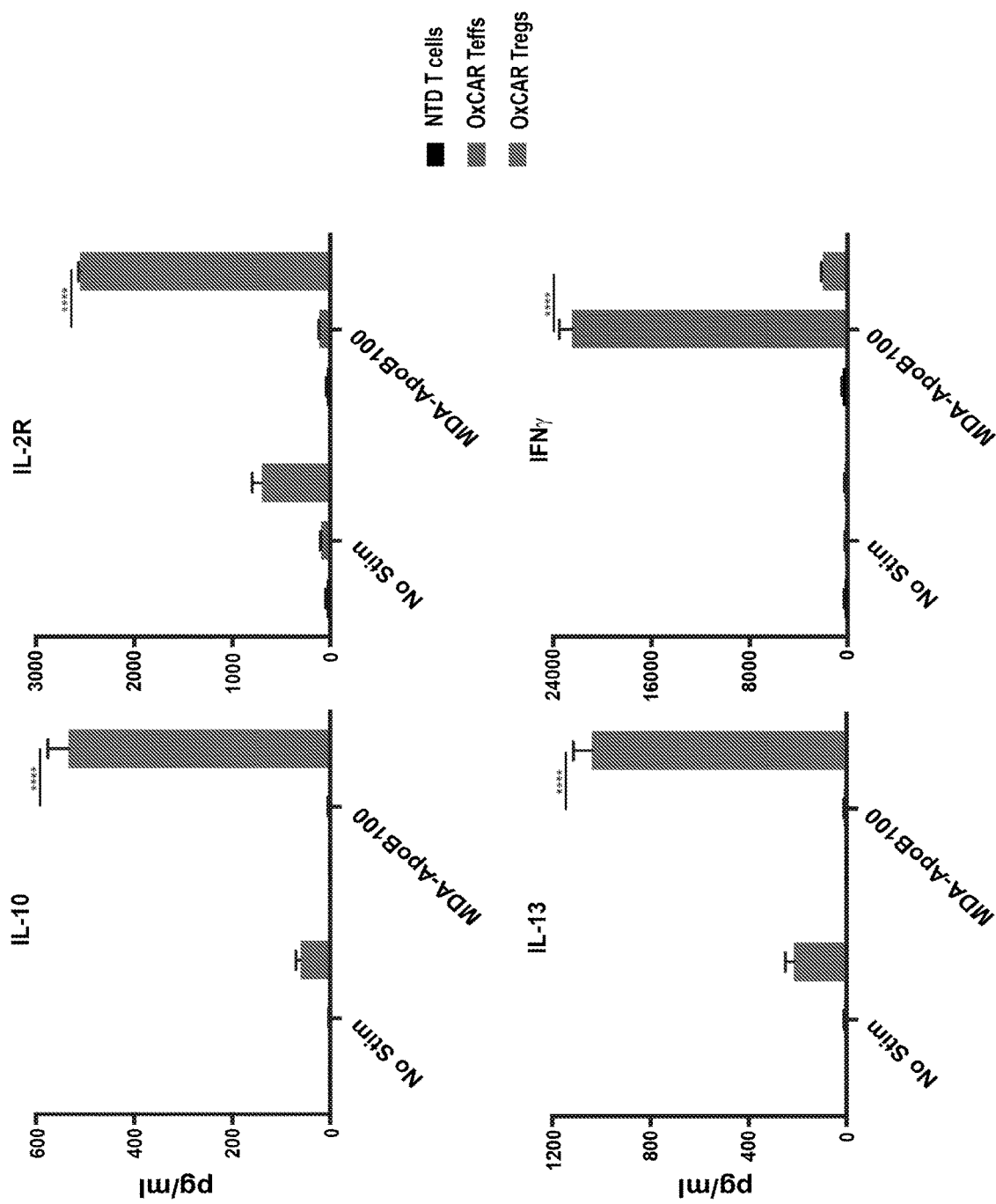

OxCAR Tregs Retain Immunosuppressive Phenotype In Vitro when Stimulated Through the CAR or TCR To investigate whether FOXP3-OxCAR$^+$ CD4 T cells (OxCAR Tregs) retain their phenotype after stimulation through CAR, NTD, OxCAR+ CD4 T cells (OxCAR Teffs) and OxCAR Tregs were incubated alone or on plates coated with ApoB100, MDA-ApoB100, or OKT3, and stained for various Treg and T cell activation markers 24 hours after culturing (FIG. 5A). OxCAR Tregs retained the phenotype of $CD25^{hi}$ and $CD127^{low}$ after stimulation. Similarly, Treg activation markers, such as GARP, CTLA-4, and Helios, increased in OxCAR Tregs upon stimulation through the CAR. CD69, a general T cell activation marker, was increased in both OxCAR Tregs and OxCAR Teffs upon stimulation. In a similar assay, cytokine production of OxCAR Tregs was measured from culture supernatant after stimulation (FIG. 5B). Like TCR stimulation, the OxCAR Tregs produced minimal IFNg when stimulated through the CAR. Aside from decreased inflammatory cytokine production, increased anti-inflammatory cytokines production (IL-10 and IL-13) from the OxCAR Tregs was observed. Thus, stimulation of OxCAR Tregs through the CAR retains the Treg phenotype and demonstrates the capability of contact-dependent immunosuppression through increased inhibitory surface markers, such as CTLA-4, and contact-independent immunosuppression via anti-inflammatory cytokines secretion.

Example 6

CD28 ICD Produces the Most Immunosuppressive OxCAR Treg

Figures 6C, 6D:
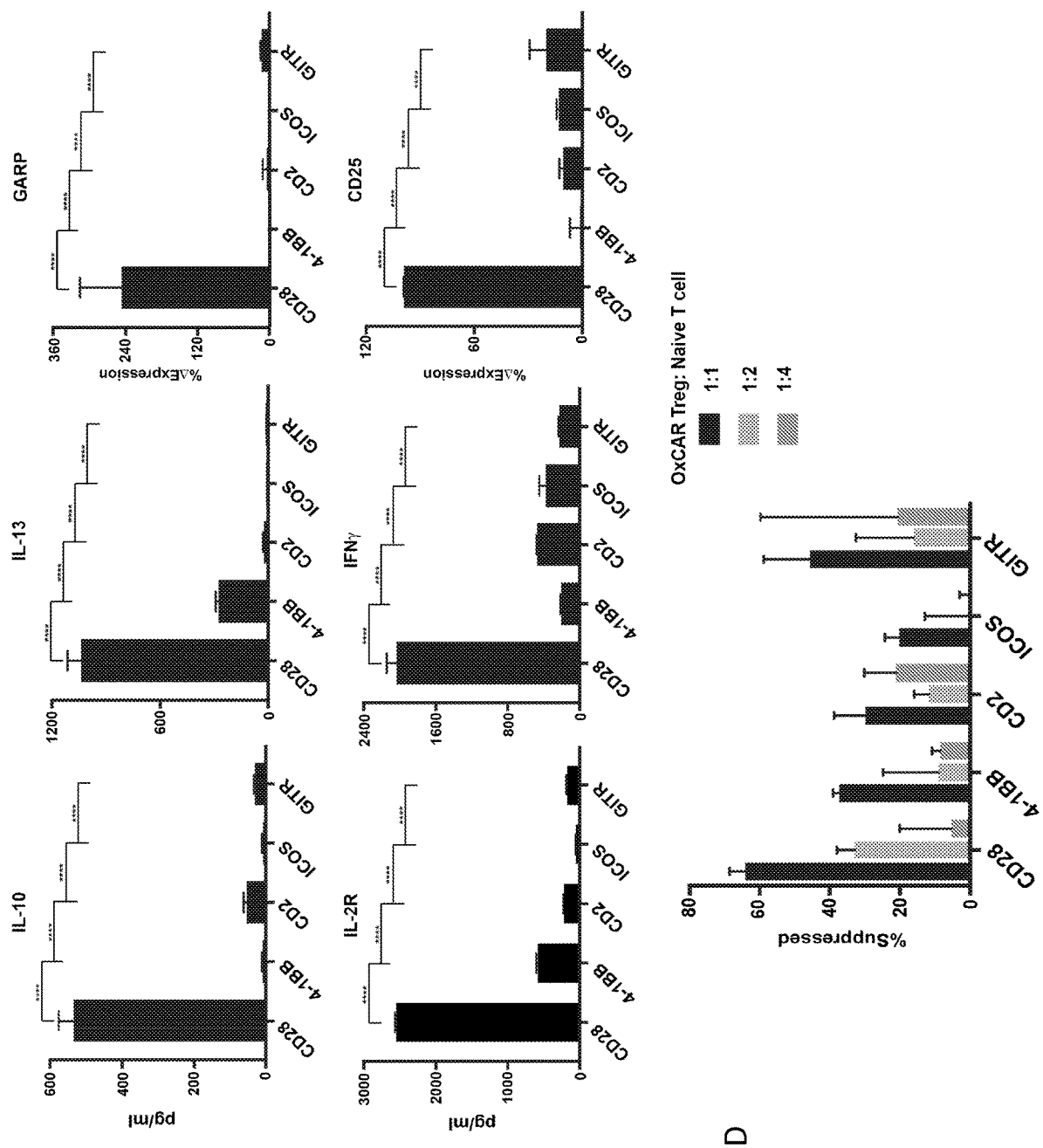

The only tested costimulatory domain for second-generation CARs in T regulatory cells to date is CD28, likely due to the importance of CD28 in T regulatory cell differentiation. Therefore, it was hypothesized that there may be other intracellular signaling domains (ICD) that could confer a more immunosuppressive phenotype. Other costimulatory domains were cloned into the CD28 region of the FOXP3-CAR vector, including 4-1BB, ICOS, CD2, and GITR. Normal donor CD4 T cells were transduced with each FOXP3-CAR vector and FOXP3 and CAR expression was confirmed (FIG. 6A). In addition, regardless of ICD, each type of OxCAR Treg was $CD25^{hi}$ and $CD127^{low}$, consistent with the Treg phenotype (FIG. 6B). To determine the ICD that promotes the most immunosuppression, OxCAR Tregs were plated on antigen coated plates and cytokines and GARP/CD25 expression were measured after stimulation (FIG. 6C). OxCAR Tregs with the CD28 domain produced the most immunosuppressive phenotype, which consisted of increased GARP and CD25 expression and immunosuppressive cytokine production. Although the CD28-OxCAR Treg also produced in the most IFNg, it was the most suppressive of proliferating naive T cells (FIG. 6D). Based on these observations, the CD28-based OxCAR Tregs were selected for future assays.

Example 7

OxCAR Tregs Reduce Foam Cell Formation and Skew Macrophage Phenotype

Figure 7A:
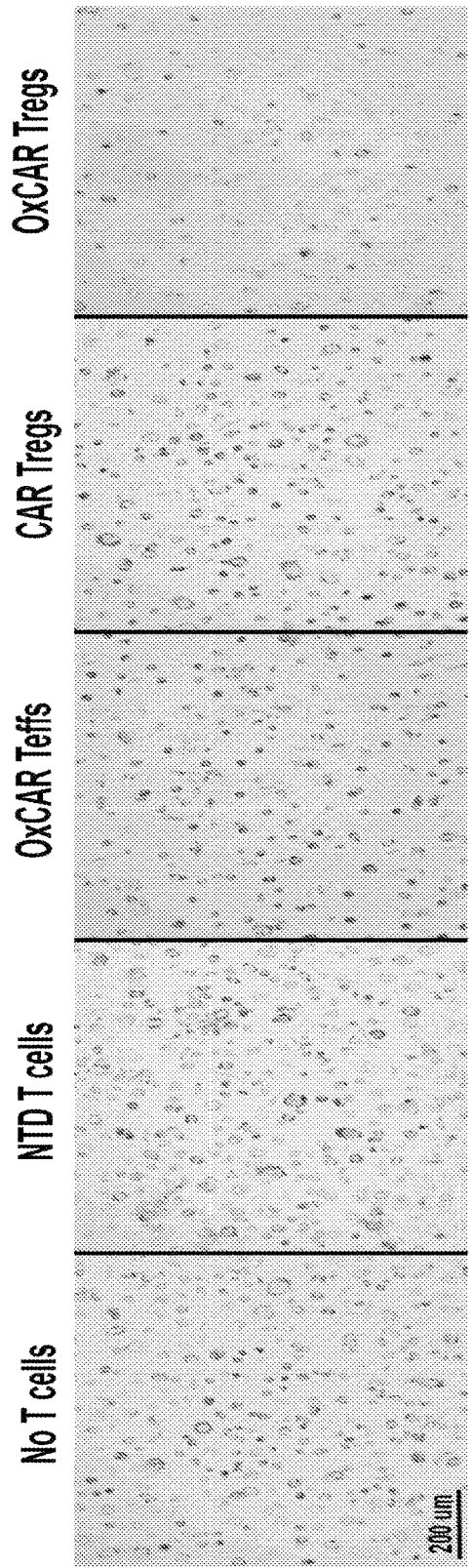
FIGS. 7A-7B illustrate the finding that OxCAR Tregs reduce foam cell formation and skew macrophage phenotype.
Figure 7B:
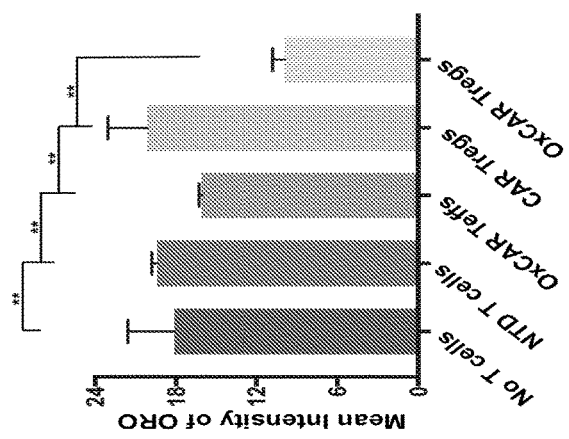

Since foam cells are one of initiating factors in atherosclerosis, it was important to investigate whether OxCAR Tregs could reduce foam cell formation. Therefore, macrophages were incubated on plates coated with MDA-ApoB100 alone, with NTD T cells, or with transduced T cells. After 48 hours, MDA-LDL was added to the culture to induce foam cell formation. Oil Red O staining of the macrophages 48 hours after MDA-LDL addition demonstrated ~50% reduction in lipid uptake in macrophages that were incubated with the OxCAR Tregs compared to all other treatment groups (FIGS. 7A-7B). All other groups had comparable amounts of lipid uptake, demonstrating that OxLDL-specific Tregs, but not polyclonal Tregs, are sufficient to reduce foam cell formation. In a similar experiment, macrophages were profiled for two known M2 markers, CD163 and CD206, after co-culture with Tregs and incubation with MDA-LDL to investigate whether foam cell reduction was due to a change in phenotype (FIG. 7C). Surprisingly, both markers decreased not only on macrophages cultured with OxCAR Teffs, but also on macrophages cultured with OxCAR Tregs, albeit to a lesser degree. This similar reduction in M2 markers indicates that phenotypic change was likely not the primary driver for reduced foam cell reduction in the OxCAR Treg group.

Example 8

Human OxCAR Treg Cells Persist in NSG Mice with No Overt Toxicity

Figure 8B:
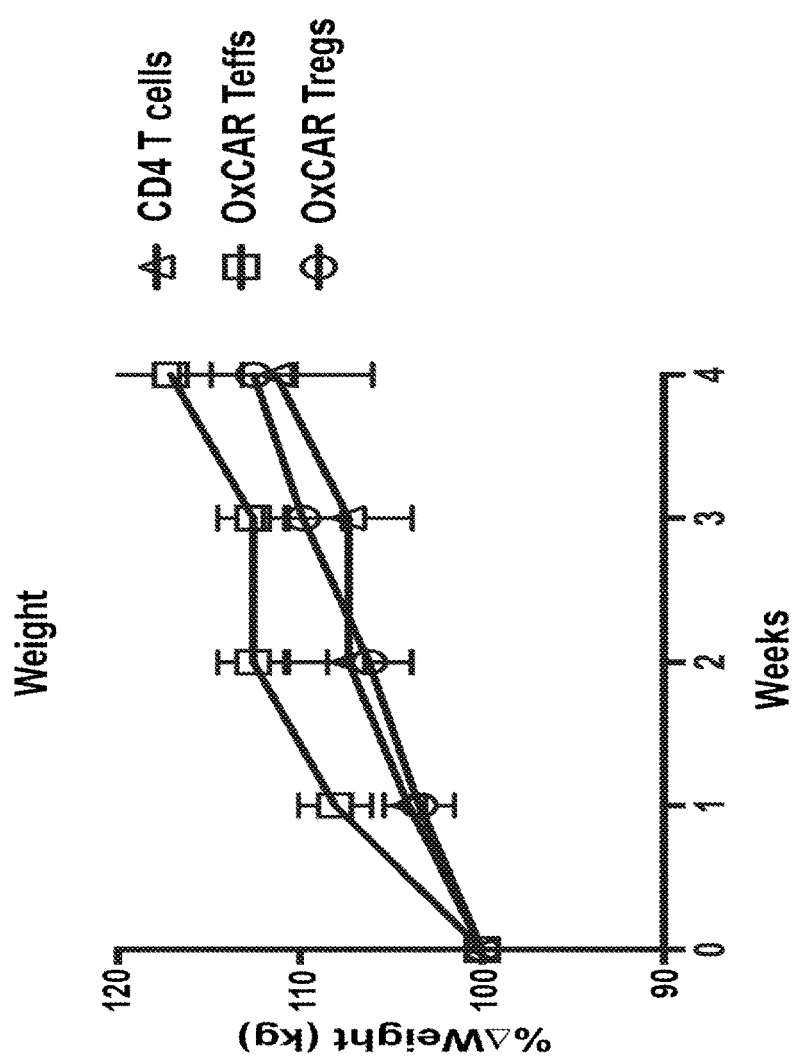
FIGS. 8A-8B illustrate the finding that OxCAR Tregs persist in vivo without toxicity.
Figure 8A:
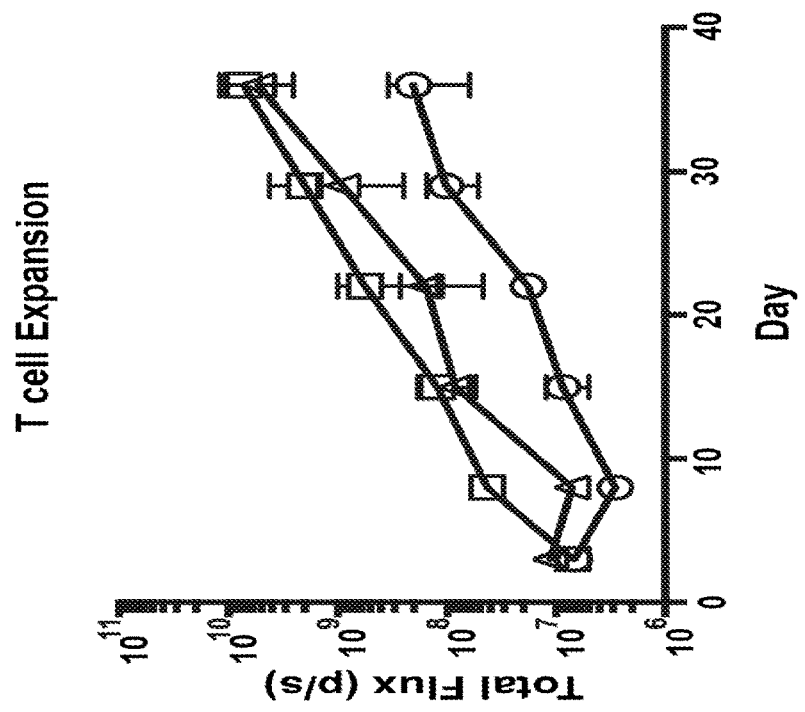

Given the concern for both on-target and off-target cytotoxicity of CARs targeting oxidation-specific epitopes, $1 \times 10^7$ human CBG-GFP+ CD4 T cells, CBG-GFP+ OxCAR Tregs and CBG-GFP+ OxCAR Teffs were infused into immunocompromised mice. For all treatments, T cells persisted and expanded over 30 days (FIG. 8A). This persistence and expansion was likely due to xeno-antigens, given that the NTD cells persisted as well. Of note, NSG mice fed a regular diet are not expected to develop atherosclerotic lesions. Treated mice continued to gain weight throughout the experiment and did not exhibit any overt toxicity, demonstrating a tolerable safety profile of the human OxCAR Tregs (FIG. 8B).

Example 9

Construction and Characterization of Murine OxCAR Tregs

Figure 9A:
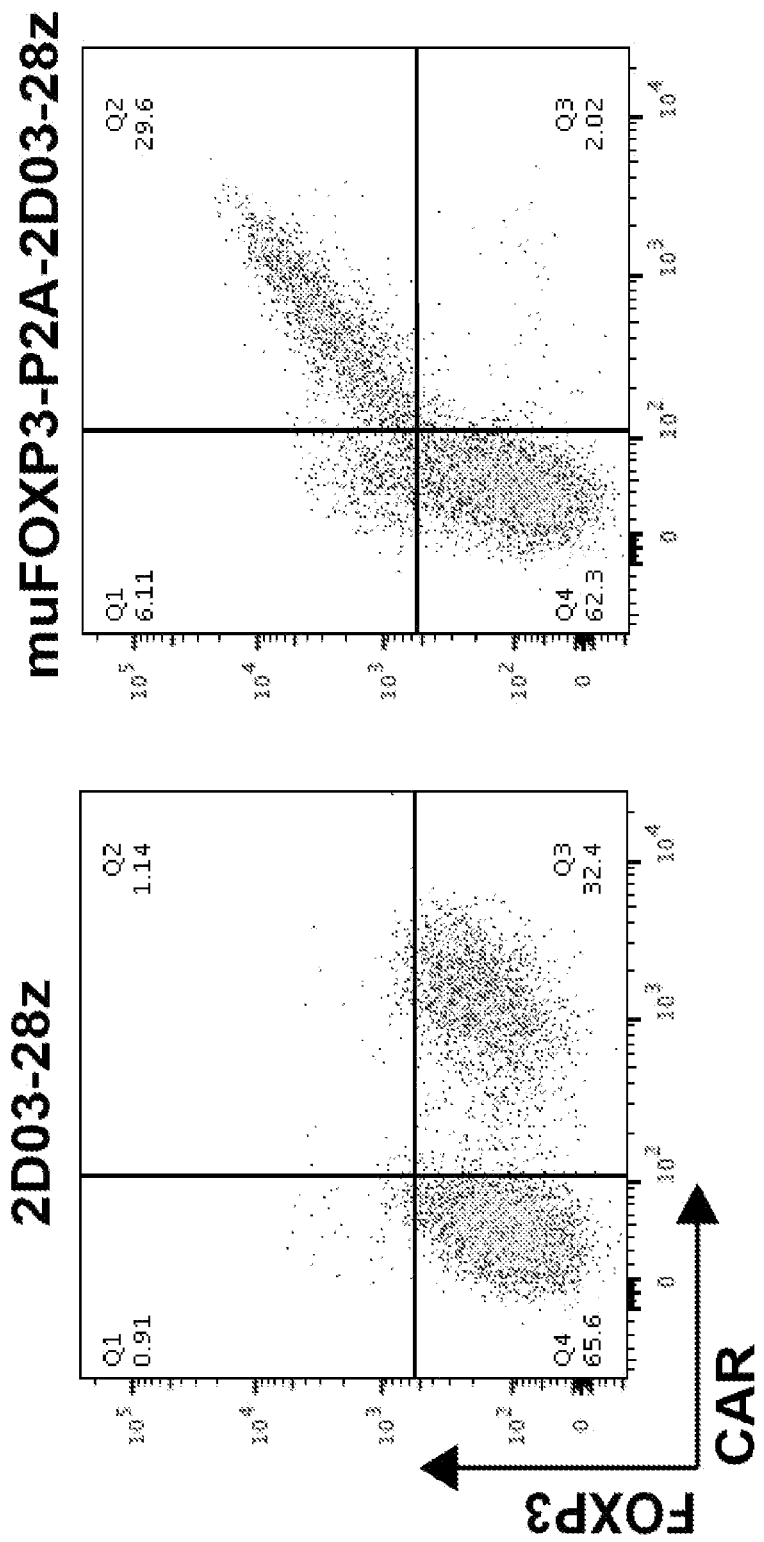
FIGS. 9A-9D illustrate characterization of muOxCAR Tregs.
Figure 9B:
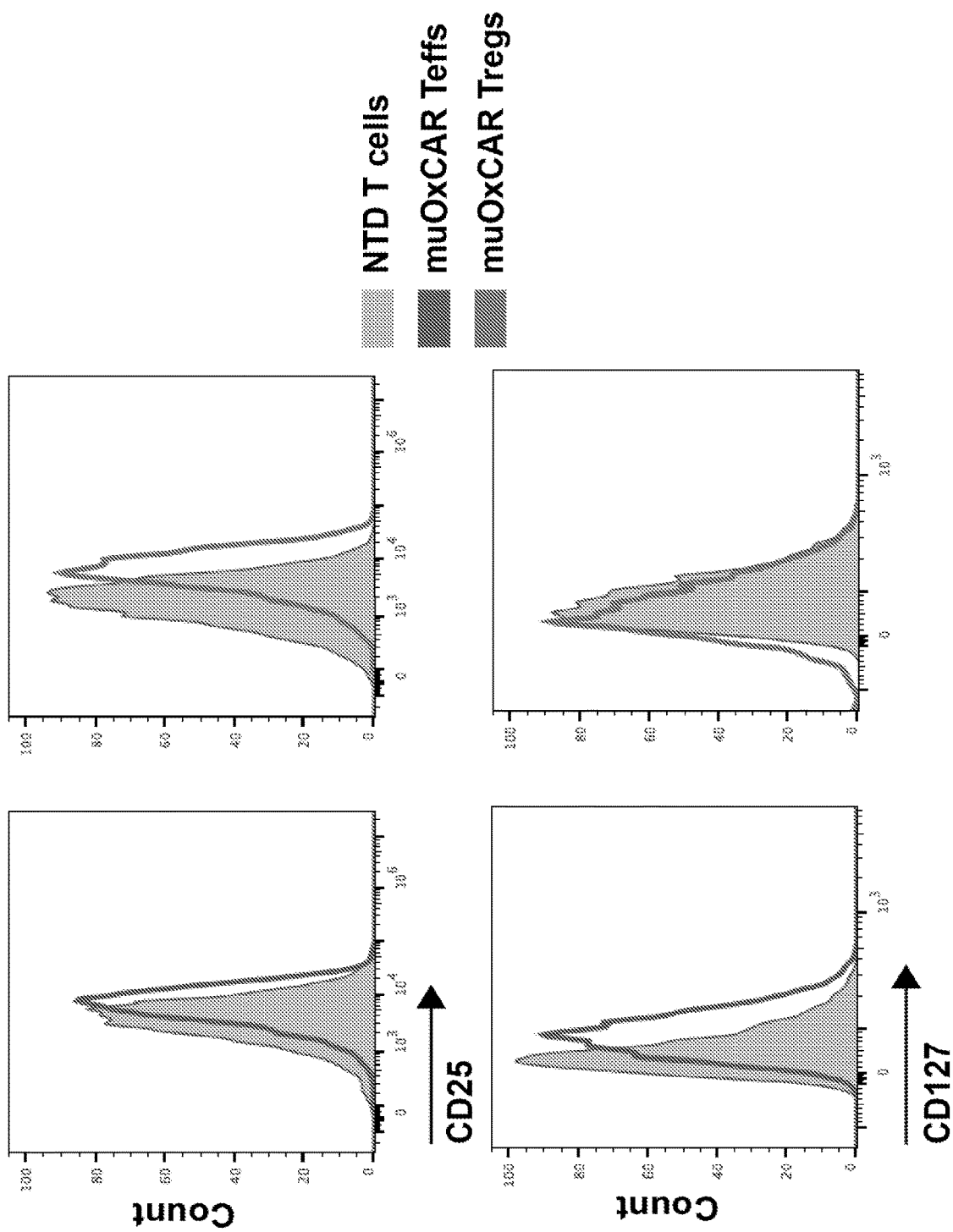
Figure 9C:
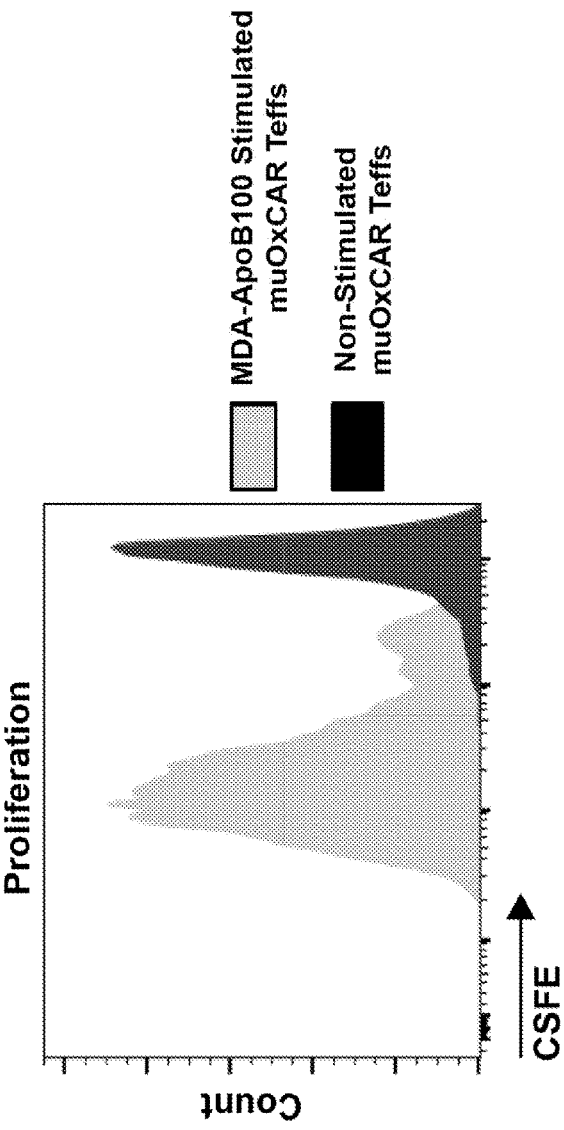
Figure 9D:
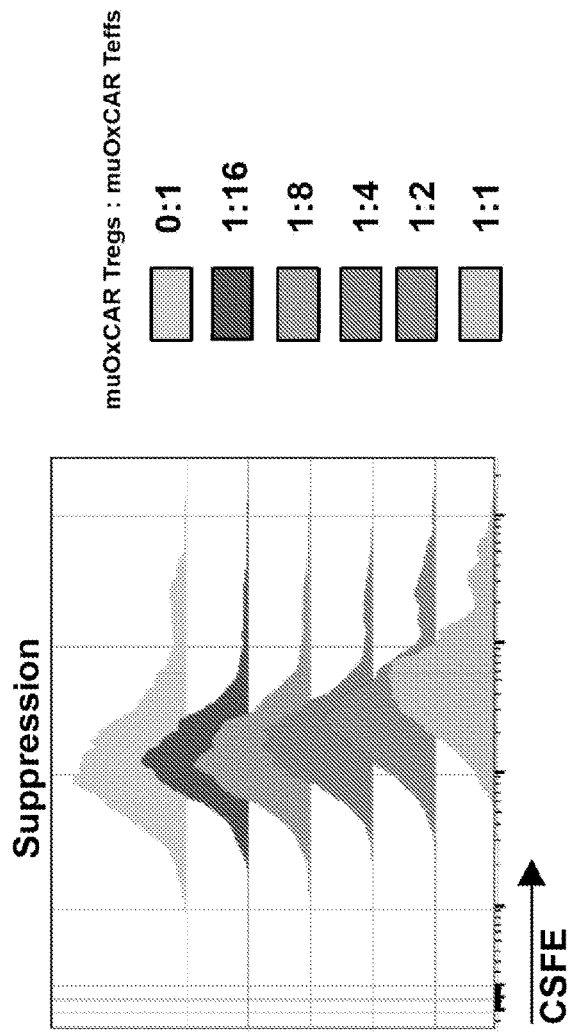

Standard in vivo models of atherosclerosis rely upon immunocompetent mice; therefore, the constructs were transitioned from human to murine in order to optimize the efficacy OxCAR Tregs in vivo. The human FOXP3 was replaced with murine FOXP3 (muFOXP3). No alterations were made to the CAR given prior efficacy of the 2D03 antibody and human CD28 in murine models. The bicistronic muFOXP3-CAR insert was inserted into a retroviral vector due to increased transduction efficiency of mouse T cells over lentivirus. CAR and muFOXP3 were highly expressed after activation and transduction of mouse CD4 T cells (FIG. 9A). Like the human CD4 T cells transduced with human FOXP3, the mouse OxCAR Tregs (muOxCAR Tregs) were phenotypically similar to endogenous Tregs (FIG. 9B). muOxCAR Teffs demonstrated a significant proliferative response upon MDA-ApoB100 stimulation (FIG. 9C), which was suppressed (FIG. 9D) in the presence of muOxCAR Tregs.

OTHER EMBODIMENTS

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An isolated chimeric antigen receptor (CAR) comprising an antigen binding domain specific for modified low-density lipoprotein (LDL), a transmembrane domain, and an intracellular domain, wherein the antigen binding domain comprises an scFv comprising the amino acid sequence set forth in SEQ ID NO: 6.

2. The isolated CAR of claim 1, wherein the modified LDL comprises oxidized LDL (OxLDL).

3. The isolated CAR of claim 1, wherein the modified LDL comprises an MDA/MDA-ApoB100 epitope present on oxidized LDL (OxLDL).

4. The isolated CAR of claim 1, wherein the modified LDL comprises modified ApoB100.

5. The isolated CAR of claim 1, wherein the modified LDL is selected from the group consisting of Cu-oxidized LDL, advanced glycation end products LDL (AGE-LDL), malondialdehyde-LDL, glycated-LDL, carbamylated LDL, desialylated LDL, apolipoprotein (a), and lipoprotein (a) (Lp-a), oxidized phosphatidylcholine containing oxidized phospholipids, 1-palmitoyl-2-(5-oxovaleroyl)-sn-glycero-3-phosphocholine (POVPC), oxidized 1-palmitoyl-2-arachidonoyl-sn-glycero-3-phosphocholine (OxPAPC), 4-hydroxynonenal (HNE), oxidized cholesteryl ester (OxCE), and oxidized cardiolipin (OxCL).

6. The isolated CAR of claim 1, wherein the transmembrane domain is selected from the group consisting of CD28, CD8α, ICOS, and GITR.

7. The isolated CAR of claim 1, wherein the transmembrane domain comprises an amino acid sequence selected from the group consisting of SEQ ID NO: 10, SEQ ID NO: 11, SEQ ID NO: 13, and SEQ ID NO: 14.

8. The isolated CAR of claim 1, wherein the intracellular domain is at least one selected from the group consisting of CD3zeta, CD28, 4-1BB, ICOS, GITR, and CD2.

9. The isolated CAR of claim 1, wherein the intracellular domain comprises an amino acid sequence selected from the group consisting of SEQ ID NO: 15, SEQ ID NO: 18, SEQ ID NO: 20, SEQ ID NO: 22, and SEQ ID NO: 23.

10. The isolated CAR of claim 1, wherein the intracellular domain comprises an amino acid sequence selected from the group consisting of SEQ ID NO: 24, and SEQ ID NO: 26.

11. The isolated CAR of claim 1, wherein the CAR further comprises a hinge domain.

12. The isolated CAR of claim 1, wherein the CAR further comprises a hinge domain comprising SEQ ID NO: 8.

13. The isolated CAR of claim 1, wherein the CAR comprises a 2D03 scFv, a CD8 α hinge domain, a CD28 transmembrane domain, a CD28 intracellular domain, and a CD3 zeta domain.

14. The isolated CAR of claim 1, wherein the CAR comprises a 2D03 scFv, a CD8α hinge domain, a CD8α transmembrane domain, a 4-1BB intracellular domain, and a CD3 zeta domain.

15. The isolated CAR of claim 1, wherein the CAR comprises the amino acid sequence of SEQ ID NO: 2.

16. The isolated CAR of claim 1, wherein the CAR comprises a 2D03 scFv, a CD8α hinge domain, an ICOS transmembrane domain, an ICOS intracellular domain, and a CD3 zeta domain.

17. The isolated CAR of claim 1, wherein the CAR comprises the amino acid sequence of SEQ ID NO: 3.

18. The isolated CAR of claim 1, wherein the CAR comprises, a 2D03 scFv, a CD8α hinge domain, a GITR transmembrane domain, a GITR intracellular domain, and a CD3 zeta domain.

19. The isolated CAR of claim 1, wherein the CAR comprises the amino acid sequence of SEQ ID NO: 4.

20. The isolated CAR of claim 1, wherein the CAR comprises a 2D03 scFv, a CD8α hinge domain, a CD8α transmembrane domain, a CD2 intracellular domain, and a CD3 zeta+domain.

21. The isolated CAR of claim 1, wherein the CAR comprises the amino acid sequence of SEQ ID NO: 5.

22. An isolated nucleic acid encoding the chimeric antigen receptor (CAR) of claim 1.

23. A vector comprising the isolated nucleic acid of claim 22.

24. A modified T cell comprising the isolated nucleic acid of claim 22.

25. The modified T cell of claim 24, wherein the T cell is an autologous T cell.

26. The modified T cell of claim 24, wherein the T cell is a regulatory T (Treg) cell.

27. The modified T cell of claim 24, wherein the T cell is a CD4+ T cell.

28. The modified T cell of claim 27, wherein the CD4+ T cell is converted to a regulatory T (Treg) cell.

29. An isolated chimeric antigen receptor (CAR) comprising an antigen binding domain specific for modified low-density lipoprotein (LDL), a transmembrane domain, and an intracellular domain, wherein the CAR comprises the amino acid sequence of SEQ ID NO: 1.

* * * * *

SEQUENCE LISTING

<160> NUMBER OF SEQ ID NOS: 40

<210> SEQ ID NO 1
<211> LENGTH: 496
<212> TYPE: PRT
<213> ORGANISM: Artificial Sequence
<220> FEATURE:
<223> OTHER INFORMATION: 2D03-28z CAR

<400> SEQUENCE: 1

```
Met Ala Leu Pro Val Thr Ala Leu Leu Leu Pro Leu Ala Leu Leu Leu
1               5                   10                  15

His Ala Ala Arg Pro Gly Ser Gln Ser Val Leu Thr Gln Pro Pro Ser
            20                  25                  30

Ala Ser Gly Thr Pro Gly Gln Arg Val Thr Ile Ser Cys Ser Gly Ser
        35                  40                  45

Asn Thr Asn Ile Gly Lys Asn Tyr Val Ser Trp Tyr Gln Gln Leu Pro
50                  55                  60

Gly Thr Ala Pro Lys Leu Leu Ile Tyr Ala Asn Ser Asn Arg Pro Ser
65                  70                  75                  80

Gly Val Pro Asp Arg Phe Ser Gly Ser Lys Ser Gly Thr Ser Ala Ser
                85                  90                  95

Leu Ala Ile Ser Gly Leu Arg Ser Glu Asp Glu Ala Asp Tyr Tyr Cys
            100                 105                 110

Ala Ser Trp Asp Ala Ser Leu Asn Gly Trp Val Phe Gly Gly Gly Thr
        115                 120                 125

Lys Leu Thr Val Leu Gly Gly Gly Ser Gly Gly Gly Ser Gly
130                 135                 140

Gly Gly Gly Ser Glu Val Gln Leu Leu Glu Ser Gly Gly Gly Leu Val
145                 150                 155                 160

Gln Pro Gly Gly Ser Leu Arg Leu Ser Cys Ala Ala Ser Gly Phe Thr
                165                 170                 175

Phe Ser Asn Ala Trp Met Ser Trp Val Arg Gln Ala Pro Gly Lys Gly
            180                 185                 190

Leu Glu Trp Val Ser Ser Ile Ser Val Gly Gly His Arg Thr Tyr Tyr
        195                 200                 205

Ala Asp Ser Val Lys Gly Arg Ser Thr Ile Ser Arg Asp Asn Ser Lys
210                 215                 220

Asn Thr Leu Tyr Leu Gln Met Asn Ser Leu Arg Ala Glu Asp Thr Ala
225                 230                 235                 240

Val Tyr Tyr Cys Ala Arg Ile Arg Val Gly Pro Ser Gly Ala Phe
                245                 250                 255

Asp Tyr Trp Gly Gln Gly Thr Leu Val Thr Val Ser Ser Gly Thr
            260                 265                 270

Thr Thr Pro Ala Pro Arg Pro Pro Thr Pro Ala Pro Thr Ile Ala Ser
        275                 280                 285

Gln Pro Leu Ser Leu Arg Pro Glu Ala Cys Arg Pro Ala Ala Gly Gly
    290                 295                 300

Ala Val His Thr Arg Gly Leu Asp Phe Ala Cys Asp Phe Trp Val Leu
305                 310                 315                 320

Val Val Val Gly Gly Val Leu Ala Cys Tyr Ser Leu Leu Val Thr Val
                325                 330                 335

Ala Phe Ile Ile Phe Trp Val Arg Ser Lys Arg Ser Arg Leu Leu His
            340                 345                 350

Ser Asp Tyr Met Asn Met Thr Pro Arg Arg Pro Gly Pro Thr Arg Lys
```

-continued

```
                    355                 360                 365
His Tyr Gln Pro Tyr Ala Pro Pro Arg Asp Phe Ala Ala Tyr Arg Ser
        370                 375                 380

Arg Val Lys Phe Ser Arg Ser Ala Asp Ala Pro Ala Tyr Lys Gln Gly
385                 390                 395                 400

Gln Asn Gln Leu Tyr Asn Glu Leu Asn Leu Gly Arg Arg Glu Glu Tyr
                405                 410                 415

Asp Val Leu Asp Lys Arg Arg Gly Arg Asp Pro Glu Met Gly Gly Lys
            420                 425                 430

Pro Arg Arg Lys Asn Pro Gln Glu Gly Leu Tyr Asn Glu Leu Gln Lys
                435                 440                 445

Asp Lys Met Ala Glu Ala Tyr Ser Glu Ile Gly Met Lys Gly Glu Arg
            450                 455                 460

Arg Arg Gly Lys Gly His Asp Gly Leu Tyr Gln Gly Leu Ser Thr Ala
465                 470                 475                 480

Thr Lys Asp Thr Tyr Asp Ala Leu His Met Gln Ala Leu Pro Pro Arg
                485                 490                 495
```

<210> SEQ ID NO 2
<211> LENGTH: 494
<212> TYPE: PRT
<213> ORGANISM: Artificial Sequence
<220> FEATURE:
<223> OTHER INFORMATION: 2D03-BBz CAR

<400> SEQUENCE: 2

```
Met Ala Leu Pro Val Thr Ala Leu Leu Leu Pro Leu Ala Leu Leu Leu
1               5                   10                  15

His Ala Ala Arg Pro Gly Ser Gln Ser Val Leu Thr Gln Pro Pro Ser
                20                  25                  30

Ala Ser Gly Thr Pro Gly Gln Arg Val Thr Ile Ser Cys Ser Gly Ser
            35                  40                  45

Asn Thr Asn Ile Gly Lys Asn Tyr Val Ser Trp Tyr Gln Gln Leu Pro
        50                  55                  60

Gly Thr Ala Pro Lys Leu Leu Ile Tyr Ala Asn Ser Asn Arg Pro Ser
65                  70                  75                  80

Gly Val Pro Asp Arg Phe Ser Gly Ser Lys Ser Gly Thr Ser Ala Ser
                85                  90                  95

Leu Ala Ile Ser Gly Leu Arg Ser Glu Asp Glu Ala Asp Tyr Tyr Cys
                100                 105                 110

Ala Ser Trp Asp Ala Ser Leu Asn Gly Trp Val Phe Gly Gly Gly Thr
            115                 120                 125

Lys Leu Thr Val Leu Gly Gly Gly Gly Ser Gly Gly Gly Gly Ser Gly
        130                 135                 140

Gly Gly Gly Ser Glu Val Gln Leu Leu Glu Ser Gly Gly Gly Leu Val
145                 150                 155                 160

Gln Pro Gly Gly Ser Leu Arg Leu Ser Cys Ala Ala Ser Gly Phe Thr
                165                 170                 175

Phe Ser Asn Ala Trp Met Ser Trp Val Arg Gln Ala Pro Gly Lys Gly
            180                 185                 190

Leu Glu Trp Val Ser Ser Ile Ser Val Gly Gly His Arg Thr Tyr Tyr
        195                 200                 205

Ala Asp Ser Val Lys Gly Arg Ser Thr Ile Ser Arg Asp Asn Ser Lys
    210                 215                 220

Asn Thr Leu Tyr Leu Gln Met Asn Ser Leu Arg Ala Glu Asp Thr Ala
```

```
                225                 230                 235                 240
Val Tyr Tyr Cys Ala Arg Ile Arg Val Gly Pro Ser Gly Gly Ala Phe
            245                 250                 255

Asp Tyr Trp Gly Gln Gly Thr Leu Val Thr Val Ser Ser Gly Thr
        260                 265                 270

Thr Thr Pro Ala Pro Arg Pro Thr Pro Ala Pro Thr Ile Ala Ser
        275                 280                 285

Gln Pro Leu Ser Leu Arg Pro Glu Ala Cys Arg Pro Ala Ala Gly Gly
    290                 295                 300

Ala Val His Thr Arg Gly Leu Asp Phe Ala Cys Asp Ile Tyr Ile Trp
305                 310                 315                 320

Ala Pro Leu Ala Gly Thr Cys Gly Val Leu Leu Leu Ser Leu Val Ile
                325                 330                 335

Thr Leu Tyr Cys Lys Arg Gly Arg Lys Lys Leu Leu Tyr Ile Phe Lys
                340                 345                 350

Gln Pro Phe Met Arg Pro Val Gln Thr Thr Gln Glu Glu Asp Gly Cys
            355                 360                 365

Ser Cys Arg Phe Pro Glu Glu Glu Glu Gly Gly Cys Glu Leu Arg Val
        370                 375                 380

Lys Phe Ser Arg Ser Ala Asp Ala Pro Ala Tyr Lys Gln Gly Gln Asn
385                 390                 395                 400

Gln Leu Tyr Asn Glu Leu Asn Leu Gly Arg Arg Glu Glu Tyr Asp Val
                405                 410                 415

Leu Asp Lys Arg Arg Gly Arg Asp Pro Glu Met Gly Gly Lys Pro Arg
            420                 425                 430

Arg Lys Asn Pro Gln Glu Gly Leu Tyr Asn Glu Leu Gln Lys Asp Lys
        435                 440                 445

Met Ala Glu Ala Tyr Ser Glu Ile Gly Met Lys Gly Glu Arg Arg Arg
    450                 455                 460

Gly Lys Gly His Asp Gly Leu Tyr Gln Gly Leu Ser Thr Ala Thr Lys
465                 470                 475                 480

Asp Thr Tyr Asp Ala Leu His Met Gln Ala Leu Pro Pro Arg
                485                 490

<210> SEQ ID NO 3
<211> LENGTH: 491
<212> TYPE: PRT
<213> ORGANISM: Artificial Sequence
<220> FEATURE:
<223> OTHER INFORMATION: 2D03-ICOSz CAR

<400> SEQUENCE: 3

Met Ala Leu Pro Val Thr Ala Leu Leu Leu Pro Leu Ala Leu Leu Leu
1               5                   10                  15

His Ala Ala Arg Pro Gly Ser Gln Ser Val Leu Thr Gln Pro Pro Ser
            20                  25                  30

Ala Ser Gly Thr Pro Gly Gln Arg Val Thr Ile Ser Cys Ser Gly Ser
        35                  40                  45

Asn Thr Asn Ile Gly Lys Asn Tyr Val Ser Trp Tyr Gln Gln Leu Pro
    50                  55                  60

Gly Thr Ala Pro Lys Leu Leu Ile Tyr Ala Asn Ser Asn Arg Pro Ser
65                  70                  75                  80

Gly Val Pro Asp Arg Phe Ser Gly Ser Lys Ser Gly Thr Ser Ala Ser
                85                  90                  95

Leu Ala Ile Ser Gly Leu Arg Ser Glu Asp Glu Ala Asp Tyr Tyr Cys
```

```
            100                 105                 110
Ala Ser Trp Asp Ala Ser Leu Asn Gly Trp Val Phe Gly Gly Gly Thr
            115                 120                 125
Lys Leu Thr Val Leu Gly Gly Gly Ser Gly Gly Gly Ser Gly
            130                 135             140
Gly Gly Gly Ser Glu Val Gln Leu Leu Glu Ser Gly Gly Gly Leu Val
145                 150                 155                 160
Gln Pro Gly Gly Ser Leu Arg Leu Ser Cys Ala Ala Ser Gly Phe Thr
                        165                 170                 175
Phe Ser Asn Ala Trp Met Ser Trp Val Arg Gln Ala Pro Gly Lys Gly
                180                 185                 190
Leu Glu Trp Val Ser Ser Ile Ser Val Gly Gly His Arg Thr Tyr Tyr
            195                 200                 205
Ala Asp Ser Val Lys Gly Arg Ser Thr Ile Ser Arg Asp Asn Ser Lys
210                 215                 220
Asn Thr Leu Tyr Leu Gln Met Asn Ser Leu Arg Ala Glu Asp Thr Ala
225                 230                 235                 240
Val Tyr Tyr Cys Ala Arg Ile Arg Val Gly Pro Ser Gly Gly Ala Phe
                    245                 250                 255
Asp Tyr Trp Gly Gln Gly Thr Leu Val Thr Val Ser Ser Gly Thr
                260                 265                 270
Thr Thr Pro Ala Pro Arg Pro Pro Thr Pro Ala Pro Thr Ile Ala Ser
            275                 280                 285
Gln Pro Leu Ser Leu Arg Pro Glu Ala Cys Arg Pro Ala Ala Gly Gly
        290                 295                 300
Ala Val His Thr Arg Gly Leu Asp Phe Ala Cys Asp Phe Glu Phe Trp
305                 310                 315                 320
Leu Pro Ile Gly Cys Ala Ala Phe Val Val Cys Ile Leu Gly Cys
                    325                 330                 335
Ile Leu Ile Cys Trp Leu Thr Lys Lys Lys Tyr Ser Ser Ser Val His
                340                 345                 350
Asp Pro Asn Gly Glu Tyr Met Phe Met Arg Ala Val Asn Thr Ala Lys
            355                 360                 365
Lys Ser Arg Leu Thr Asp Val Thr Leu Thr Ser Arg Val Lys Phe Ser
370                 375                 380
Arg Ser Ala Asp Ala Pro Ala Tyr Lys Gln Gly Gln Asn Gln Leu Tyr
385                 390                 395                 400
Asn Glu Leu Asn Leu Gly Arg Arg Glu Glu Tyr Asp Val Leu Asp Lys
                    405                 410                 415
Arg Arg Gly Arg Asp Pro Glu Met Gly Gly Lys Pro Arg Arg Lys Asn
                420                 425                 430
Pro Gln Glu Gly Leu Tyr Asn Glu Leu Gln Lys Asp Lys Met Ala Glu
            435                 440                 445
Ala Tyr Ser Glu Ile Gly Met Lys Gly Glu Arg Arg Arg Gly Lys Gly
450                 455                 460
His Asp Gly Leu Tyr Gln Gly Leu Ser Thr Ala Thr Lys Asp Thr Tyr
465                 470                 475                 480
Asp Ala Leu His Met Gln Ala Leu Pro Pro Arg
                    485                 490

<210> SEQ ID NO 4
<211> LENGTH: 509
<212> TYPE: PRT
<213> ORGANISM: Artificial Sequence
```

<220> FEATURE:
<223> OTHER INFORMATION: 2D03-GITRz CAR

<400> SEQUENCE: 4

```
Met Ala Leu Pro Val Thr Ala Leu Leu Leu Pro Leu Ala Leu Leu Leu
1               5                   10                  15

His Ala Ala Arg Pro Gly Ser Gln Ser Val Leu Thr Gln Pro Pro Ser
            20                  25                  30

Ala Ser Gly Thr Pro Gly Gln Arg Val Thr Ile Ser Cys Ser Gly Ser
        35                  40                  45

Asn Thr Asn Ile Gly Lys Asn Tyr Val Ser Trp Tyr Gln Gln Leu Pro
50                  55                  60

Gly Thr Ala Pro Lys Leu Leu Ile Tyr Ala Asn Ser Asn Arg Pro Ser
65                  70                  75                  80

Gly Val Pro Asp Arg Phe Ser Gly Ser Lys Ser Gly Thr Ser Ala Ser
                85                  90                  95

Leu Ala Ile Ser Gly Leu Arg Ser Glu Asp Glu Ala Asp Tyr Tyr Cys
            100                 105                 110

Ala Ser Trp Asp Ala Ser Leu Asn Gly Trp Val Phe Gly Gly Gly Thr
        115                 120                 125

Lys Leu Thr Val Leu Gly Gly Gly Gly Ser Gly Gly Gly Gly Ser Gly
130                 135                 140

Gly Gly Gly Ser Glu Val Gln Leu Leu Glu Ser Gly Gly Gly Leu Val
145                 150                 155                 160

Gln Pro Gly Gly Ser Leu Arg Leu Ser Cys Ala Ala Ser Gly Phe Thr
                165                 170                 175

Phe Ser Asn Ala Trp Met Ser Trp Val Arg Gln Ala Pro Gly Lys Gly
            180                 185                 190

Leu Glu Trp Val Ser Ser Ile Ser Val Gly Gly His Arg Thr Tyr Tyr
        195                 200                 205

Ala Asp Ser Val Lys Gly Arg Ser Thr Ile Ser Arg Asp Asn Ser Lys
210                 215                 220

Asn Thr Leu Tyr Leu Gln Met Asn Ser Leu Arg Ala Glu Asp Thr Ala
225                 230                 235                 240

Val Tyr Tyr Cys Ala Arg Ile Arg Val Gly Pro Ser Gly Gly Ala Phe
                245                 250                 255

Asp Tyr Trp Gly Gln Gly Thr Leu Val Thr Val Ser Ser Gly Thr
            260                 265                 270

Thr Thr Pro Ala Pro Arg Pro Pro Thr Pro Ala Pro Thr Ile Ala Ser
        275                 280                 285

Gln Pro Leu Ser Leu Arg Pro Glu Ala Cys Arg Pro Ala Ala Gly Gly
290                 295                 300

Ala Val His Thr Arg Gly Leu Asp Phe Ala Cys Asp Ile Leu Gly Trp
305                 310                 315                 320

Leu Thr Val Val Leu Leu Ala Val Ala Ala Cys Val Leu Leu Leu Thr
                325                 330                 335

Ser Ala Gln Leu Gly Leu His Ile Trp Gln Leu Arg Ser Gln Cys Met
            340                 345                 350

Trp Pro Arg Glu Thr Gln Leu Leu Leu Glu Val Pro Pro Ser Thr Glu
        355                 360                 365

Asp Ala Arg Ser Cys Gln Phe Pro Glu Glu Glu Arg Gly Glu Arg Ser
370                 375                 380

Ala Glu Glu Lys Gly Arg Leu Gly Asp Leu Trp Val Leu Arg Val Lys
385                 390                 395                 400
```

-continued

```
Phe Ser Arg Ser Ala Asp Ala Pro Ala Tyr Lys Gln Gly Gln Asn Gln
                405                 410                 415

Leu Tyr Asn Glu Leu Asn Leu Gly Arg Arg Glu Tyr Asp Val Leu
        420                 425                 430

Asp Lys Arg Arg Gly Arg Asp Pro Glu Met Gly Gly Lys Pro Arg Arg
            435                 440                 445

Lys Asn Pro Gln Glu Gly Leu Tyr Asn Glu Leu Gln Lys Asp Lys Met
    450                 455                 460

Ala Glu Ala Tyr Ser Glu Ile Gly Met Lys Gly Glu Arg Arg Arg Gly
465                 470                 475                 480

Lys Gly His Asp Gly Leu Tyr Gln Gly Leu Ser Thr Ala Thr Lys Asp
                485                 490                 495

Thr Tyr Asp Ala Leu His Met Gln Ala Leu Pro Pro Arg
            500                 505

<210> SEQ ID NO 5
<211> LENGTH: 569
<212> TYPE: PRT
<213> ORGANISM: Artificial Sequence
<220> FEATURE:
<223> OTHER INFORMATION: 2D03-CD2z CAR

<400> SEQUENCE: 5

Met Ala Leu Pro Val Thr Ala Leu Leu Leu Pro Leu Ala Leu Leu Leu
1               5                   10                  15

His Ala Ala Arg Pro Gly Ser Gln Ser Val Leu Thr Gln Pro Pro Ser
            20                  25                  30

Ala Ser Gly Thr Pro Gly Gln Arg Val Thr Ile Ser Cys Ser Gly Ser
        35                  40                  45

Asn Thr Asn Ile Gly Lys Asn Tyr Val Ser Trp Tyr Gln Gln Leu Pro
    50                  55                  60

Gly Thr Ala Pro Lys Leu Leu Ile Tyr Ala Asn Ser Asn Arg Pro Ser
65                  70                  75                  80

Gly Val Pro Asp Arg Phe Ser Gly Ser Lys Ser Gly Thr Ser Ala Ser
                85                  90                  95

Leu Ala Ile Ser Gly Leu Arg Ser Glu Asp Glu Ala Asp Tyr Tyr Cys
            100                 105                 110

Ala Ser Trp Asp Ala Ser Leu Asn Gly Trp Val Phe Gly Gly Gly Thr
        115                 120                 125

Lys Leu Thr Val Leu Gly Gly Gly Gly Ser Gly Gly Gly Gly Ser Gly
    130                 135                 140

Gly Gly Gly Ser Glu Val Gln Leu Leu Glu Ser Gly Gly Gly Leu Val
145                 150                 155                 160

Gln Pro Gly Gly Ser Leu Arg Leu Ser Cys Ala Ala Ser Gly Phe Thr
                165                 170                 175

Phe Ser Asn Ala Trp Met Ser Trp Val Arg Gln Ala Pro Gly Lys Gly
            180                 185                 190

Leu Glu Trp Val Ser Ser Ile Ser Val Gly Gly His Arg Thr Tyr Tyr
        195                 200                 205

Ala Asp Ser Val Lys Gly Arg Ser Thr Ile Ser Arg Asp Asn Ser Lys
    210                 215                 220

Asn Thr Leu Tyr Leu Gln Met Asn Ser Leu Arg Ala Glu Asp Thr Ala
225                 230                 235                 240

Val Tyr Tyr Cys Ala Arg Ile Arg Val Gly Pro Ser Gly Gly Ala Phe
                245                 250                 255
```

Asp Tyr Trp Gly Gln Gly Thr Leu Val Thr Val Ser Ser Gly Thr
                260                 265                 270

Thr Thr Pro Ala Pro Arg Pro Pro Thr Pro Ala Pro Thr Ile Ala Ser
275                 280                 285

Gln Pro Leu Ser Leu Arg Pro Glu Ala Cys Arg Pro Ala Ala Gly Gly
            290                 295                 300

Ala Val His Thr Arg Gly Leu Asp Phe Ala Cys Asp Ile Tyr Ile Trp
305                 310                 315                 320

Ala Pro Leu Ala Gly Thr Cys Gly Val Leu Leu Leu Ser Leu Val Ile
                325                 330                 335

Thr Leu Tyr Cys Thr Lys Arg Lys Lys Gln Arg Ser Arg Arg Asn Asp
            340                 345                 350

Glu Glu Leu Glu Thr Arg Ala His Arg Val Ala Thr Glu Glu Arg Gly
        355                 360                 365

Arg Lys Pro His Gln Ile Pro Ala Ser Thr Pro Gln Asn Pro Ala Thr
    370                 375                 380

Ser Gln His Pro Pro Pro Pro Gly His Arg Ser Gln Ala Pro Ser
385                 390                 395                 400

His Arg Pro Pro Pro Gly His Arg Val Gln His Gln Pro Gln Lys
                405                 410                 415

Arg Pro Pro Ala Pro Ser Gly Thr Gln Val His Gln Gln Lys Gly Pro
            420                 425                 430

Pro Leu Pro Arg Pro Arg Val Gln Pro Lys Pro Pro His Gly Ala Ala
        435                 440                 445

Glu Asn Ser Leu Ser Pro Ser Ser Asn Arg Val Lys Phe Ser Arg Ser
    450                 455                 460

Ala Asp Ala Pro Ala Tyr Lys Gln Gly Gln Asn Gln Leu Tyr Asn Glu
465                 470                 475                 480

Leu Asn Leu Gly Arg Arg Glu Glu Tyr Asp Val Leu Asp Lys Arg Arg
                485                 490                 495

Gly Arg Asp Pro Glu Met Gly Gly Lys Pro Arg Arg Lys Asn Pro Gln
            500                 505                 510

Glu Gly Leu Tyr Asn Glu Leu Gln Lys Asp Lys Met Ala Glu Ala Tyr
        515                 520                 525

Ser Glu Ile Gly Met Lys Gly Glu Arg Arg Arg Gly Lys Gly His Asp
    530                 535                 540

Gly Leu Tyr Gln Gly Leu Ser Thr Ala Thr Lys Asp Thr Tyr Asp Ala
545                 550                 555                 560

Leu His Met Gln Ala Leu Pro Pro Arg
                565

<210> SEQ ID NO 6
<211> LENGTH: 246
<212> TYPE: PRT
<213> ORGANISM: Artificial Sequence
<220> FEATURE:
<223> OTHER INFORMATION: 2D03 scFv

<400> SEQUENCE: 6

Gln Ser Val Leu Thr Gln Pro Pro Ser Ala Ser Gly Thr Pro Gly Gln
1               5                   10                  15

Arg Val Thr Ile Ser Cys Ser Gly Ser Asn Thr Asn Ile Gly Lys Asn
            20                  25                  30

Tyr Val Ser Trp Tyr Gln Gln Leu Pro Gly Thr Ala Pro Lys Leu Leu
        35                  40                  45

```
Ile Tyr Ala Asn Ser Asn Arg Pro Ser Gly Val Pro Asp Arg Phe Ser
     50                  55                  60

Gly Ser Lys Ser Gly Thr Ser Ala Ser Leu Ala Ile Ser Gly Leu Arg
 65                  70                  75                  80

Ser Glu Asp Glu Ala Asp Tyr Tyr Cys Ala Ser Trp Asp Ala Ser Leu
                 85                  90                  95

Asn Gly Trp Val Phe Gly Gly Gly Thr Lys Leu Thr Val Leu Gly Gly
            100                 105                 110

Gly Gly Ser Gly Gly Gly Gly Ser Gly Gly Gly Gly Ser Glu Val Gln
            115                 120                 125

Leu Leu Glu Ser Gly Gly Gly Leu Val Gln Pro Gly Gly Ser Leu Arg
    130                 135                 140

Leu Ser Cys Ala Ala Ser Gly Phe Thr Phe Ser Asn Ala Trp Met Ser
145                 150                 155                 160

Trp Val Arg Gln Ala Pro Gly Lys Gly Leu Glu Trp Val Ser Ser Ile
                165                 170                 175

Ser Val Gly Gly His Arg Thr Tyr Tyr Ala Asp Ser Val Lys Gly Arg
            180                 185                 190

Ser Thr Ile Ser Arg Asp Asn Ser Lys Asn Thr Leu Tyr Leu Gln Met
        195                 200                 205

Asn Ser Leu Arg Ala Glu Asp Thr Ala Val Tyr Tyr Cys Ala Arg Ile
    210                 215                 220

Arg Val Gly Pro Ser Gly Gly Ala Phe Asp Tyr Trp Gly Gln Gly Thr
225                 230                 235                 240

Leu Val Thr Val Ser Ser
                245

<210> SEQ ID NO 7
<211> LENGTH: 21
<212> TYPE: PRT
<213> ORGANISM: Artificial Sequence
<220> FEATURE:
<223> OTHER INFORMATION: CD8a Leader

<400> SEQUENCE: 7

Met Ala Leu Pro Val Thr Ala Leu Leu Leu Pro Leu Ala Leu Leu Leu
 1               5                  10                  15

His Ala Ala Arg Pro
            20

<210> SEQ ID NO 8
<211> LENGTH: 45
<212> TYPE: PRT
<213> ORGANISM: Artificial Sequence
<220> FEATURE:
<223> OTHER INFORMATION: CD8 alpha hinge

<400> SEQUENCE: 8

Thr Thr Thr Pro Ala Pro Arg Pro Pro Thr Pro Ala Pro Thr Ile Ala
 1               5                  10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
            35                  40                  45

<210> SEQ ID NO 9
<211> LENGTH: 135
<212> TYPE: DNA
```

```
<213> ORGANISM: Artificial Sequence
<220> FEATURE:
<223> OTHER INFORMATION: CD8 alpha hinge

<400> SEQUENCE: 9
accacgacgc cagcgccgcg accaccaaca ccggcgccca ccatcgcgtc gcagcccctg      60
tccctgcgcc cagaggcgtg ccggccagcg gcggggggcg cagtgcacac gagggggctg     120
gacttcgcct gtgat                                                    135

<210> SEQ ID NO 10
<211> LENGTH: 24
<212> TYPE: PRT
<213> ORGANISM: Artificial Sequence
<220> FEATURE:
<223> OTHER INFORMATION: CD28 transmembrane domain

<400> SEQUENCE: 10

Phe Trp Val Leu Val Val Val Gly Gly Val Leu Ala Cys Tyr Ser Leu
1               5                   10                  15

Leu Val Thr Val Ala Phe Ile Ile
            20

<210> SEQ ID NO 11
<211> LENGTH: 24
<212> TYPE: PRT
<213> ORGANISM: Artificial Sequence
<220> FEATURE:
<223> OTHER INFORMATION: CD8a transmembrane domain

<400> SEQUENCE: 11

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 12
<211> LENGTH: 72
<212> TYPE: DNA
<213> ORGANISM: Artificial Sequence
<220> FEATURE:
<223> OTHER INFORMATION: CD8 transmembrane domain

<400> SEQUENCE: 12
atctacatct gggcgccctt ggccgggact tgtgggggtcc ttctcctgtc actggttatc    60 acccttact gc                                                          72

<210> SEQ ID NO 13
<211> LENGTH: 24
<212> TYPE: PRT
<213> ORGANISM: Artificial Sequence
<220> FEATURE:
<223> OTHER INFORMATION: ICOS transmembrane domain

<400> SEQUENCE: 13

Phe Trp Leu Pro Ile Gly Cys Ala Ala Phe Val Val Cys Ile Leu
1               5                   10                  15

Gly Cys Ile Leu Ile Cys Trp Leu
            20

<210> SEQ ID NO 14
<211> LENGTH: 25
<212> TYPE: PRT
<213> ORGANISM: Artificial Sequence
```

<220> FEATURE:
<223> OTHER INFORMATION: GITR transmembrane domain

<400> SEQUENCE: 14

Leu Gly Trp Leu Thr Val Val Leu Ala Val Ala Ala Cys Val Leu
1               5                   10                  15

Leu Leu Thr Ser Ala Gln Leu Gly Leu
            20                  25

<210> SEQ ID NO 15
<211> LENGTH: 44
<212> TYPE: PRT
<213> ORGANISM: Artificial Sequence
<220> FEATURE:
<223> OTHER INFORMATION: CD28 intracellular domain

<400> SEQUENCE: 15

Phe Trp Val Arg Ser Lys Arg Ser Arg Leu Leu His Ser Asp Tyr Met
1               5                   10                  15

Asn Met Thr Pro Arg Arg Pro Gly Pro Thr Arg Lys His Tyr Gln Pro
            20                  25                  30

Tyr Ala Pro Pro Arg Asp Phe Ala Ala Tyr Arg Ser
        35                  40

<210> SEQ ID NO 16
<211> LENGTH: 534
<212> TYPE: DNA
<213> ORGANISM: Artificial Sequence
<220> FEATURE:
<223> OTHER INFORMATION: IL10

<400> SEQUENCE: 16
atgcacagct cagcactgct ctgttgcctg gtcctcctga ctggggtgag ggccagccca    60
ggccagggca cccagtctga aacagctgc acccacttcc aggcaacct gcctaacatg    120 cttcgagatc tccgagatgc cttcagcaga gtgaagactt tctttcaaat gaaggatcag    180
ctggacaact tgttgttaaa ggagtccttg ctggaggact ttaagggtta cctgggttgc    240
caagccttgt ctgagatgat ccagttttac tggaggagg tgatgcccca agctgagaac    300
caagacccag acatcaaggc gcatgtgaac tccctggggg agaacctgaa gaccctcagg    360
ctgaggctac ggcgctgtca tcgatttctt ccctgtgaaa acaagagcaa ggccgtggag    420
caggtgaaga atgcctttaa taagctccaa gagaaaggca tctacaaagc catgagtgag    480
tttgacatct tcatcaacta catagaagcc tacatgacaa tgaagatacg aaac          534

<210> SEQ ID NO 17
<211> LENGTH: 132
<212> TYPE: DNA
<213> ORGANISM: Artificial Sequence
<220> FEATURE:
<223> OTHER INFORMATION: CD28 Intracellular domain

<400> SEQUENCE: 17
ttctgggtga ggagtaagag gagcaggctc ctgcacagtg actacatgaa catgactccc    60 cgccgcccg ggcccacccg caagcattac cagccctatg ccccaccacg cgacttcgca    120
gcctatcgct cc                                                       132

<210> SEQ ID NO 18
<211> LENGTH: 42
<212> TYPE: PRT
<213> ORGANISM: Artificial Sequence
<220> FEATURE:
<223> OTHER INFORMATION: 4-1BB intracellular domain

<400> SEQUENCE: 18

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 19
<211> LENGTH: 126
<212> TYPE: DNA
<213> ORGANISM: Artificial Sequence
<220> FEATURE:
<223> OTHER INFORMATION: 4-1BB intracellular domain

<400> SEQUENCE: 19
aaacggggca gaaagaaact cctgtatata ttcaaacaac catttatgag accagtacaa      60
actactcaag aggaagatgg ctgtagctgc cgatttccag aagaagaaga aggaggatgt     120
gaactg                                                                126

<210> SEQ ID NO 20
<211> LENGTH: 35
<212> TYPE: PRT
<213> ORGANISM: Artificial Sequence
<220> FEATURE:
<223> OTHER INFORMATION: ICOS intracellular domain

<400> SEQUENCE: 20

Thr Lys Lys Lys Tyr Ser Ser Ser Val His Asp Pro Asn Gly Glu Tyr
1               5                   10                  15

Met Phe Met Arg Ala Val Asn Thr Ala Lys Lys Ser Arg Leu Thr Asp
            20                  25                  30

Val Thr Leu
        35

<210> SEQ ID NO 21
<211> LENGTH: 105
<212> TYPE: DNA
<213> ORGANISM: Artificial Sequence
<220> FEATURE:
<223> OTHER INFORMATION: ICOS intracellular domain

<400> SEQUENCE: 21
acaaaaaaga agtattcatc cagtgtgcac gaccctaacg gtgaatacat gttcatgaga      60
gcagtgaaca cagccaaaaa atccagactc acagatgtga cccta                     105

<210> SEQ ID NO 22
<211> LENGTH: 55
<212> TYPE: PRT
<213> ORGANISM: Artificial Sequence
<220> FEATURE:
<223> OTHER INFORMATION: GITR intracellular domain

<400> SEQUENCE: 22

His Ile Trp Gln Leu Arg Ser Gln Cys Met Trp Pro Arg Glu Thr Gln
1               5                   10                  15

Leu Leu Leu Glu Val Pro Pro Ser Thr Glu Asp Ala Arg Ser Cys Gln
            20                  25                  30

```
Phe Pro Glu Glu Arg Gly Glu Arg Ser Ala Glu Lys Gly Arg
            35                  40                  45

Leu Gly Asp Leu Trp Val Leu
     50                  55

<210> SEQ ID NO 23
<211> LENGTH: 117
<212> TYPE: PRT
<213> ORGANISM: Artificial Sequence
<220> FEATURE:
<223> OTHER INFORMATION: CD2 intracellular domain

<400> SEQUENCE: 23

Thr Lys Arg Lys Lys Gln Arg Ser Arg Arg Asn Asp Glu Glu Leu Glu
 1               5                  10                  15

Thr Arg Ala His Arg Val Ala Thr Glu Glu Arg Gly Arg Lys Pro His
                20                  25                  30

Gln Ile Pro Ala Ser Thr Pro Gln Asn Pro Ala Thr Ser Gln His Pro
            35                  40                  45

Pro Pro Pro Pro Gly His Arg Ser Gln Ala Pro Ser His Arg Pro Pro
        50                  55                  60

Pro Pro Gly His Arg Val Gln His Gln Pro Gln Lys Arg Pro Pro Ala
65                  70                  75                  80

Pro Ser Gly Thr Gln Val His Gln Gln Lys Gly Pro Pro Leu Pro Arg
                85                  90                  95

Pro Arg Val Gln Pro Lys Pro Pro His Gly Ala Ala Glu Asn Ser Leu
            100                 105                 110

Ser Pro Ser Ser Asn
        115

<210> SEQ ID NO 24
<211> LENGTH: 112
<212> TYPE: PRT
<213> ORGANISM: Artificial Sequence
<220> FEATURE:
<223> OTHER INFORMATION: CD3 zeta domain

<400> SEQUENCE: 24

Arg Val Lys Phe Ser Arg Ser Ala Asp Ala Pro Ala Tyr Lys Gln Gly
 1               5                  10                  15

Gln Asn Gln Leu Tyr Asn Glu Leu Asn Leu Gly Arg Arg Glu Glu Tyr
                20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
        50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 25
<211> LENGTH: 336
<212> TYPE: DNA
<213> ORGANISM: Artificial Sequence
<220> FEATURE:
<223> OTHER INFORMATION: CD3 zeta domain
```

<400> SEQUENCE: 25

```
agagtgaagt tcagcaggag cgcagacgcc ccgcgtaca agcagggcca gaaccagctc    60
tataacgagc tcaatctagg acgaagagag gagtacgatg ttttggacaa gagacgtggc   120
cgggaccctg agatggggggg aaagccgaga aggaagaacc ctcaggaagg cctgtacaat   180
gaactgcaga aagataagat ggcggaggcc tacagtgaga ttgggatgaa aggcgagcgc   240 cggagggggca aggggcacga tggcctttac cagggtctca gtacagccac caaggacacc   300
tacgacgccc ttcacatgca ggccctgccc cctcgc                             336
```

<210> SEQ ID NO 26
<211> LENGTH: 112
<212> TYPE: PRT
<213> ORGANISM: Artificial Sequence
<220> FEATURE:
<223> OTHER INFORMATION: CD3 zeta domain

<400> SEQUENCE: 26

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 27
<211> LENGTH: 336
<212> TYPE: DNA
<213> ORGANISM: Artificial Sequence
<220> FEATURE:
<223> OTHER INFORMATION: CD3 zeta domain

<400> SEQUENCE: 27

```
agagtgaagt tcagcaggag cgcagacgcc ccgcgtacc agcagggcca gaaccagctc    60
tataacgagc tcaatctagg acgaagagag gagtacgatg ttttggacaa gagacgtggc   120
cgggaccctg agatggggggg aaagccgaga aggaagaacc ctcaggaagg cctgtacaat   180
gaactgcaga aagataagat ggcggaggcc tacagtgaga ttgggatgaa aggcgagcgc   240 cggagggggca aggggcacga tggcctttac cagggtctca gtacagccac caaggacacc   300
tacgacgccc ttcacatgca ggccctgccc cctcgc                             336
```

<210> SEQ ID NO 28
<211> LENGTH: 431
<212> TYPE: PRT
<213> ORGANISM: Artificial Sequence
<220> FEATURE:
<223> OTHER INFORMATION: FOXP3

<400> SEQUENCE: 28

```
Met Pro Asn Pro Arg Pro Gly Lys Pro Ser Ala Pro Ser Leu Ala Leu
1               5                   10                  15
```

```
Gly Pro Ser Pro Gly Ala Ser Pro Ser Trp Arg Ala Ala Pro Lys Ala
            20                  25                  30

Ser Asp Leu Leu Gly Ala Arg Gly Pro Gly Thr Phe Gln Gly Arg
        35                  40                  45

Asp Leu Arg Gly Gly Ala His Ala Ser Ser Ser Leu Asn Pro Met
50                  55                  60

Pro Pro Ser Gln Leu Gln Leu Pro Thr Leu Pro Leu Val Met Val Ala
65                  70                  75                  80

Pro Ser Gly Ala Arg Leu Gly Pro Leu Pro His Leu Gln Ala Leu Leu
                85                  90                  95

Gln Asp Arg Pro His Phe Met His Gln Leu Ser Thr Val Asp Ala His
                100                 105                 110

Ala Arg Thr Pro Val Leu Gln Val His Pro Leu Glu Ser Pro Ala Met
            115                 120                 125

Ile Ser Leu Thr Pro Pro Thr Thr Ala Thr Gly Val Phe Ser Leu Lys
130                 135                 140

Ala Arg Pro Gly Leu Pro Pro Gly Ile Asn Val Ala Ser Leu Glu Trp
145                 150                 155                 160

Val Ser Arg Glu Pro Ala Leu Leu Cys Thr Phe Pro Asn Pro Ser Ala
                165                 170                 175

Pro Arg Lys Asp Ser Thr Leu Ser Ala Val Pro Gln Ser Ser Tyr Pro
            180                 185                 190

Leu Leu Ala Asn Gly Val Cys Lys Trp Pro Gly Cys Glu Lys Val Phe
        195                 200                 205

Glu Glu Pro Glu Asp Phe Leu Lys His Cys Gln Ala Asp His Leu Leu
    210                 215                 220

Asp Glu Lys Gly Arg Ala Gln Cys Leu Leu Gln Arg Glu Met Val Gln
225                 230                 235                 240

Ser Leu Glu Gln Gln Leu Val Leu Glu Lys Glu Lys Leu Ser Ala Met
                245                 250                 255

Gln Ala His Leu Ala Gly Lys Met Ala Leu Thr Lys Ala Ser Ser Val
            260                 265                 270

Ala Ser Ser Asp Lys Gly Ser Cys Cys Ile Val Ala Ala Gly Ser Gln
        275                 280                 285

Gly Pro Val Val Pro Ala Trp Ser Gly Pro Arg Glu Ala Pro Asp Ser
    290                 295                 300

Leu Phe Ala Val Arg Arg His Leu Trp Gly Ser His Gly Asn Ser Thr
305                 310                 315                 320

Phe Pro Glu Phe Leu His Asn Met Asp Tyr Phe Lys Phe His Asn Met
                325                 330                 335

Arg Pro Pro Phe Thr Tyr Ala Thr Leu Ile Arg Trp Ala Ile Leu Glu
            340                 345                 350

Ala Pro Glu Lys Gln Arg Thr Leu Asn Glu Ile Tyr His Trp Phe Thr
        355                 360                 365

Arg Met Phe Ala Phe Phe Arg Asn His Pro Ala Thr Trp Lys Asn Ala
    370                 375                 380

Ile Arg His Asn Leu Ser Leu His Lys Cys Phe Val Arg Val Glu Ser
385                 390                 395                 400

Glu Lys Gly Ala Val Trp Thr Val Asp Glu Leu Glu Phe Arg Lys Lys
                405                 410                 415

Arg Ser Gln Arg Pro Ser Arg Cys Ser Asn Pro Thr Pro Gly Pro
            420                 425                 430
```

<210> SEQ ID NO 29
<211> LENGTH: 22
<212> TYPE: PRT
<213> ORGANISM: Artificial Sequence
<220> FEATURE:
<223> OTHER INFORMATION: P2A

<400> SEQUENCE: 29

Gly Ser Gly Ala Thr Asn Phe Ser Leu Leu Lys Gln Ala Gly Asp Val
1               5                   10                  15

Glu Glu Asn Pro Gly Pro
            20

<210> SEQ ID NO 30
<211> LENGTH: 178
<212> TYPE: PRT
<213> ORGANISM: Artificial Sequence
<220> FEATURE:
<223> OTHER INFORMATION: IL10

<400> SEQUENCE: 30

Met His Ser Ser Ala Leu Leu Cys Cys Leu Val Leu Leu Thr Gly Val
1               5                   10                  15

Arg Ala Ser Pro Gly Gln Gly Thr Gln Ser Glu Asn Ser Cys Thr His
            20                  25                  30

Phe Pro Gly Asn Leu Pro Asn Met Leu Arg Asp Leu Arg Asp Ala Phe
        35                  40                  45

Ser Arg Val Lys Thr Phe Phe Gln Met Lys Asp Gln Leu Asp Asn Leu
    50                  55                  60

Leu Leu Lys Glu Ser Leu Leu Glu Asp Phe Lys Gly Tyr Leu Gly Cys
65                  70                  75                  80

Gln Ala Leu Ser Glu Met Ile Gln Phe Tyr Leu Glu Glu Val Met Pro
                85                  90                  95

Gln Ala Glu Asn Gln Asp Pro Asp Ile Lys Ala His Val Asn Ser Leu
            100                 105                 110

Gly Glu Asn Leu Lys Thr Leu Arg Leu Arg Leu Arg Arg Cys His Arg
        115                 120                 125

Phe Leu Pro Cys Glu Asn Lys Ser Lys Ala Val Glu Gln Val Lys Asn
    130                 135                 140

Ala Phe Asn Lys Leu Gln Glu Lys Gly Ile Tyr Lys Ala Met Ser Glu
145                 150                 155                 160

Phe Asp Ile Phe Ile Asn Tyr Ile Glu Ala Tyr Met Thr Met Lys Ile
                165                 170                 175

Arg Asn

<210> SEQ ID NO 31
<211> LENGTH: 21
<212> TYPE: PRT
<213> ORGANISM: Artificial Sequence
<220> FEATURE:
<223> OTHER INFORMATION: T2A

<400> SEQUENCE: 31

Gly Ser Gly Glu Gly Arg Gly Ser Leu Leu Thr Cys Gly Asp Val Glu
1               5                   10                  15

Glu Asn Pro Gly Pro
            20

<210> SEQ ID NO 32

```
<211> LENGTH: 63
<212> TYPE: DNA
<213> ORGANISM: Artificial Sequence
<220> FEATURE:
<223> OTHER INFORMATION: T2A

<400> SEQUENCE: 32
ggaagcggag agggcagagg aagtctgcta acatgcggtg acgtcgagga gaatcctgga      60
cct                                                                   63

<210> SEQ ID NO 33
<211> LENGTH: 63
<212> TYPE: DNA
<213> ORGANISM: Artificial Sequence
<220> FEATURE:
<223> OTHER INFORMATION: CD8a Leader

<400> SEQUENCE: 33
atggccttac cagtgaccgc cttgctcctg ccgctggcct tgctgctcca cgccgccagg      60
ccg                                                                   63

<210> SEQ ID NO 34
<211> LENGTH: 72
<212> TYPE: DNA
<213> ORGANISM: Artificial Sequence
<220> FEATURE:
<223> OTHER INFORMATION: CD28 transmembrane domain

<400> SEQUENCE: 34
ttttgggtgc tggtggtggt tggtggagtc ctggcttgct atagcttgct agtaacagtg      60
gcctttatta tt                                                         72

<210> SEQ ID NO 35
<211> LENGTH: 72
<212> TYPE: DNA
<213> ORGANISM: Artificial Sequence
<220> FEATURE:
<223> OTHER INFORMATION: ICOS transmembrane domain

<400> SEQUENCE: 35
ttctggttac ccataggatg tgcagccttt gttgtagtct gcattttggg atgcatactt      60
atttgttggc tt                                                         72

<210> SEQ ID NO 36
<211> LENGTH: 75
<212> TYPE: DNA
<213> ORGANISM: Artificial Sequence
<220> FEATURE:
<223> OTHER INFORMATION: GITR transmembrane domain

<400> SEQUENCE: 36
ctgggctggc tgaccgtggt gctgctggct gtggctgctt gtgtgctgct gctgacaagc      60
gctcagctgg gcctg                                                      75

<210> SEQ ID NO 37
<211> LENGTH: 165
<212> TYPE: DNA
<213> ORGANISM: Artificial Sequence
<220> FEATURE:
<223> OTHER INFORMATION: GITR intracellular domain

<400> SEQUENCE: 37
cacatctggc agctgagaag ccagtgcatg tggcccagag agacacagct gctgctggaa      60
```
gtgcccccca gcaccgagga tgccagaagc tgccagttcc ccgaggaaga gagaggcgag   120
agatccgccg aggaaaaggg cagactgggc gacctgtggg tgctg              165

<210> SEQ ID NO 38
<211> LENGTH: 351
<212> TYPE: DNA
<213> ORGANISM: Artificial Sequence
<220> FEATURE:
<223> OTHER INFORMATION: CD2 intracellular domain

<400> SEQUENCE: 38
accaaaagga aaaacagag gagtcggaga atgatgagg agctggagac aagagcccac    60
agagtagcta ctgaagaaag gggccggaag ccccaccaaa ttccagcttc aaccctcag   120 aatccagcaa cttcccaaca tcctcctcca ccacctggtc atcgttccca ggcacctagt   180
catcgtcccc cgcctcctgg acaccgtgtt cagcaccagc ctcagaagag gcctcctgct   240
ccgtcgggca cacaagttca ccagcagaaa ggcccgcccc tccccagacc tcgagttcag   300
ccaaaacctc cccatggggc agcagaaaac tcattgtccc cttcctctaa t           351

<210> SEQ ID NO 39
<211> LENGTH: 1293
<212> TYPE: DNA
<213> ORGANISM: Artificial Sequence
<220> FEATURE:
<223> OTHER INFORMATION: FOXP3

<400> SEQUENCE: 39
atgcccaacc ccaggcctgg caagccctcg ccccttcct tggcccttgg cccatcccca    60
ggagcctcgc ccagctggag ggctgcaccc aaagcctcag acctgctggg ggccggggc   120 ccaggggaa ccttccaggg ccgagatctt cgaggcgggg ccatgcctc ctcttcttcc   180 ttgaacccca tgccaccatc gcagctgcag ctgcccacac tgcccctagt catggtggca   240
ccctccgggg cacggctggg ccccttgccc cacttacagg cactcctcca ggacaggcca   300
catttcatgc accagctctc aacggtggat gcccacgccc ggaccccgt gctgcaggtg   360 cacccccctgg agagcccagc catgatcagc ctcacaccac caccaccgc cactgggtc   420 ttctccctca aggcccggcc tggcctccca cctgggatca acgtggccag cctggaatgg   480
gtgtccaggg agcggcact gctctgcacc ttcccaaatc ccagtgcacc caggaaggac   540
agcacccttt cggctgtgcc ccagagctcc taccactgc tggcaaatgg tgtctgcaag   600
tggcccggat gtgagaaggt cttcgaagag ccagaggact tcctcaagca ctgccaggcg   660
gaccatcttc tggatgagaa gggcagggca caatgtctcc tcagagaga gatggtacag   720 tctctggagc agcagctggt gctggagaag gagaagctga gtgccatgca ggcccacctg   780
gctgggaaaa tggcactgac caaggcttca tctgtggcat catccgacaa gggctcctgc   840
tgcatcgtag ctgctggcag ccaaggccct gtcgtcccag cctggtctgg cccccgggag   900
gcccctgaca gcctgtttgc tgtgcggagg cacctgtggg gtagccatgg aaacagcaca    960
ttcccagagt tcctccacaa catggactac ttcaagttcc acaacatgcg accccctttc   1020
acctacgcca cgctcatccg ctgggccatc ctggaggctc cagagaagca gcggacactc   1080
aatgagatct accactggtt cacacgcatg tttgccttct cagaaaccca tcctgccacc   1140
tggaagaacg ccatccgcca caacctgagt ctgcacaagt gctttgtgcg ggtggagagc   1200 gagaagggg ctgtgtggac cgtggatgag ctggagttcc gcaagaaacg gagccagagg   1260

```
cccagcaggt gttccaaccc tacacctggc ccc                                   1293

<210> SEQ ID NO 40
<211> LENGTH: 66
<212> TYPE: DNA
<213> ORGANISM: Artificial Sequence
<220> FEATURE:
<223> OTHER INFORMATION: P2A

<400> SEQUENCE: 40
ggaagcggag ctactaactt cagcctgctg aagcaggctg gagacgtgga ggagaaccct       60
ggacct                                                                 66
```